United States Patent
Kato

(10) Patent No.: US 10,068,546 B2
(45) Date of Patent: Sep. 4, 2018

(54) INFORMATION TERMINAL, SYSTEM, CONTROL METHOD AND RECORDING MEDIUM

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 86 days.

(21) Appl. No.: 15/229,826

(22) Filed: Aug. 5, 2016

(65) Prior Publication Data

US 2016/0343347 A1    Nov. 24, 2016

Related U.S. Application Data

(63) Continuation of application No. PCT/JP2015/053297, filed on Feb. 5, 2015.

(30) Foreign Application Priority Data

Feb. 10, 2014  (JP) ................................. 2014-023707

(51) Int. Cl.
*G09G 5/00* (2006.01)
*G09G 5/377* (2006.01)
*H04N 21/258* (2011.01)

(52) U.S. Cl.
CPC ............ *G09G 5/005* (2013.01); *G09G 5/377* (2013.01); *H04N 21/25833* (2013.01);
(Continued)

(58) Field of Classification Search
CPC ........... G09G 2358/00; G09G 2370/12; G09G 2370/20; G09G 5/005; G09G 5/377; H04N 21/25833
(Continued)

(56) References Cited

U.S. PATENT DOCUMENTS

| 8,456,504 B2 | 6/2013 | Eshkoli |
| 2013/0308055 A1 | 11/2013 | Shigemasa et al. |
| 2014/0043431 A1 | 2/2014 | Kato |

FOREIGN PATENT DOCUMENTS

| JP | 2002-325239 | 11/2002 |
| JP | 2005-341571 | 12/2005 |

(Continued)

OTHER PUBLICATIONS

International Search Report dated Apr. 28, 2015 in PCT/JP2015/053297 filed on Feb. 5, 2015 (with English Translation).
(Continued)

*Primary Examiner* — Tony Davis
(74) *Attorney, Agent, or Firm* — Oblon, McClelland, Maier & Neustadt, L.L.P.

(57) ABSTRACT

An information terminal determines whether displayable resolutions of a display apparatus include a resolution of an aspect ratio other than a standard aspect ratio used for image data transmission in the case where apparatus information obtained from the display apparatus matches predetermined apparatus information, according to a determination result, selects a first resolution of an aspect ratio other than the standard aspect ratio or a second resolution of the standard aspect ratio, changes a resolution of the display apparatus to the selected resolution in the case where the apparatus information matches the predetermined apparatus information, and changes a resolution of the display apparatus to a recommended resolution of the display apparatus in the case where the apparatus information does not match the predetermined apparatus information.

6 Claims, 50 Drawing Sheets

(52) U.S. Cl.
CPC ..... *G09G 2358/00* (2013.01); *G09G 2370/12* (2013.01); *G09G 2370/20* (2013.01)

(58) Field of Classification Search
USPC ...................................................... 348/14.12
See application file for complete search history.

(56) References Cited

FOREIGN PATENT DOCUMENTS

| | | |
|---|---|---|
| JP | 2008-134520 | 6/2008 |
| JP | 2009-180892 | 8/2009 |
| JP | 2012-237964 | 12/2012 |
| JP | 2013-242357 | 12/2013 |

OTHER PUBLICATIONS

Written Opinion dated Apr. 28, 2015 in PCT/JP2015/053297 filed on Feb. 5, 2015.

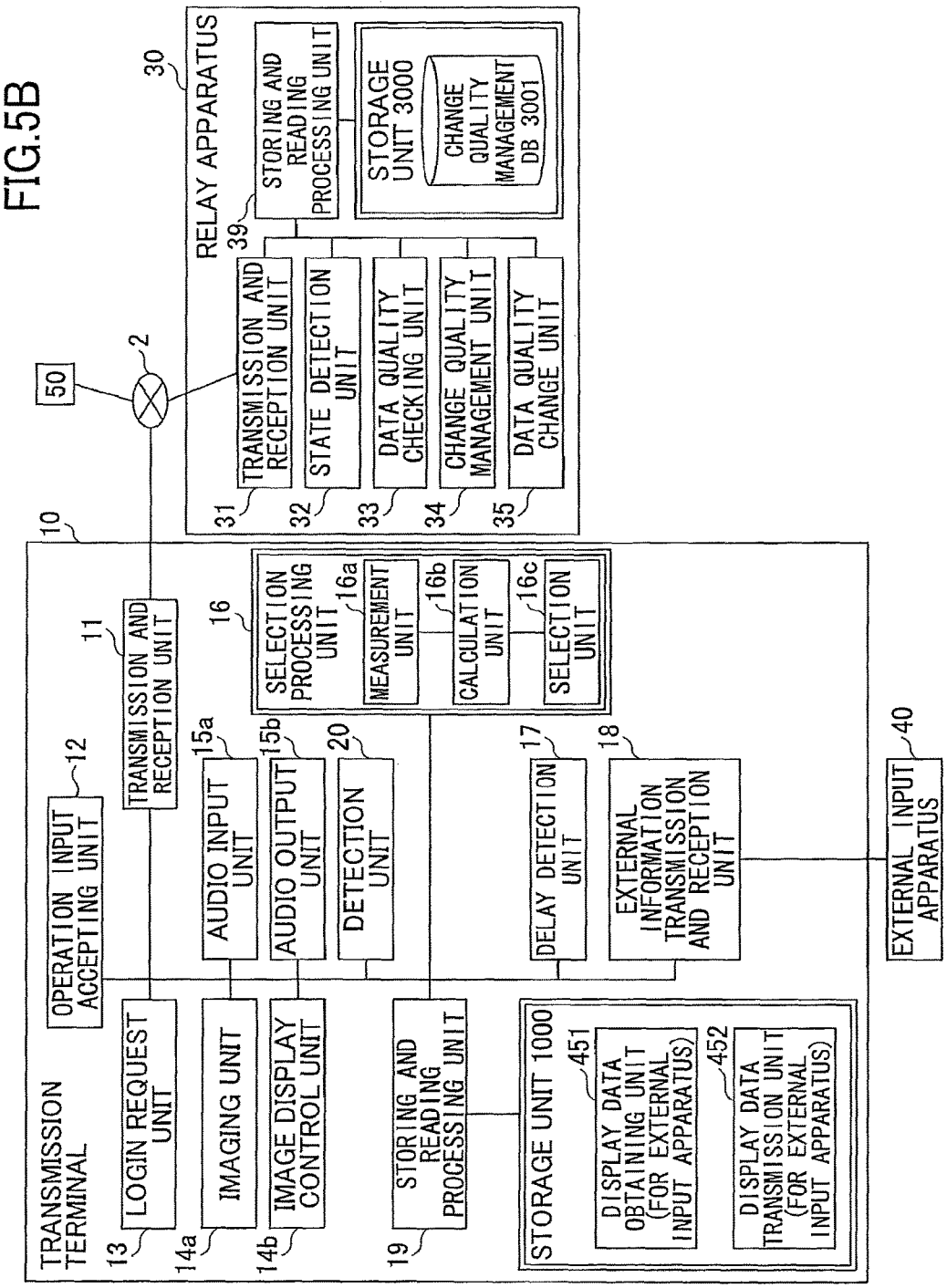

LOW RESOLUTION

MEDIUM RESOLUTION

HIGH RESOLUTION

FIG.7

CHANGE QUALITY MANAGEMENT TABLE

| IP ADDRESS OF RELAY DESTINATION TERMINAL | IMAGE QUALITY OF RELAYED IMAGE DATA (QUALITY OF IMAGE) |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

FIG.8

RELAY APPARATUS MANAGEMENT TABLE

| RELAY APPARATUS ID | OPERATIONAL STATE | RECEPTION DATE AND TIME | IP ADDRESS OF RELAY APPARATUS | MAXIMUM DATA TRANSMISSION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.9

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG.10

TERMINAL MANAGEMENT TABLE

| TERMINAL ID | OPERATIONAL STATE | RECEPTION DATE AND TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.11

DESTINATION LIST MANAGEMENT TABLE

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

SESSION MANAGEMENT TABLE

| SELECTION SESSION ID | RELAY APPARATUS ID | REQUEST SOURCE TERMINAL ID | DESTINATION TERMINAL ID | DELAY TIME (ms) | DELAY INFORMATION RECEPTION DATE AND TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

ADDRESS PRIORITY MANAGEMENT TABLE

| SAME-OR-DIFFERENT DOT-ADDRESS PATTERN | ADDRESS PRIORITY |
|---|---|
| SAME.SAME.SAME.DIFFERENT | 5 |
| SAME.SAME.DIFFERENT.- | 3 |
| SAME.DIFFERENT.-.- | 1 |
| DIFFERENT.-.-.- | 0 |

FIG.14

TRANSMISSION SPEED PRIORITY MANAGEMENT TABLE

| MAXIMUM DATA TRANSMISSION SPEED IN RELAY APPARATUS (Mbps) | TRANSMISSION SPEED PRIORITY |
|---|---|
| 1000 ~ | 5 |
| 100 ~ 1000 | 3 |
| 10 ~ 100 | 1 |
| ~ 10 | 0 |

FIG.15

QUALITY MANAGEMENT TABLE

| DELAY TIME (ms) | IMAGE QUALITY OF IMAGE DATA (QUALITY OF IMAGE) |
|---|---|
| 0 ~ 100 | HIGH IMAGE QUALITY |
| 100 ~ 300 | MEDIUM IMAGE QUALITY |
| 300 ~ 500 | LOW IMAGE QUALITY |
| 500 ~ | (INTERRUPTION) |

FIG.20

| RELAY APPARATUS ID | ADDRESS PRIORITY | | POINT OF TRANSMISSION SPEED PRIORITY | INTEGRATED POINT |
|---|---|---|---|---|
| | POINT WITH RESPECT TO TERMINAL 10aa | POINT WITH RESPECT TO TERMINAL 10bd | | |
| 111a | 5 | 1 | 3 | 8 |
| 111b | 3 | 1 | 5 | 8 |
| 111c | – | – | – | – |
| 111d | 1 | 5 | 1 | 6 |

FIG.30

| CURRENT DISPLAY RESOLUTION : | width:1280 height:720 (16:9 RATIO) |
|---|---|
| DISPLAYABLE RESOLUTION : | width: 640 height:480 ( 4:3 RATIO)<br>width: 800 height:600 ( 4:3 RATIO)<br>width:1024 height:768 ( 4:3 RATIO)<br>width:1152 height:864 ( 4:3 RATIO)<br>width:1280 height:720 (16:9 RATIO)<br>width:1280 height:768 ( 5:3 RATIO)<br>width:1280 height:800 ( 8:5 RATIO) |
| FLAG overlap : | false |
| SEGMENT POSITION : | — |
| AUXILIARY INFORMATION DISPLAY POSITION : | — |
| DISPLAY CONTENT : | .. .. |

FIG.36

| ITEM NAME | RESOLUTION | overlap | SEGMENT VALUE |
|---|---|---|---|
| resolution1 | width:1280, height:800 | false | width:1280, height:80, position:lower |
| resolution2 | width:1280, height:720 | true | NA |
| resolution3 | width:1024, height:768 | false | width:1024, height:96, position:both |

FIG.37

| ITEM NAME | RESOLUTION | overlap | SEGMENT VALUE |
|---|---|---|---|
| resolution1 | width:1280, height:800 | false | width:1280, height:80, position:lower |
| resolution2 | width:1024, height:768 | false | width:1024, height:96, position:both |
| resolution3 | width:1280, height:720 | true | NA |

FIG.40

| CURRENT DISPLAY RESOLUTION : | width:1280 height:720 (16:9 RATIO) |
|---|---|
| DISPLAYABLE RESOLUTION : | width: 640 height:480 ( 4:3 RATIO)<br>width: 800 height:600 ( 4:3 RATIO)<br>width:1024 height:768 ( 4:3 RATIO)<br>width:1152 height:864 ( 4:3 RATIO)<br>width:1280 height:720 (16:9 RATIO)<br>width:1280 height:768 ( 5:3 RATIO)<br>width:1280 height:800 ( 8:5 RATIO) |
| FLAG overlap : | false |
| SEGMENT POSITION : | — |
| AUXILIARY INFORMATION DISPLAY POSITION : | — |
| DISPLAY CONTENT : | |
| DIGITAL INPUT digital : | true |
| RECOMMENDED RESOLUTION : | width:1280 height:720 (16:9 RATIO) |
| HARDWARE IDENTIFICATION INFORMATION : | TV |
| : | : |

FIG.44

| | |
|---|---|
| CURRENT DISPLAY RESOLUTION : | width:1280 height:720 (16:9 RATIO) |
| DISPLAYABLE RESOLUTION : | width: 640 height:480 ( 4:3 RATIO)<br>width: 800 height:600 ( 4:3 RATIO)<br>width:1024 height:768 ( 4:3 RATIO)<br>width:1152 height:864 ( 4:3 RATIO)<br>width:1280 height:720 (16:9 RATIO)<br>width:1280 height:768 ( 5:3 RATIO)<br>width:1280 height:800 ( 8:5 RATIO) |
| FLAG overlap : | false |
| SEGMENT POSITION : | — |
| AUXILIARY INFORMATION DISPLAY POSITION : | — |
| DISPLAY CONTENT : | |
| DIGITAL INPUT digital : | true |
| RECOMMENDED RESOLUTION : | width:1280 height:720 (16:9 RATIO) |
| HARDWARE IDENTIFICATION INFORMATION : | TV |
| MANUFACTURER CODE : | RRR |
| PRODUCT CODE : | 0x0020h |
| MODEL NAME : | PPP_01SERIES |
| | : : |

FIG.45A

| MANUFACTURER CODE | RRR |
|---|---|
| PRODUCT CODE | – |
| MODEL NAME | – |

FIG.45B

| MANUFACTURER CODE | RRR |
|---|---|
| PRODUCT CODE | – |
| MODEL NAME | PPP_01SERIES, PPP_02SERIES |

FIG.45C

| MANUFACTURER CODE | RRR |
|---|---|
| PRODUCT CODE | 0x0020h – 0x002Fh |
| MODEL NAME | – |

INFORMATION TERMINAL, SYSTEM, CONTROL METHOD AND RECORDING MEDIUM

CROSS-REFERENCE TO RELATED APPLICATIONS

The present application is a continuation application of International Application No. PCT/JP2015/053297 filed on Feb. 5, 2015, which claims priority to Japanese Patent Application No. 2014-023707 filed on Feb. 10, 2014. The contents of these applications are incorporated herein by reference in their entirety.

BACKGROUND OF THE INVENTION

1. Field of the Invention

The present disclosure relates to an information terminal, a system, a control method and a program.

2. Description of the Related Art

In recent years, a remote conference system for providing a remote conference with a remote place via a communication network such as the Internet has become popular.

In this type of remote conference system, in a conference room where one of parties is participating in a remote conference, a transmission terminal (terminal apparatus) of the remote conference system is used for taking an image of the conference room and for collecting voice including a speech of the party. Further, the taken image and the collected voice are converted to digital data and transmitted to a transmission terminal of a destination party, the image is displayed on a display apparatus (e.g., a display device or a projector) in a conference room of the destination party, and the voice is output from a speaker. As a result, a conference between remote places is realized in a state close to the actual (non-remote) conference.

A transmission terminal used in this type of remote conference system may be sold together with the display apparatus as a set, or may be sold, more and more, as a single unit these days. As a result, it is possible to have display apparatuses with various resolutions connected to a transmission terminal these days.

Because this type of transmission terminal is designed to have a fixed resolution value for image data transmitted to and received from another transmission terminal such as 1280 pixel width×720 pixel height (aspect ratio 16:9), a display problem may occur depending on the resolution of the connected display apparatus.

Specifically, in the case where image data is displayed on the display apparatus with the original resolution of the image data, when resolution of the image is higher than the designed resolution value in the width direction or the height direction, a part of the image is not displayed in the direction where the resolution of the image is higher than the designed value, a certain area which should be displayed is not displayed, and the viewability is degraded. Especially, there is a case in which contents displayed by a recent transmission terminal include auxiliary information such as an operation menu or an error message other than the image of the conference room. As a result, if a part of the area in which the auxiliary information should be displayed is not displayed, then the user may not be able to operate the transmission terminal or understand a cause of an error.

Patent Document 1 describes a method of changing an aspect ratio from 16:9 to 4:3 in order to prepare an image for a video conference. Further, Patent Document 2 describes a method in which, in order to perform real-time shared screen display, a terminal receives display capability of another terminal, the terminal converts a resolution of application data of the terminal to the display resolution of the other terminal, and transmits the converted result to the other terminal.

Further, in a transmission terminal connected to this type of remote conference system, different resolution settings may be used depending on whether a video is output via an analog terminal or via a digital terminal. For example, the transmission terminal uses a resolution of "1024×768" for the analog terminal, and a resolution of "1280×720" (720p) for the digital terminal.

CITATION LIST

Patent Document

[Patent Document 1] Japanese Unexamined Patent Application Publication No. 2005-341571
[Patent Document 2] Japanese Unexamined Patent Application Publication No. 2002-325239

SUMMARY OF THE INVENTION

However, a display distortion and displaying an operation menu, etc., are not taken into account in the conventional method. Therefore, there is a problem in that a display distortion may occur or a part of an operation menu may not be displayed depending on the display apparatus combination. Further, the conventional method can only take care of a case in which an input image aspect ratio is 16:9 and a display apparatus aspect ratio is 4:3, and does not have versatility.

Further, in the case where a user, who used to use an analog terminal for an output of image data, uses a display apparatus with a digital terminal for an output of image data, it is likely that the user is confused with resolution difference. Further, it is likely that load of a call center of the manufacture of the display apparatus, a managing section responsible for introducing the display apparatus, etc., will increase due to many inquiries related to the resolution difference from users who are used to using an analog terminal.

In view of the above problem, an object of the present disclosure is to properly display image data and auxiliary information according to capability of the display apparatus connected to the transmission terminal.

Solution to Problem

According to an aspect of the present disclosure, an information terminal that is connected to a display device via a digital terminal, and outputs display image data to the display device is provided. The information terminal includes a resolution determination unit configured to obtain displayable resolutions of the display device in the case where device information obtained from the display device matches predetermined device information, and determine whether the displayable resolutions include a resolution of an aspect ratio other than a standard aspect ratio used for image data transmission; a resolution selection unit configured to select a first resolution of an aspect ratio other than the standard aspect ratio from the displayable resolutions in the case where it is determined that the displayable resolutions include the resolution of an aspect ratio other than the standard aspect ratio, and select a second resolution of the standard aspect ratio from the displayable resolutions in the case where it is determined that the displayable resolutions do not include the resolution of an aspect ratio other than the standard aspect ratio; and a resolution change unit configured to change the display device's resolution to the resolution selected by the resolution selection unit in the case where the device information matches the predetermined device information, and change the display device's resolution to a recommended resolution of the display device in the case where the the device information does not coincide with the predetermined device information.

Advantageous Effects of Invention

According to an aspect of the present disclosure, it is possible to properly display image data and auxiliary information according to capability of the display apparatus connected to the transmission terminal.

BRIEF DESCRIPTION OF THE DRAWINGS

FIG. 5B is a functional block diagram of a terminal, an apparatus, and a system included in a transmission system according to an embodiment.

FIG. 7 is a drawing illustrating a change quality management table.

FIG. 8 is a drawing illustrating a relay apparatus management table.

FIG. 9 is a drawing illustrating a terminal authentication management table.

FIG. 10 is a drawing illustrating a terminal management table.

FIG. 11 is a drawing illustrating a destination list management table.

FIG. 12 is a drawing illustrating a session management table.

FIG. 13 is a drawing illustrating a address priority management table.

FIG. 14 is a drawing illustrating a transmission speed priority management table.

FIG. 15 is a drawing illustrating a quality management table.

FIG. 20 is a drawing illustrating a calculation state of priority points when a process for narrowing down relay apparatuses is performed.

FIG. 30 is a drawing illustrating an example of data used for display control.

FIG. 36 is a drawing illustrating an example of a resolution management table.

FIG. 37 is a drawing illustrating another example of a resolution management table.

FIG. 40 is a drawing illustrating an example of data used in yet another example of a resolution control process.

FIG. 44 is a drawing illustrating an example of data used for display control.

FIG. 45A is a drawing illustrating an example of product management table.

FIG. 45B is a drawing illustrating an example of product management table.

FIG. 45C is a drawing illustrating an example of product management table.

DETAILED DESCRIPTION OF THE PREFERRED EMBODIMENTS

In the following, first, referring to FIG. 1 through FIG. 41, a basic hardware configuration and functions of a transmission terminal according to an embodiment of the present disclosure, and a transmission system to which the transmission terminal is connected will be described. Second, referring to FIG. 42 through FIG. 47, an application example of a transmission terminal according to an embodiment will be described.

<<Overall Configuration of Transmission System>>

Figure 1:
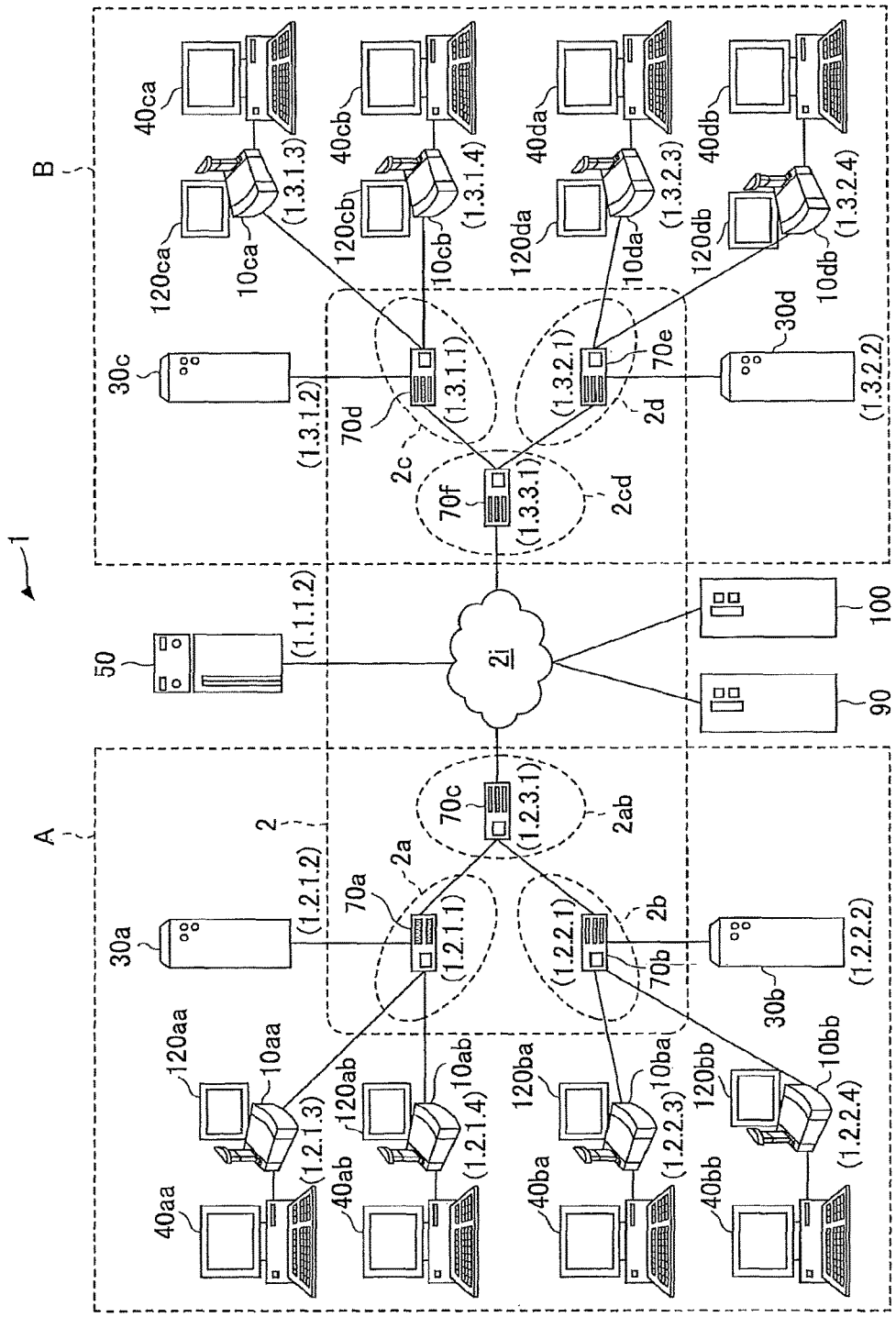
FIG. 1 is a schematic view of a transmission system according to an embodiment.

FIG. 1 is a schematic view of a transmission system 1 according to an embodiment.

The transmission system includes a data providing system in which content data is transmitted from a transmission terminal to another transmission terminal in one direction via a transmission management system, and a communication system in which information including emotional information is transmitted to each other among a plurality of transmission terminals via the transmission management system. The communication system is used for transmitting information including emotional information to each other among a plurality of communication terminals (corresponding to "transmission terminals") via a communication management system (corresponding to "transmission management system"). As an example of the communication system, a video conference system, a videophone system, an audio conference system, a personal computer (PC) screen sharing system, etc., can be listed.

In the following, it is assumed that a video conference system is an example of a communication system, and a video conference management system is an example of a communication management system. Further, it is assumed that a video conference terminal is an example of a communication terminal, and a transmission system, a transmission management system, and a transmission terminal will be described. In other words, a transmission terminal and a transmission management system according to the embodiment may be applied not only to a video conference system, but also to a communication system or a transmission system.

The transmission system 1 illustrated in FIG. 1 includes a plurality of transmission terminals (10aa, 10ab, . . . , 10db), displays (120aa, 120ab, . . . , 120db) for the transmission terminals (10aa, 10ab, . . . , 10db), a plurality of relay apparatuses (30a, 30b, 30c, 30d), a transmission management system 50, a program providing system 90, and a maintenance system 100.

It should be noted that, in the following description, any of the transmission terminals (10aa, 10ab, . . . , 10db) may be described as "transmission terminal 10", any of the displays (120aa, 120ab, . . . , 120db) may be described as "display 120", and any of the relay apparatuses (30a, 30b, 30c, 30d) may be described as "relay apparatus 30".

The transmission terminal 10 transmits and receives image data, audio data, etc., to and from another transmission terminal 10. In the following, a case will be described in which an image of the image data is a video image. However, the image may be not only a video image but also a still image. Further, the image of the image data may include both a video image and a still image. The relay apparatus 30 relays image data and audio data among a plurality of the transmission terminals 10. The transmission management system 50 manages the transmission terminals 10 and the relay apparatuses 30 in a centralized manner.

An external input apparatus 40 is connected to the transmission terminal 10, and transmits display data for displaying document data to the transmission terminal 10. Here, the document data indicates data used by, for example, document creation software, spreadsheet software, and presentation software.

Further, a plurality of routers (70a, 70b, . . . , 70f) select an optimal route of the image data and audio data. It should be noted that, in the following description, any of the routers (70a, 70b, . . . , 70f) may be described as "router 70". The program providing system 90 includes a hard disk (HD) (not shown) in which a transmission terminal program for realizing various functions or units of the transmission terminal 10 is stored, and is capable of transmitting the transmission terminal program to the transmission terminal 10. Further, the HD of the program providing system 90 also stores a relay apparatus program for realizing various functions or units of the relay apparatus 30, and the relay apparatus program can be transmitted to the relay apparatus 30. Further, the HD of the program providing system 90 also stores a transmission management program for realizing various functions or units of the transmission management system 50, and the transmission management program can be transmitted to the transmission management system 50.

Further, the transmission terminal 10aa, the transmission terminal 10ab, the relay apparatus 30a, and the router 70a are connected to each other and capable of communicating with each other via a LAN 2a. The transmission terminal 10ba, the transmission terminal 10bb, the relay apparatus 30b, and the router 70b are connected to each other and capable of communicating with each other via a LAN 2b. Further, the LAN 2a and the LAN 2b are connected to each other and capable of communicating with each other by a dedicated line 2ab including the router 70c. The LAN 2a and the LAN 2b are included in a predetermined area A. For example, the area A is Japan, the LAN 2a is included in an office in Tokyo, and the LAN 2b is included in an office in Osaka.

On the other hand, the transmission terminal 10ca, the transmission terminal 10cb, the relay apparatus 30c, and the router 70d are connected to each other and capable of communicating with each other via a LAN 2c. The transmission terminal 10da, the transmission terminal 10db, the relay apparatus 30d, and the router 70e are connected to each other and capable of communicating with each other via a LAN 2d. Further, the LAN 2c and the LAN 2d are connected to each other and capable of communicating with each other by a dedicated line 2cd including the router 70f. The LAN 2c and the LAN 2d are included in a predetermined area B. For example, the area B is the United States, the LAN 2c is included in an office in New York, and the LAN 2d is included in an office in Washington D.C. The area A and the area B are connected to each other and capable of communicating with each other via the Internet 2i through the respective routers 70c and 70f.

Further, the transmission management system 50 and the program providing system 90 are connected to the transmission terminal 10 and the relay apparatus 30 and capable of communicating with the transmission terminal 10 and the relay apparatus 30 via the Internet 2i. The transmission management system 50 and the program providing system 90 may be included in the area A or in the area B, or may be included in an area other than the areas A and B.

Here, the LAN 2a, the LAN 2b, the dedicated line 2ab, the Internet 2i, the dedicated line 2cd, the LAN 2c, and the LAN 2d are included in a communication network 2.

Further, in FIG. 1, a set of four numbers indicated under each transmission terminal 10, each relay apparatus 30, the management system 50, each router 70, and the program providing system 90 illustrates a typical IP address of IPv4 in a simplified manner. For example, an IP address of the transmission terminal 10aa is "1. 2. 1. 3". Further, instead of IPv4, IPv6 may be used. For the sake of convenience, IPv4 will be used in the following description.

<<Hardware Structure>>

Next, a hardware structure according to an embodiment will be described.

Figure 2:
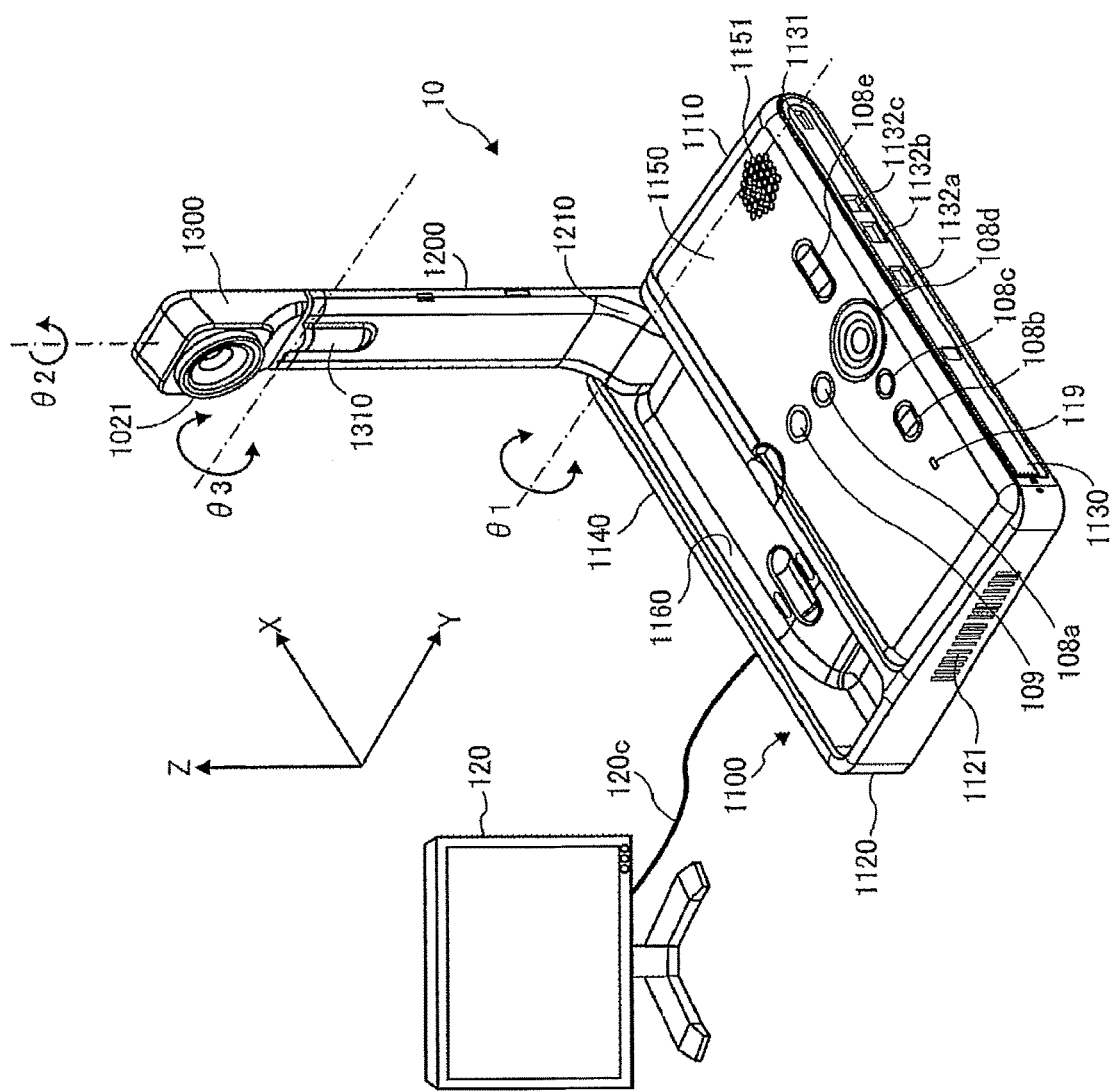
FIG. 2 is an external view of a transmission terminal according to an embodiment.

FIG. 2 is an external view of a transmission terminal 10 according to the embodiment. In the following description, it is assumed that a longitudinal direction of the transmission terminal 10 is an X axis direction, a direction orthogonal to the X axis in a horizontal plane is a Y axis direction, and a direction orthogonal to the X axis direction and the Y axis direction (vertical direction) is a Z axis direction.

As illustrated in FIG. 2, the transmission terminal 10 includes a housing 1100, an arm 1200, and a camera housing 1300. In a front wall 1110 of the housing 1100, there is an air intake surface (not shown) formed by a plurality of air intake holes, and, in an rear wall 1120 of the housing 1100, there is an air exhaust surface 1121 formed by a plurality of air exhaust holes. With the above arrangement, by driving a cooling fan embedded in the housing 1100, it becomes possible to take in air in rear of the transmission terminal 10 through the air intake surface (not shown), and to exhaust the air to the rear of the transmission terminal 10 through the air exhaust surface 1121. In a right side wall 1130 of the housing 1100, a sound pickup hole 1131 is formed, and, by using a built-in mike 114 which will be described later, sound such as voice, sound of things, noise, etc., can be picked up.

In the right wall 1130 side of the housing 1100, an operation panel 1150 is formed. In the operation panel 1150, there are a plurality of operation buttons (108a through 108e), a power supply switch 109, and an alarm lamp 119, which will be described later. Also, a sound output surface 1151 is formed in the operation panel 1150, which is formed by a plurality of sound output holes used for passing output sound from a built-in speaker 115 which will be described later. Further, in the left wall 1140 side of the housing 1100, a housing portion 1160 is formed as a concave portion for housing the arm 1200 and the camera housing 1300. In the right wall 1130 of the housing 1100, a plurality of connection ports (1132a through 1132c) are formed for electrically connecting cables to an external device connection interface 118 which will be described later. On the other hand, in the left wall 1140 of the housing 1100, a connection port (not shown) is formed for electrically connecting a cable 120c of a display 120 to the external device connection interface 118.

It should be noted that, in the following, an arbitrary operation button of the operation buttons (108a through 108e) will be described as "operation button 108", and an arbitrary connection port of the connection ports (1132a through 1132c) will be described as "connection port 1132".

Next, the arm 1200 is attached to the housing 1100 via a torque hinge 1210, and the arm 1200 is capable of rotating in upward and downward directions within a range of tilt angle θ1 of 135 degrees relative to the housing 1100. FIG. 2 illustrates a state in which the tilt angle is 90 degrees.

In the camera housing 1300, there is a built-in camera 1021 which is capable of taking images of a user, a document, a room, etc. Further, in the camera housing 1300, a torque hinge 1310 is formed. The camera housing 1300 is attached to the arm 1200 via the torque hinge 1310. Further, the camera housing 1300 is attached to the arm 1200 via the torque hinge 1310, and is capable of rotating in a right-and-left direction within a range of +/−180 degrees of pan angle θ2, and rotating in an up-and-down direction within a range of +/−45 degrees of tilt angle θ3, with respect to the arm 1200, assuming that FIG. 2 illustrates a state in which θ2 and θ3 are zero degrees.

It should be noted that external views of the relay apparatus 30, the transmission management system 50, and the program providing system 90 are the same as an external view of a typical server computer, and thus, descriptions of the external views will be omitted.

Figure 3:
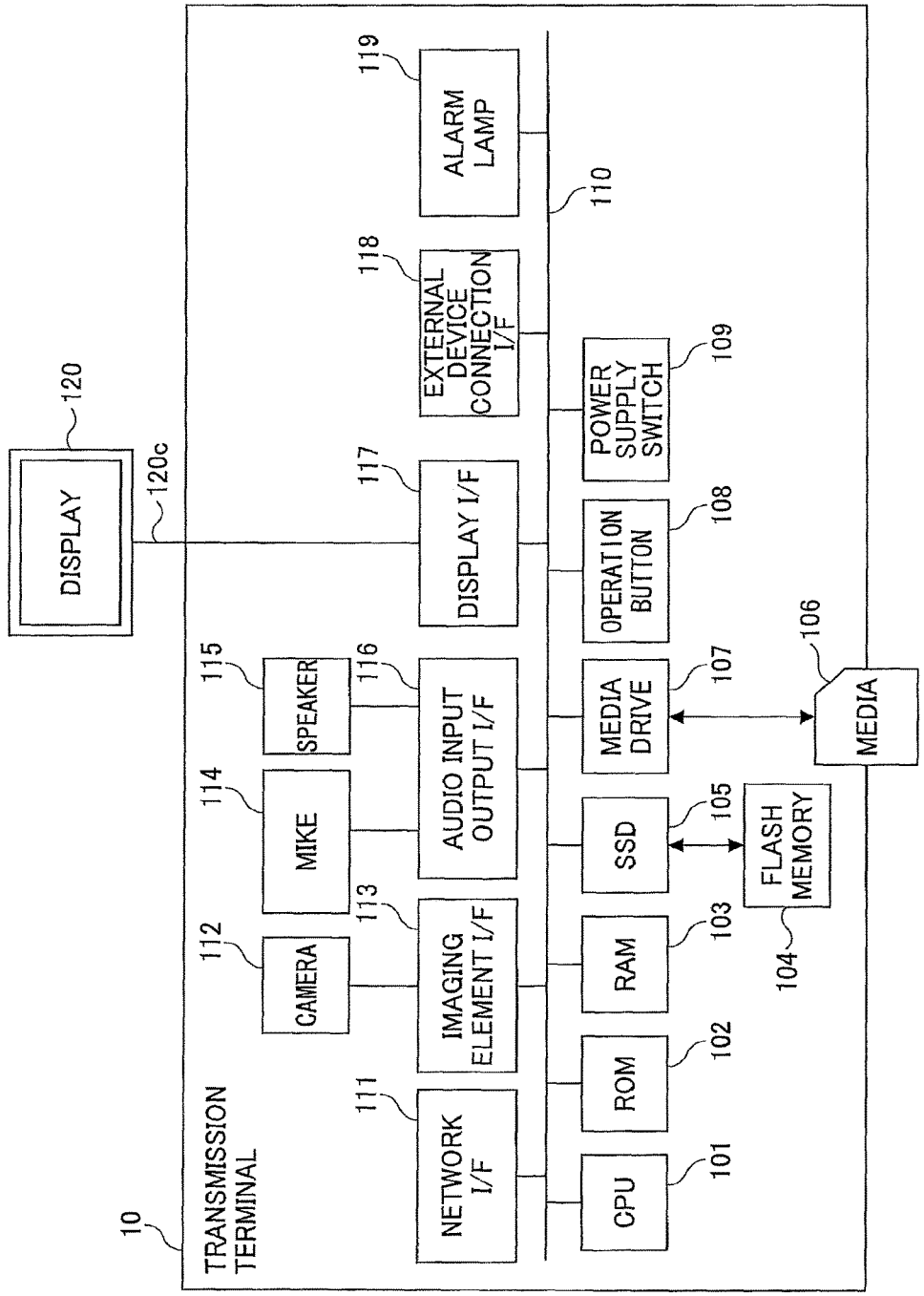
FIG. 3 is a hardware configuration of the transmission terminal according to an embodiment.

FIG. 3 is a hardware configuration of a transmission terminal 10 according to an embodiment. As illustrated in FIG. 3, the transmission terminal 10 according to the embodiment includes a central processing unit (CPU) 101 for controlling an entire operation of the transmission terminal 10, a read only memory (ROM) 102 used for storing the transmission terminal program, a random access memory (RAM) 103 used for a work area of the CPU 101, a flash memory 104 for storing various data items including image data, audio data, etc., a solid state drive (SSD) 105 used for writing and reading various data items to and from the flash memory 104 according to the control of the CPU 101, a media drive 107 used for reading and writing (storing) various data items from and to recording media 106 such as a flash memory, an operation button 108 used for selecting a destination of the transmission terminal 10, a power supply switch 109 used for switching ON/OFF of the power supply of the transmission terminal 10, a network I/F 111 used for data transmission via the communication network 2 which will be described later, a charge coupled device (CCD) 112 used for taking an image of an object and obtaining image data according to the control of the CPU 101, an imaging element I/F 113 for controlling the driving of the camera 112, a mike 114 used for inputting audio, a speaker 115 used for outputting the audio, an audio input output I/F 116 used for processing input and output of an audio signal between the mike 114 and the speaker 115 according to the control of the CPU 101, a display I/F 117 for transmitting image data to the external display 120 according to the control of the CPU 101, an external apparatus I/F 118 used for transmitting and receiving various data items to and from an external apparatus, an alarm lamp 119 used for notifying an error of various functions of the transmission terminal 10, and a bus line 110 including an address bus and a data bus for electrically connecting the above elements with each other as illustrated in FIG. 3.

The display 120 is a display unit which includes a liquid crystal or an organic electroluminescence (EL) display used for displaying an image of a subject, an operation icon, or the like. Further, the display 120 is connected to the display I/F 117 via the cable 120c. The cable 120c may be a cable for an analog RGB (VGA) signal, a cable for a component video, or a cable for a signal of High-Definition Multimedia Interface (HDMI) (registered trademark) or Digital Video Interactive (DVI).

The camera 112 includes a lens and a solid-state image sensing device which is used for converting light into electric charges and digitizing the subject image, and as the solid-state image sensing device, Complementary Metal Oxide Semiconductor (CMOS), Charge Coupled Device (CCD), etc., are used.

To the external device connection I/F 118, via a Universal Serial Bus (USB) cable, or the like, which is inserted into the connection port 1132 of the housing 1100 illustrated in FIG. 2, external devices such as an external camera, an external mike, and an external speaker can be electrically connected. In the case where the external camera is connected, according to the control of the CPU 101, priority is given to the external camera to be driven over the built-in camera 112. Similarly, in the case where an external mike is connected or an external speaker is connected, according to the control of the CPU 101, priority is given to the external mike or the external speaker to be driven over the built-in mike 114 or the built-in speaker 115, respectively.

It should be noted that the recording medium 106 is detachable from the transmission terminal 10. Further, it is not limited to the flash memory 104 that is used, and, electrically erasable and programmable ROM (EEPROM), or the like may be used as long as it is a non-volatile memory to/from which data is written/read according to the control of the CPU 101. Further, the camera 112 is a solid-state image sensing device which is used for converting light into electric charges and digitizing the subject image, and as the solid-state image sensing device, Complementary Metal Oxide Semiconductor (CMOS), Charge Coupled Device (CCD), etc., may be used as long as a subject image can be taken. Further, the display 120 includes a liquid crystal or an organic electroluminescence (EL) display used for displaying an image of a subject, an operation icon, or the like.

Further, the transmission terminal program may be recorded in a computer-readable recording medium such as the recording medium 106 as a file of installable format or executable format, and may be distributed.

Figure 4:
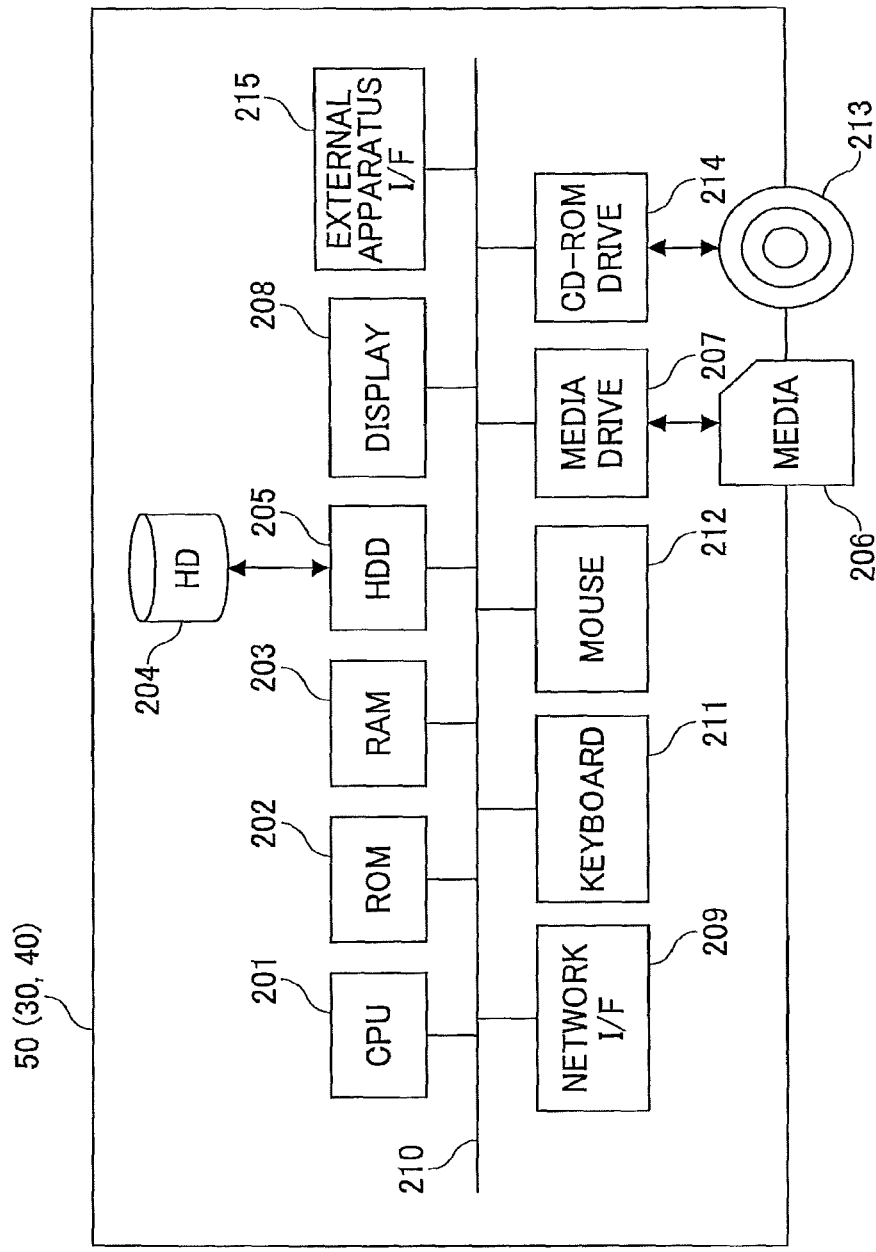
FIG. 4 is a hardware configuration diagram of a transmission management system, a relay apparatus, a program providing server, or an external input apparatus according to an embodiment.

FIG. 4 is a hardware configuration diagram of a transmission management system 50 according to an embodiment. The management system 50 includes a CPU 201 for controlling overall operations of the transmission management system 50, a ROM 202 used for storing a transmission management program, a RAM 203 used for a work area of the CPU 201, a hard disk (HD) 204 for storing various data items, a hard disk drive (HDD) 205 for controlling the data read and write of the HD 204 according to the control of the CPU 201, a media drive 207 for controlling data read and write (storage) of a recording medium 206 including a flash memory, a display device 208 for displaying various information items including a cursor, a menu, a window, a character, or an image, a network I/F 209 for performing data communications by using the communication network 2, a keyboard 211 including a plurality of keys for inputting a character, a numerical value, various instructions, etc., a mouse 212 for selecting and executing the various instructions, selecting a process target, moving the cursor, or the like, a compact disc read only memory (CD-ROM) drive 214 for controlling data read of a CD-ROM 213 as an example of a detachable recording medium, an external apparatus I/F 215 for transmitting and receiving data to and from an external apparatus, and a bus line 210 such as an address bus, a data bus, etc., for electrically connecting the above elements as illustrated in FIG. 4.

It should be noted that the transmission management program may be recorded in a computer-readable recording medium including the recording medium 206 and the CD-ROM 213 as a file of installable format or executable format, and may be distributed.

Further, because the external input apparatus 40 has a similar hardware structure as the transmission management system 50, the descriptions may be omitted. In the case of the external input apparatus 40, however, an external input apparatus program for controlling the external input apparatus 40 is recorded in the ROM 202. Also, in this case, the external input apparatus program may be recorded in a computer-readable recording medium including the recording medium 206 and the CD-ROM 213 as a file in an installable format or an executable format, and may be distributed.

Further, because the relay apparatus 30 includes a similar hardware configuration as the transmission management system 50, the descriptions may be omitted. In the case of the relay apparatus 30, however, a relay apparatus program for controlling the relay apparatus 30 is stored in the ROM 202. Also, in this case, the relay apparatus program may be recorded in a computer-readable recording medium including the recording medium 206 and the CD-ROM 213 as a file in an installable format or an executable format, and may be distributed.

Further, because the program providing system 90 has a similar hardware structure as the transmission management system 50, the descriptions may be omitted. In the case of the program providing system 90, however, a program providing program for controlling the program providing system 90 is recorded in the ROM 202. Also, in this case, the program providing program may be recorded in a computer-readable recording medium including the recording medium 206 and the CD-ROM 213 as a file of installable format or executable format, and may be distributed.

Further, the maintenance system 100 is a computer for maintaining or managing at least one of the transmission terminal 10, the relay apparatus 30, the transmission management system 50, and the program providing system 90. For example, in the case where the maintenance system 100 is located in a country and the transmission terminal 10, the relay apparatus 30, the transmission management system 50 or the program providing system 90 is located in a foreign country, the maintenance system 100 remotely maintains or manages at least one of the transmission terminal 10, the relay apparatus 30, the transmission management system 50 and the program providing system 90 via the communication network 2.

Further, the maintenance system 100 performs management of a model number, a serial number, a sales destination, a record of maintenance and inspection, a record of failure, or the like, without using the communication network 2.

Further, the program providing system 30 and the maintenance system 100 have a similar hardware configuration as the above transmission management system 50, and thus, the descriptions will be omitted. In the case of the program providing system 90, however, a program providing program for controlling the program providing system 90 is recorded in the ROM 204. Also, in this case, the program providing program may be recorded in a computer-readable recording medium including the recording medium 206 and the CD-ROM 213 as a file of installable format or executable format, and may be distributed. Further, the program providing system program may be stored in the ROM 202 instead of the HD 204.

It should be noted that, as another example of a detachable recording medium, a computer-readable recording medium including a compact disc recordable (CD-R), a digital versatile disk (DVD), a Blu-ray disc, etc., may be used.

<<Functional Structures>>

Figure 5A:
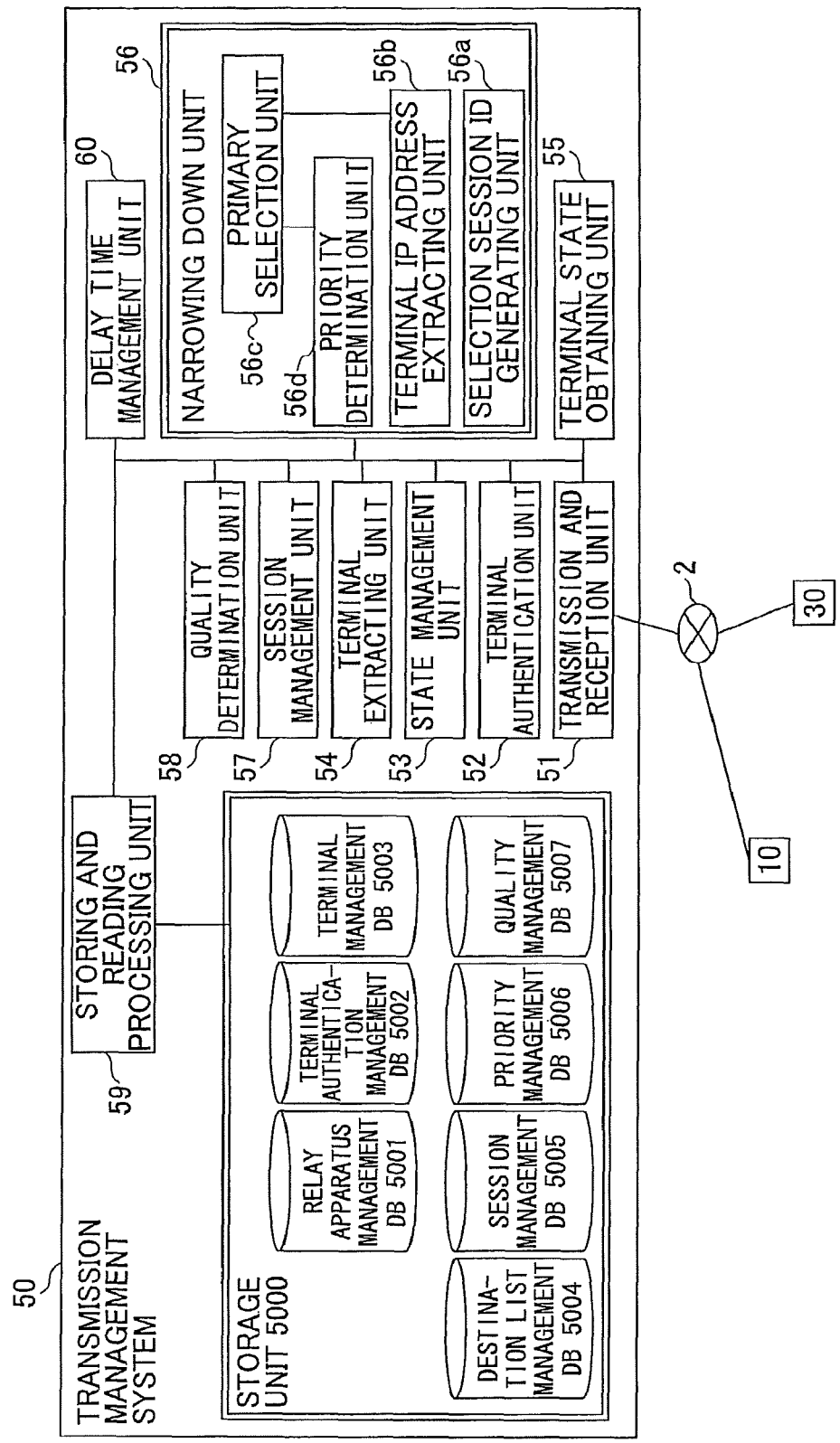
FIG. 5A is a functional block diagram of a terminal, an apparatus, and a system included in a transmission system according to an embodiment.
Figure 24:
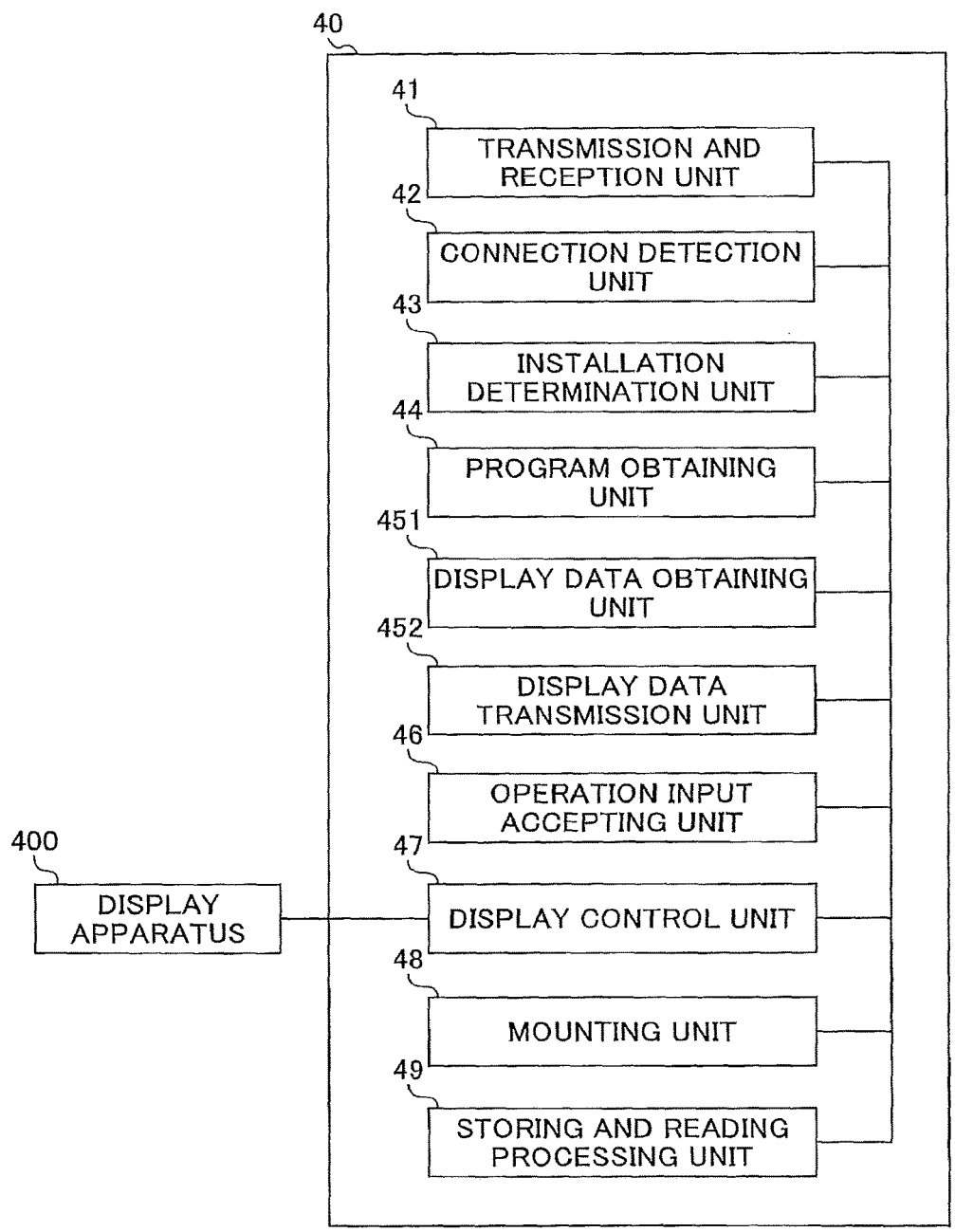
FIG. 24 is a functional block diagram of an external input apparatus.

Next, functional structures according to the embodiment will be described. FIGS. 5A and 5B are functional block diagrams of a terminal, an apparatus, and a system included in a transmission system 1 according to an embodiment. In FIGS. 5A and 5B, the transmission terminal 10, the relay apparatus 30, and the transmission management 50 are connected to each other to perform data communications via the communication network 2. The external input apparatus 40 is connected to the transmission terminal 10 and capable of performing data communications with the transmission terminal 10. Further, FIG. 24 is a functional block diagram of the external input apparatus 40 included in the transmission system 1 according to the embodiment. Further, the program providing system 90 illustrated in FIG. 1 is omitted in FIGS. 5A and 5B because the program providing system 90 is not directly related to video conference communications.

<Functional Structure of Transmission Terminal>

The transmission terminal 10 includes a transmission and reception unit 11, an operation input accepting unit 12, a login request unit 13, an imaging unit 14*a*, an image display control unit 14*b*, an audio input unit 15*a*, an audio output unit 15*b*, a selection processing unit 16, a delay detection unit 17, an external information transmission and reception unit 18, and a storing and reading processing unit 19. The above units are functions or means which are realized by any of the elements illustrated in FIG. 3 which operates according to instructions from the CPU 201 which executes programs stored in the ROM 202. Further, the transmission terminal 10 includes a storage unit 1000 including the SSD 105 illustrated in FIG. 3.

(Functional Units of Transmission Terminal)

Next, units of the transmission terminal 10 will be described in detail. A transmission and reception unit 11 of the transmission terminal 10 is realized by the network I/F 111 illustrated in FIG. 3, and performs transmitting and receiving data (information) to and from other terminals, apparatuses, or systems via the communication network 2. The operation input accepting unit 12 is realized by an operation button 108 and a power supply switch 109 illustrated in FIG. 3, and accepts various inputs from a user. For example, when the user turns on the power supply switch 109, the operation input accepting unit 12 illustrated in FIG. 5B accepts an input of power supply ON, and turns on the power supply. The login request unit 13 is realized by instructions from the CPU 101 illustrated in FIG. 3, and, upon accepting the power supply ON input, automatically transmits login request information indicating a login request and a current IP address of the transmission terminal 10*ab* from the transmission and reception unit 11 to the transmission management system 50 via the communication network 2.

The imaging unit 14*a* is realized by the camera 112 and the imaging element I/F 113 illustrated in FIG. 3, takes an image of a subject, and outputs the taken image data.

The image display control unit 14*b* is realized by the display I/F 117, and controls transmission of image data to the external display 120.

Figure 29:
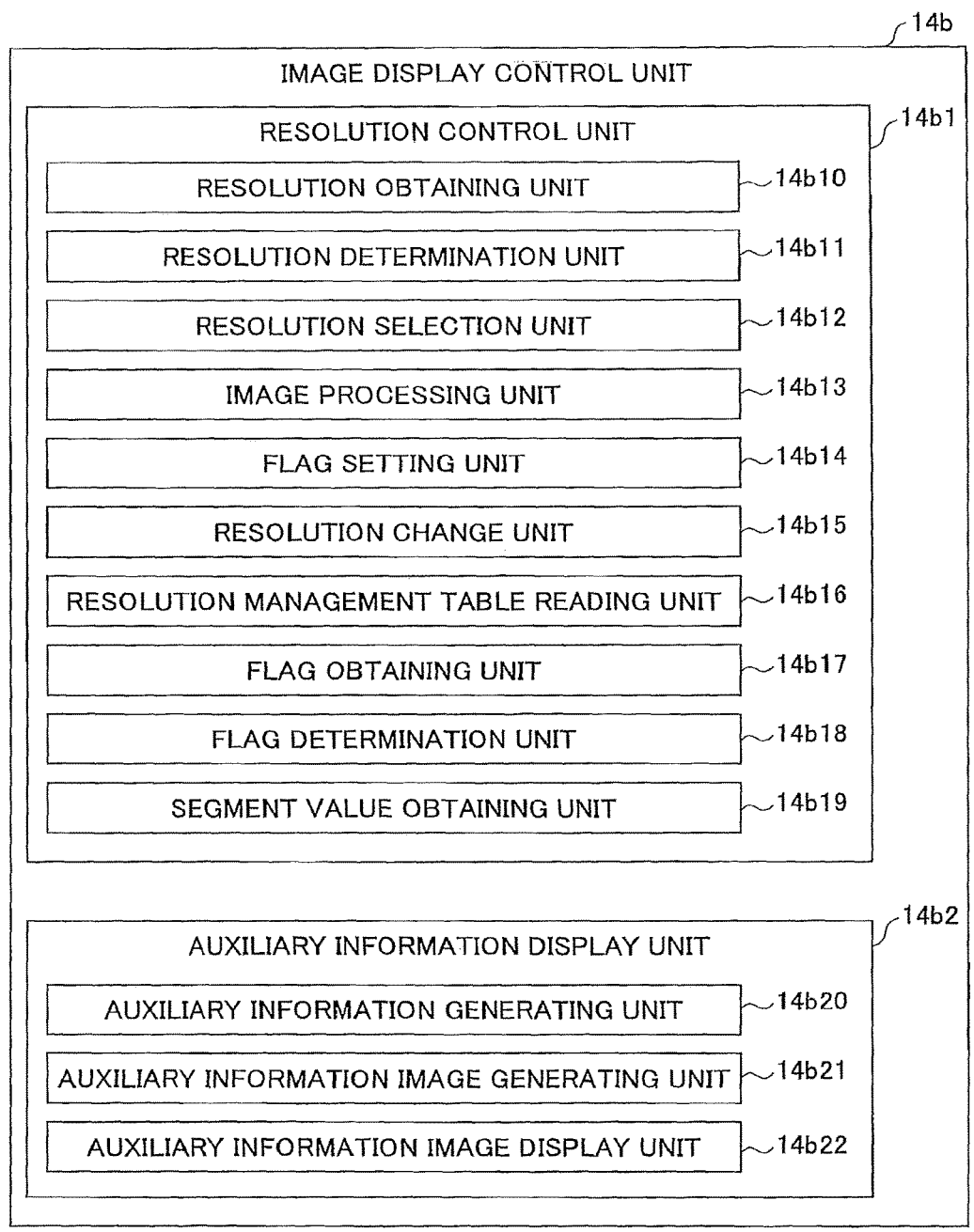
FIG. 29 is a drawing illustrating an example of a structure of an image display control unit.

As illustrated in FIG. 29, the image display control unit 14*b* includes a resolution control unit 14*b*1 for properly controlling resolution of output image data according to the resolution of the connected display (display apparatus) 120, and an auxiliary information display unit 14*b*2 for controlling the displaying of auxiliary information such as an operation menu, an error message, etc.

The resolution control unit 14*b*1 includes a resolution obtaining unit 14*b*10 for obtaining a plurality of resolutions which can be displayed on the display 120, the currently displaying resolution, or, in the case where there is a resolution management table, a resolution extracted from data read from the resolution management table; a resolution determination unit 14*b*11 for determining whether a resolution satisfies a predetermined condition; a resolution selection unit 14*b*12 for selecting a resolution from the plurality of the resolutions which can be displayed on the display 120 based on the predetermined condition; an image processing unit 14*b*13 for performing a process such as expansion and compression of the image data, addition of a segment area to the image data as necessary, etc., a flag setting unit 14*b*14 for setting an overlap flag; and a resolution change unit 14*b*15 for changing to a selected resolution. Further, the resolution control unit 14*b*1 includes a resolution management table reading unit 14*b*16 for reading a data line from the resolution management table, a flag obtaining unit 14*b*17 for obtaining the overlap flag from the read data line, a flag determination unit 14*b*18 for determining a value of the overlap flag, and a segment value obtaining unit 14*b*19 for obtaining a segment value from the data line read from the resolution management table.

The auxiliary information display unit 14*b*2 includes an auxiliary information generation unit 14*b*20 for generating auxiliary information such as an operation menu, an error message, etc., an auxiliary information image generation unit 14*b*21 for generating an auxiliary information image, and an auxiliary information image display unit 14*b*22 for synthesizing the generated auxiliary information image with the original image data and displaying the synthesized result on the display 120.

FIG. 30 illustrates an example of data used for the control by the image display control unit 14*b*. The example includes items such as "current display resolution", "displayable resolutions", "overlap flag", "segment position", "auxiliary information display position", and "display content". A currently set display resolution (width, height) obtained by the resolution obtaining unit 14*b*10 from the display 120 is temporarily retained as the "current display resolution". A typical display 120 internally retains information on currently set display resolution, which can be referenced from outside. A single or a plurality of resolutions (width, height) displayable by the display 120, obtained by the resolution obtaining unit 14*b*10 from the display 120, are temporarily retained as the "displayable resolutions". A typical display 120 has a plurality of display resolutions and internally retains information on displayable resolutions, which can be referenced from outside. It should be noted that "current display resolution" and the "displayable resolutions" are indicated together with an aspect ratio in parentheses. The aspect ratio can be calculated from resolution, and thus, can be omitted. The "overlap flag" is a flag indicating whether the auxiliary information should be superimposed on the original image data. In the case where the auxiliary information should not be superimposed on the original image data, the auxiliary information is meant to be displayed in the added segment area. The "segment position" is information indicating a position at which the segment area is added. The "auxiliary information display position" is information indicating a position at which the auxiliary information is displayed. The "display content" is information indicating the auxiliary information content. Other than the above items, a setting value, etc., used for making the background semitransparent when the auxiliary information is displayed, may be retained.

The audio input unit 15a is realized by the mike 114 and the audio input output I/F 116 illustrated in FIG. 3. When voice of a user is input, the input voice is converted to an audio signal, and audio data according to the audio signal is output. The audio output unit 15b is realized by the speaker 115 and the audio input output I/F 116, converts the audio data according to the audio signal into voice, and outputs the voice.

The selection processing unit 16 performs a process of narrowing down a plurality of the relay apparatuses 30 to a final relay apparatus 30, is realized by instructions from the CPU 101 illustrated in FIG. 3, and includes a measurement unit 16a, a calculation unit 16b, and a selection unit 16c. The measurement unit 16a measures reception date and time every time prior transmission information, which will be described later, is received by the transmission and reception unit 11. The calculation unit 16b calculates time required from transmission to reception of the prior transmission information based on a difference between the measured reception date and time and transmission date and time included in the prior transmission information. The selection unit 16c selects a final single relay apparatus 30 by selecting the relay apparatus 30 which has relayed the prior transmission information with the shortest required time calculated by the calculation unit 16b.

The delay detection unit 17 is realized by instructions from the CPU 101, and detects delay time (ms) of the image data or the audio data transmitted from the other transmission terminal 10 via the relay apparatus 30. Further, the external information transmission and reception unit 18 transmits and receives data to and from the external apparatus via the external apparatus I/F 215. Further, the storing and reading processing unit 19 is realized by the SSD 105 illustrated in FIG. 3, stores various data items in the storage unit 1000, and reads the data items stored in the storage unit 1000. The storage unit 1000 stores a terminal identification (ID) for identifying an transmission terminal 10, a password, image data, audio data, a relay apparatus ID for identifying a relay apparatus 30 used for transmitting data, an IP address of a destination terminal, etc. Further, the storage unit 1000 stores a display data obtaining unit 451 and display data transmission unit 452, which are transmitted to the external input apparatus 40 and which run on the external input apparatus 40. The display data obtaining unit 451 obtains display data of the external input apparatus 40. The display data transmission unit 452 transmits the display data obtained by the display data obtaining unit 451 to the transmission terminal 10. The display data indicates image data obtained from an image displayed on a screen of the display apparatus by converting the image to image data of a format including joint photographic experts group (JPEG), Bitmap, etc., or by converting the image to a drawing command of format including a graphics device interface (GDI), etc.

It should be noted that, in the embodiment, the terminal ID and the relay apparatus ID which will be described later indicate identification information items used for uniquely identifying a transmission terminal 10 and uniquely identifying a relay apparatus 30, respectively, including a language, a character, a symbol, or various marks. Further, the terminal ID and the relay apparatus ID may be identification information in which at least two of a language, a character, a symbol, and various marks are combined. Further, in the following description, it is assumed that the transmission terminal 10 as a request source requesting a start of a video conference is a "request source terminal 10A", and that the transmission terminal 10 as a request destination is a "destination terminal 10B".

<Functional Structure of External Input Apparatus>

As illustrated in FIG. 24, the external input apparatus 40 includes a transmission and reception unit 41, a connection detection unit 42, an installation determination unit 43, a program obtaining unit 44, an operation input accepting unit 46, a display control unit 47, a mounting unit 48, and a storing and reading processing unit 49. The above units are functions or means which are realized by any of the elements illustrated in FIG. 4 which operates according to instructions from the CPU 201 which executes programs stored in the ROM 202. Further, the external input apparatus 40 includes a storage unit 4000 including the HDD 205 illustrated in FIG. 4. Further, an operating system (OS) including Windows (registered trademark) is installed in the external input apparatus 40. As a result, the external input apparatus 40 is capable of executing a program when connected to another apparatus.

<Functions of External Input Apparatus>

Next, units of the external input apparatus 40 will be described in detail. The transmission and reception unit 41 of the external input apparatus 40 is realized by a network I/F 209 illustrated in FIG. 4, and transmits and receives various data (information) items to and from the transmission terminal 10. The connection detection unit 42 detects a state in which data transmission and reception to and from an external apparatus via an external apparatus I/F 215 is available. The installation determination unit 43 determines whether the display data obtaining unit 451 and the display data transmission unit 452 are installed in the external input apparatus 40. The program obtaining unit 44 obtains the display data obtaining unit 451 and the display data transmission unit 452 from the storage unit 1000 of the transmission terminal 10 connected via the transmission and reception unit 41. The operation input accepting unit 46 accepts an operational input from a user. The display control unit 47 displays images read by the storing and reading processing unit 49, which will be described later, on the display apparatus 400. The mounting unit 48 has mounted storage units of various apparatuses connected to the external input apparatus 40. The storing and reading processing unit 49 is realized by the HDD 205 illustrated in FIG. 4, and performs a process of storing various data items in the storage unit 4000 and reading the data items stored in the storage unit 4000. The storage unit 4000 stores document data, etc.

<Functional Structure of Relay Apparatus>

Next, functions or means of a relay apparatus 30 will be described. The relay apparatus 30 includes a transmission and reception unit 31, a state detection unit 32, a data quality checking unit 33, a change quality management unit 34, a data quality change unit 35, and a storing and reading processing unit 39. The above units are functions or means which are realized by any of the elements illustrated in FIG. 4 which operates according to instructions from the CPU 201 which executes programs stored in the ROM 202.

Further, the relay apparatus 30 includes a storage unit 3000 including the HD 204 illustrated in FIG. 4.

(Change Quality Management Table)

The storage unit 3000 includes a change quality management DB 3001 including a change quality management table as illustrated in FIG. 7. In the change quality management table, an IP address of the transmission terminal 30 as a relay destination of image data is associated with image quality of the image data which are relayed to the relay destination by the relay apparatus 30.

Figure 6A:
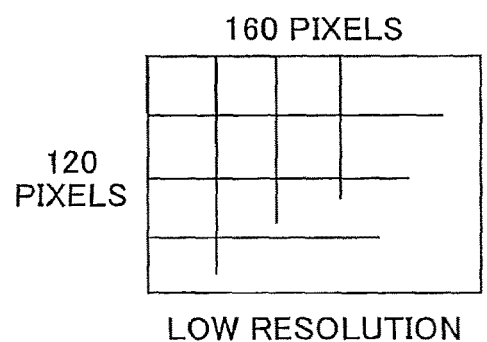
FIG. 6A is a drawing illustrating image quality of image data.
Figure 6B:
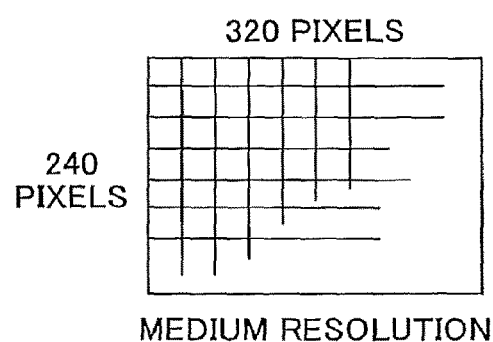
FIG. 6B is a drawing illustrating image quality of image data.
Figure 6C:
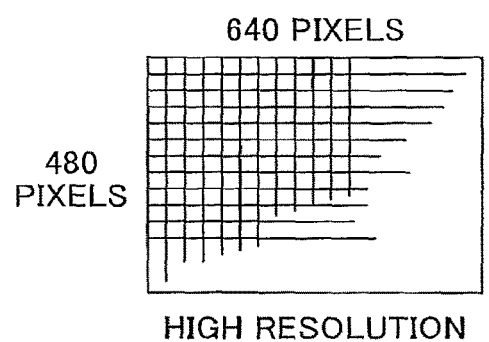
FIG. 6C is a drawing illustrating image quality of image data.

Here, the resolution of an image of the image data handled in the embodiment will be described. There are an image with low resolution, which serves as a base image and includes 160 pixels in the horizontal direction and 120 pixels in the vertical direction as illustrated in FIG. 6A, an image with medium resolution, which includes 320 pixels in the horizontal direction and 240 pixels in the vertical direction as illustrated in FIG. 6B, and an image with high resolution, which includes 640 pixels in the horizontal direction and 480 pixels in the vertical direction as illustrated in FIG. 6C. In the case where the image data is relayed through a narrow band route, low quality image data including only image data with low resolution which serves as a base image is relayed. In the case where the image data is relayed through a relatively wide band route, medium quality image data including image data with low resolution which serves as a base image and image data with medium resolution is relayed. Further, in the case where the image data is relayed through a very wide band route, high quality image data including image data with low resolution which serves as a base image, image data with medium resolution and image data with high resolution is relayed. For example, in the change quality management table illustrated in FIG. 7, in the case where the relay apparatus 30 relays image data to the destination terminal 10db with an IP address "1.3.2.4", an image quality (quality of image) of the relayed image data is "high quality".

<Functional Units of Relay Apparatus>

Next, a functional configuration of the relay apparatus 30 will be described in detail. It should be noted that, in the following description, when the functional units of the relay apparatus 30 are described, relations between the functional units and main elements used for realizing the functional units of the relay apparatus 30 will be also described.

A transmission and reception unit 31 of the relay apparatus 30 illustrated in FIG. 5B is realized by the network I/F 209 illustrated in FIG. 4, and performs transmitting and receiving various data (information) items to and from other terminals, apparatuses, or systems via the communication network 2. The state detection unit 32 is realized by instructions from the CPU 201 illustrated in FIG. 4, and detects an operational state of the relay apparatus 30 that includes the state detection unit 32 itself. As an operational state, there is a state such as "ONLINE", "OFFLINE", or "OUT OF ORDER".

The data quality checking unit 33 is realized by instructions from the CPU 201 illustrated in FIG. 4, and, checks image quality of the relayed image data by using an IP address of the destination terminal 10B as a search key, searching the change quality management table (refer to FIG. 7), and extracting image quality of the corresponding relayed image data. The change quality management unit 34 is realized by instructions from the CPU 201 illustrated in FIG. 4, and changes contents of the change quality management DB 3001 based on quality information, which will be described later, transmitted by the transmission management system 50. For example, in the case where, when a video conference is held between a request source terminal 10aa with a terminal ID "01aa" and a destination terminal 10db with a terminal ID "01db" by performing transmission and reception of image data with high image quality, a delay in receiving image data occurs at the destination terminal 10db due to the start of another video conference between a request source terminal 10bb and a destination terminal 10ca via the communication network 2, it is necessary for the relay apparatus 30 to change the image quality of the relayed image data from high image quality to medium image quality. In this case, the contents of the change quality management DB 3001 are changed so that the image quality of the image data relayed by the relay apparatus 30 is changed from high image quality to medium image quality based on the quality information indicating medium image quality.

The data quality change unit 35 is realized by instructions from the CPU 201 illustrated in FIG. 4, and changes image quality of the image data transmitted from the transmission source terminal 10 based on the changed contents of the change quality management DB 3001. The storing and reading processing unit 39 is realized by the HDD 205 illustrated in FIG. 4, and performs a process of storing data in the storage unit 3000 and reading the data stored in the storage unit 3000.

<Functional Structure of Transmission Management System>

Next, functions or means of a transmission management system 50 will be described. The transmission management system 50 includes a transmission and reception unit 51, a terminal authentication unit 52, a state management unit 53, a terminal extracting unit 54, a terminal state obtaining unit 55, a narrowing down unit 56, a session management unit 57, quality determination unit 58, a storing and reading processing unit 59, and a delay time management unit 60. The above units are functions or means which are realized by any of the elements illustrated in FIG. 4 which operates according to instructions from the CPU 201 which executes programs stored in the ROM 202. Further, the transmission management system 50 includes a storage unit 5000 including the HD 204 illustrated in FIG. 4.

(Relay Apparatus Management Table)

The storage unit 5000 includes a relay apparatus management DB 5001 including a relay apparatus management table as illustrated in FIG. 8. In the relay apparatus management table, for each relay apparatus ID of relay apparatus 30, the relay apparatus ID is associated with an operational state of the relay apparatus 30, receive date and time when state information indicating the operational state is received by the transmission management system 50, an IP address of the relay apparatus 30, and a maximum data transmission speed (Mbps) of the relay apparatus 30. For example, it is illustrated in the relay apparatus management table in FIG. 8, that, regarding the relay apparatus 30a with a relay apparatus ID "111a", the operational state is "ONLINE", date and time when the state information is received by the transmission management system 50 is "Nov. 10, 2009, 13:00", an IP address of the relay apparatus 30a is "1.2.1.2", and the maximum transmission speed of the relay apparatus 30a is 100 Mbps.

(Terminal Authentication Management Table)

Further, in the memory unit 5000, a terminal authentication management DB 5002 including the terminal authentication management table as illustrated in FIG. 9 is included. In the terminal authentication management table, for each of the terminal IDs of the transmission terminals 10 managed by the transmission management system 50, the terminal ID is associated with a password. For example, it is illustrated in the terminal authentication management table illustrated in FIG. 9, that a terminal ID of the transmission terminal 10aa is "01aa", and the associated password is "aaaa".

(Terminal Management Table)

Further, in the storage unit 5000, a terminal management DB 5003 including the terminal management table as illustrated in FIG. 10 is included. In the terminal management table, for each of terminal IDs of the transmission terminals 10, the terminal ID is associated with an operational state of the transmission terminal 10, receive date and time when login request information, which will be described below, is received by the transmission management system 50, and an IP address of the transmission terminal 10. For example, in the terminal management table of FIG. 10, it is illustrated that an operational state of the transmission terminal 10aa with a terminal ID "01aa" is "ONLINE", receive date and time when login request information is received by the transmission management system 50 is "Nov. 10, 2009, 13:40", and an IP address of the transmission terminal 10 is "1. 2. 1. 3".

(Destination List Management Table)

Further, in the storage unit 5000, a destination list management DB 5004 including a destination list management table as illustrated in FIG. 11 is included. In the destination list management table, a terminal ID of a request source terminal 10A that requests a start of a video conference is associated with terminal IDs of all destination terminals 10B registered as a candidate of the destination terminal 10B. For example, it is illustrated in the destination list management table illustrated in FIG. 11, that the candidates of the destination terminal 10B to which the request source terminal 10aa with a terminal ID "01aa" can transmit a video conference start request are a transmission terminal 10ab with a terminal ID "01ab", a transmission terminal 10ba with a terminal ID "01ba", and a transmission terminal 10db with a terminal ID "01db". The candidates of destination terminal 10B are updated according to an addition request or a delete request from the request source terminal 10A to the transmission management system 50.

(Session Management Table)

Further, in the storage unit 5000, a session management DB 5005 including a session management table as illustrated in FIG. 12 is included. In the session management table, for each selection session ID used for performing a session for selecting the relay apparatus 30, the selection session ID is associated with a relay apparatus ID of the relay apparatus 30 used for relaying image data and audio data, a terminal ID of the request source terminal 10A, a terminal ID of the destination terminal 10B, reception delay time (ms) when the image data is received by the destination terminal 10B, and date and time when delay information indicating the delay time transmitted by the destination terminal 10B is received by the transmission management system 50. For example, it is illustrated in the session management table illustrated in FIG. 12 that the relay apparatus 30a (relay apparatus ID "111a"), selected in a session executed using a selection session ID "se1", relays image data and audio data between a request source terminal 10aa with a terminal ID "01aa" and a destination terminal 10db with a terminal ID "01db", and that delay time of the image data at the destination terminal 10db at a time "Nov. 10, 2009, 14:00" is 200 ms. It should be noted that, in the case where a video conference is held between two transmission terminals 10, the receive date and time of the delay information may be stored in the session management table based on the delay information transmitted not from the destination terminal 10B but from the request source terminal 10A. It should be noted that, in the case where a video conference is held among three or more transmission terminals 10, the receive date and time of the delay information may be stored in the session management table based on the delay information transmitted from the transmission terminal(s) 10 that receive(s) image data and audio data.

(Address Priority Management Table)

Further, in the storage unit 5000, a priority management DB 5006 including an address priority management table as illustrated in FIG. 13 is included. In the address priority management table, an address priority point (e.g., "5", "3", "1", "0") is associated with a same-or-different dot-address pattern of four dot addresses of a typical IPv4 IP address (e.g., "same.same.same.different", "same.same.different.-", "same.different.-.-", "different.-.-.-"). For example, in the address priority management table illustrated in FIG. 13, in the case where three dot addresses from the highest level are the same values between two IP addresses, the address priority point is "5". In the case where two dot addresses from the highest level are the same values between two IP addresses, the address priority point is "3". In this case, whether the dot addresses in the lowest level are the same has nothing to do with the address priority point. In the case where the dot addresses in the highest level are the same, and the dot addresses in the next highest level are different between two IP addresses, the address priority point is "1". In this case, whether the dot addresses in the lowest level and the second lowest level are the same has nothing to do with the address priority point. In the case where the dot addresses in the highest level are different between two IP addresses, the address priority point is "0". In this case, whether the dot addresses in the second highest level, the third highest level, and the lowest level are the same has nothing to do with the address priority point.

(Transmission Speed Priority Management Table)

Further, the priority management DB 5006, included in the storage unit 5000, also includes a transmission speed priority management table as illustrated in FIG. 14. In the transmission speed priority management table, a transmission speed priority point is associated with the maximum data transmission speed (Mbps) in the relay apparatus 30 in such a way that the faster the maximum data transmission speed, the higher is the transmission speed priority point. For example, in the transmission speed priority management table illustrated in FIG. 14, in the case where the maximum data transmission speed in the relay apparatus 30 is 1000 Mbps or faster, the transmission speed priority point is "5". In the case where the maximum data transmission speed in the relay apparatus 30 is equal to or faster than 100 Mbps and slower than 1000 Mbps, the transmission speed priority point is "3". In the case where the maximum data transmission speed in the relay apparatus 30 is equal to or faster than 10 Mbps and slower than 100 Mbps, the transmission speed priority point is "1". In the case where the maximum data transmission speed in the relay apparatus 30 is slower than 10 Mbps, the transmission speed priority point is "0".

(Quality Management Table)

Further, in the storage unit 5000, a quality management DB 5007 including a quality management table as illustrated in FIG. 15 is included. In the quality management table, the delay time (ms) of the image data at the request source terminal 10A or at the destination terminal 10B is associated with image quality of the image data (image quality) relayed by the relay apparatus 30.

(Functional Units of Transmission Management System)

Next, functional units of the transmission management system 50 will be described in detail. It should be noted that, in the following, when functional units of the transmission management system 50 is described, relations between functional units and main elements illustrated in FIG. 4, which are used for realizing the functional units of the transmission management system 50, will be also described.

The transmission and reception unit 51 is realized by the network I/F 209 illustrated in FIG. 4, and performs transmitting and receiving various data (information) items to and from other terminals, apparatuses, or systems via the communication network 2. The terminal authentication unit 52 performs terminal authentication by searching the terminal authentication management DB 5002 of the storage unit 5000 by using as search keys a terminal ID and a password included in login request information received via the transmission and reception unit 51, and determining whether the same terminal ID and the password are stored in the terminal authentication management DB 5002. In order to control an operational state of a login request source terminal 10A, the state management unit 53 associates a terminal ID of the login request source terminal 10A with an operational state of the login request source terminal 10A, receive date and time when the login request information is received by the transmission management system 50, and an IP address of the login request source terminal 10A, and stores the associated result in the terminal management table.

The terminal extracting unit 54 extracts a terminal ID by, using as a search key a terminal ID of the login request source terminal 10A, searching the destination list management table (refer to FIG. 11), and extracting a terminal ID of a candidate of destination terminal 10B that can communicate with the request source terminal 10A. Further, the terminal extracting unit 54 extracts a terminal ID of another request source terminal 10A for which the terminal ID of the request source terminal 10A is registered as a candidate of destination terminal 10B by, using the terminal ID of the login request source terminal 10A as a search key, and searching the destination list management table (refer to FIG. 11).

The terminal state obtaining unit 55 extracts operational states of terminal IDs extracted by the terminal extracting unit 54 by, using as keys the terminal IDs of the candidates of destination terminal 10B extracted by the terminal extracting unit 54, and searching the terminal management table (refer to FIG. 10). With the above operation, the terminal state obtaining unit 55 can obtain operational states of the candidates of destination terminal 10B which are capable of communicating with the login request source terminal 10A. Further, the terminal state obtaining unit 55 also obtains an operational state of the login request source terminal 10A by, using as a search key the terminal ID extracted by the terminal extracting unit 54, and searching the terminal management table (refer to FIG. 10).

The narrowing down unit 56 includes a selection session ID generating unit 56a, a terminal IP address extracting unit 56b, a primary selection unit 56c, and a priority determination unit 56d used for performing a primary narrowing down process prior to a final narrowing down process in order to support the final narrowing down process of narrowing down a plurality of the relay apparatuses 30 to a final single relay apparatus 30. The selection session ID generating unit 56a generates a selection session ID used for performing a session for selecting the relay apparatus 30. The terminal IP address extracting unit 56b extracts IP addresses corresponding to a terminal ID of the request source terminal 10A included in the start request information transmitted by the request source terminal 10A, and a terminal ID of the destination terminal 10B, by searching the terminal management table (refer to FIG. 10) based on the terminal ID of the request source terminal 10A and the terminal ID of the destination terminal 10B. The primary selection unit 56c selects the relay apparatuses 30 by selecting relay apparatus IDs of the relay apparatuses, an operational state of which is "ONLINE", from the relay apparatuses 30 stored in the relay apparatus management table (refer to FIG. 8).

Further, the primary selection unit 56c examines whether, for each of the IP addresses of the selected relay apparatuses 30, each of the dot addresses of the IP address of the selected relay apparatus 30 is the same as the corresponding dot address of the IP address of the request source terminal 10A and the corresponding dot address of the IP address of the destination terminal 10B, based on the IP address of the request source terminal 10A and the IP address of the destination terminal 10B extracted by the terminal IP address extracting unit 56b, by searching the relay apparatus management table (refer to FIG. 8). Further, the primary selection unit 56c further selects the relay apparatuses 30 by selecting the two relay apparatuses 30 whose integrated points are the highest and the second highest, the integrated point being obtained by integrating the address priority point and the transmission speed priority point, and the address priority point being obtained by selecting the higher point from the address priority point with respect to the IP address of the request source terminal 10A and the address priority point with respect to the IP address of the destination terminal 10B.

It should be noted that, in the embodiment, a case is described in which two relay apparatuses 30 with the highest point and the second highest point are selected, but the present invention is not limited to this case. Three or more relay apparatuses 30 with high point may be selected as long as the number of the relay apparatuses 30 can be narrowed down.

The priority determination unit 56d refers to the priority management table (refer to FIG. 13), and determines an address priority point for each of the relay apparatuses 30 examined by the primary selection unit 56c. Further, the priority determination unit 56d determines a transmission speed priority point for each of the relay apparatuses 30 narrowed down by the primary selection unit 56c based on the maximum data transmission speeds of the relay apparatuses 30 stored in the relay apparatus management table (refer to FIG. 8) by searching the priority management table (refer to FIG. 14).

The session management unit 57 associates a selection session ID, generated by the selection session ID generating unit 56a, with a terminal ID of the request source terminal and a terminal ID of the destination terminal, and stores the association result in the session management table (refer to FIG. 12) of the storage unit 5000. Further, for each of the selection session IDs in the session management table (refer to FIG. 12), the session management unit 57 stores a relay apparatus ID of the single relay apparatus 30 that has been finally selected by the selection unit 16c of the transmission terminal 10.

The quality determination unit 58 determines image quality of image data that are relayed by the relay apparatus 30 by searching the quality management table (refer to FIG. 15) by using the above delay time as a search key, and extracting the corresponding image quality of image data. The storing and reading processing unit 59 is realized by the HDD 205 illustrated in FIG. 4, and performs a process of storing various data items in the storage unit 5000 and reading the data items stored in the storage unit 5000. The delay time management unit 60 searches the terminal management table (refer to FIG. 10) by using an IP address of the destination terminal 10B as a search key, extracts a corresponding terminal ID, and further, stores the delay time indicated by the delay information in a delay time field of a record in the session management table (refer to FIG. 12), in which record the extracted terminal ID is included.

<Process and Operation in an Embodiment>

(Basic Process and Operation)

Figure 16:
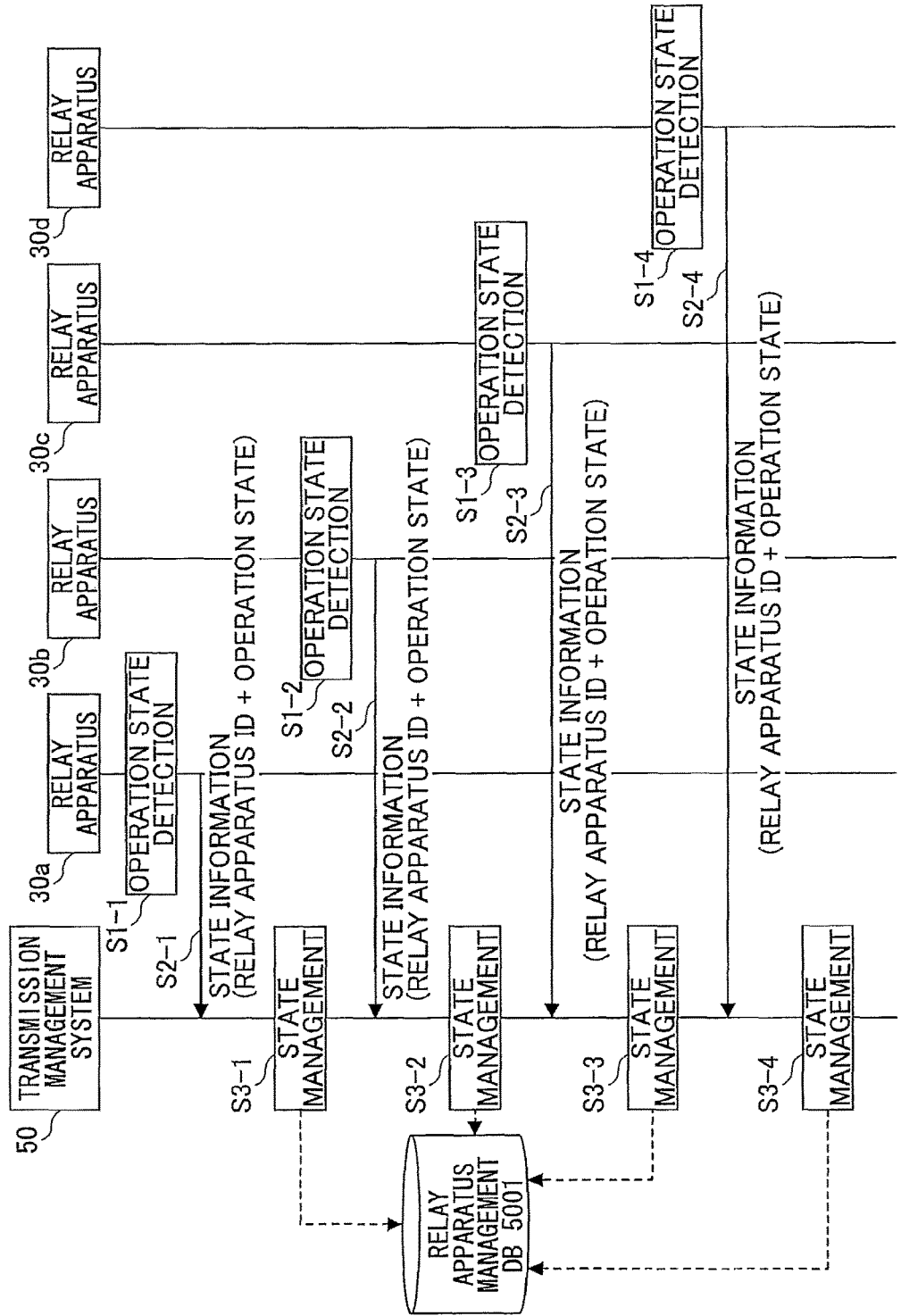
FIG. 16 is a sequence diagram illustrating a process for controlling state information indicating an operational state of relay apparatuses.
Figure 17:
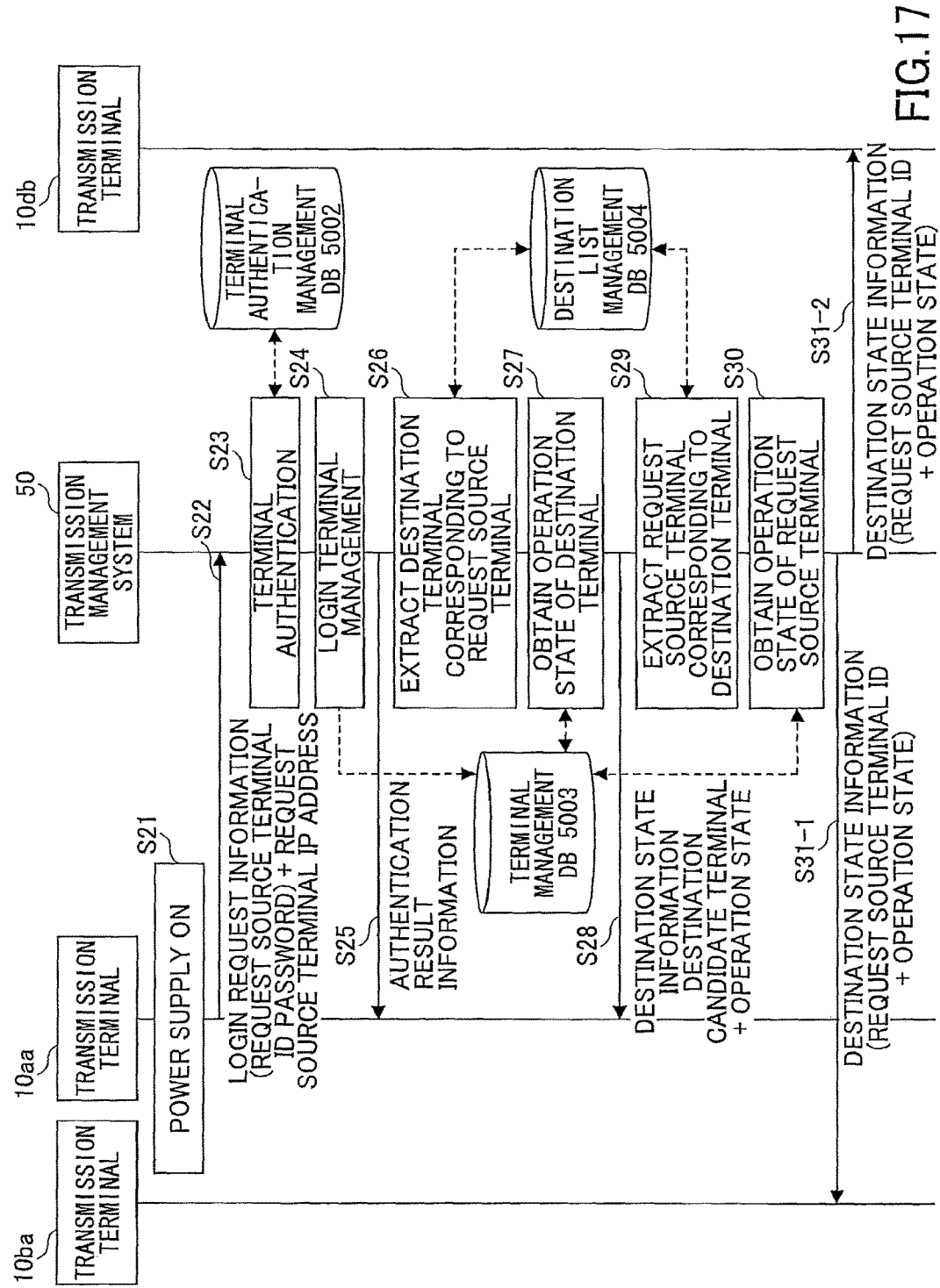
FIG. 17 is a sequence diagram illustrating a preparation stage process for starting communications between transmission terminals.
Figure 18:
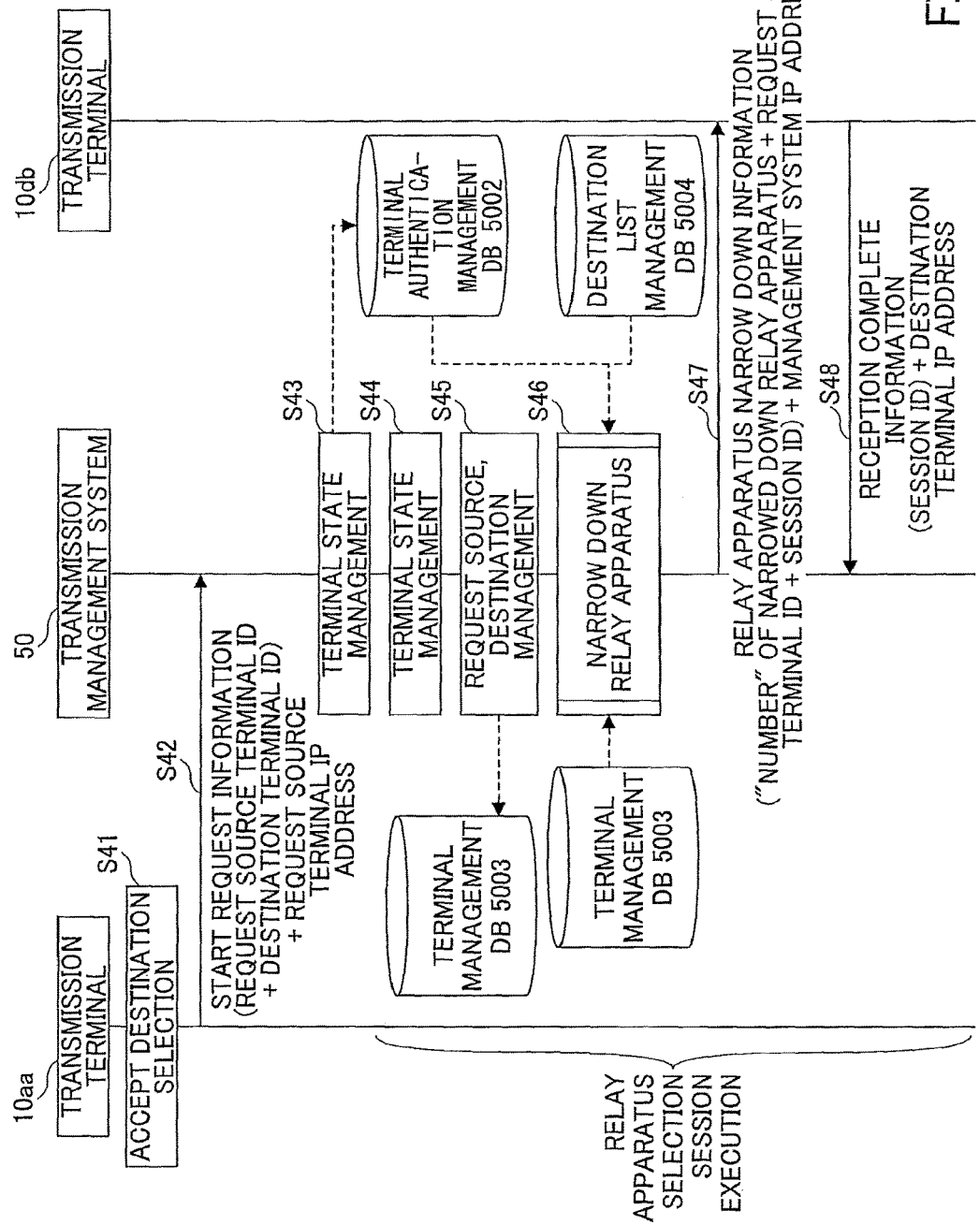
FIG. 18 is a sequence diagram illustrating a process for narrowing down relay apparatuses.
Figure 19:
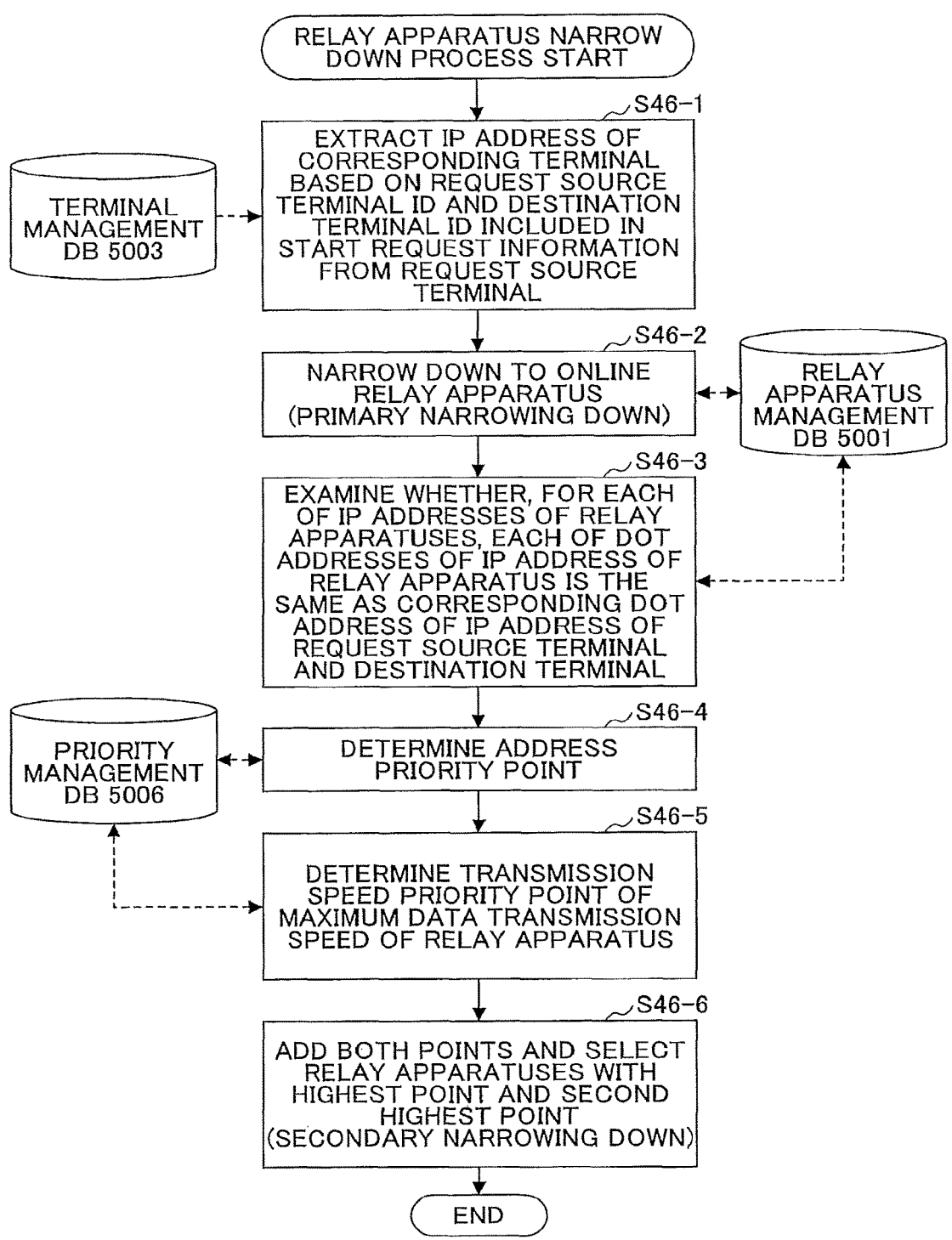
FIG. 19 is a process flowchart illustrating a process for narrowing down relay apparatuses.
Figure 21:
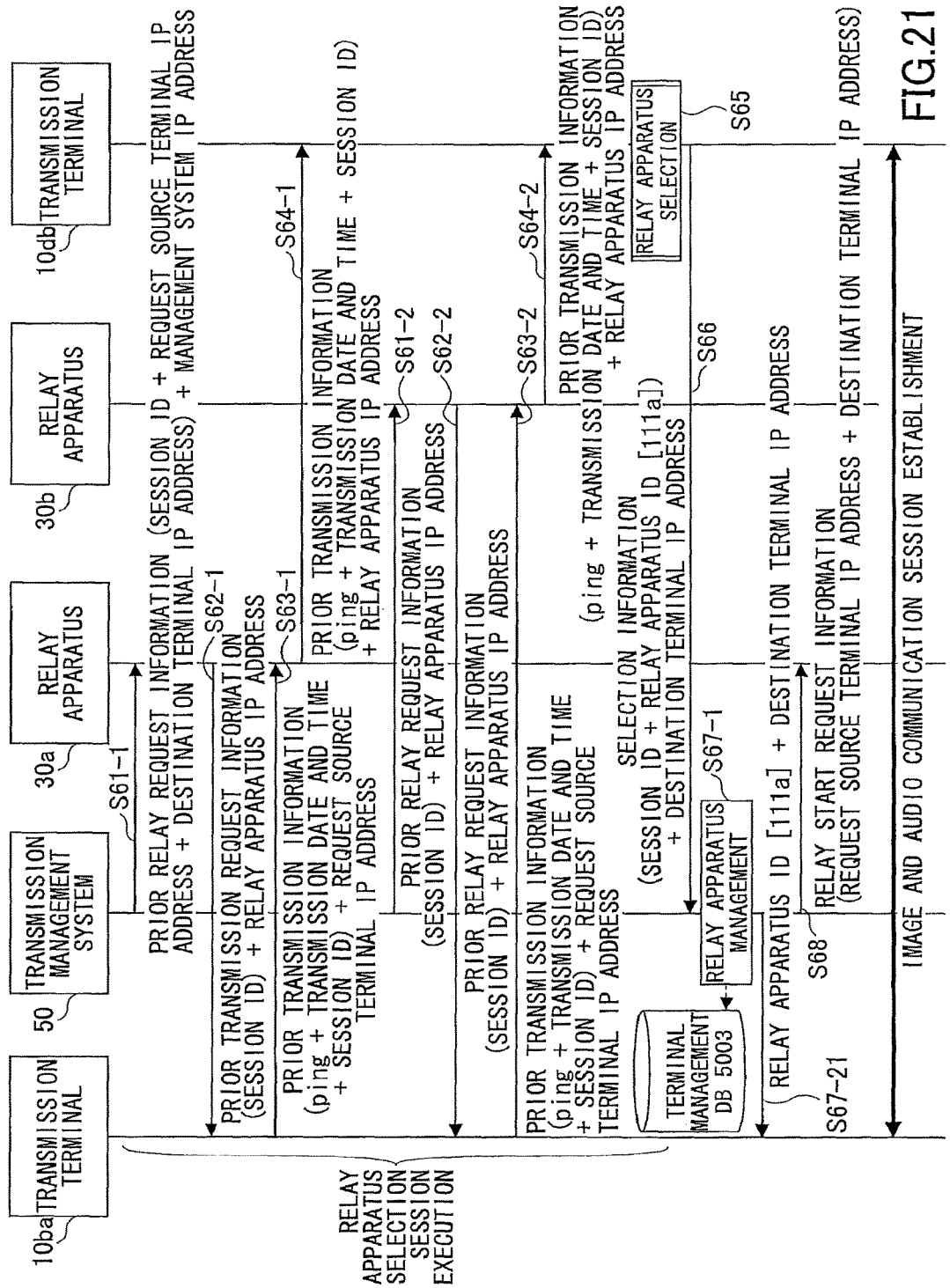
FIG. 21 is a sequence diagram illustrating a process of a transmission terminal for selecting a relay apparatus.
Figure 22:
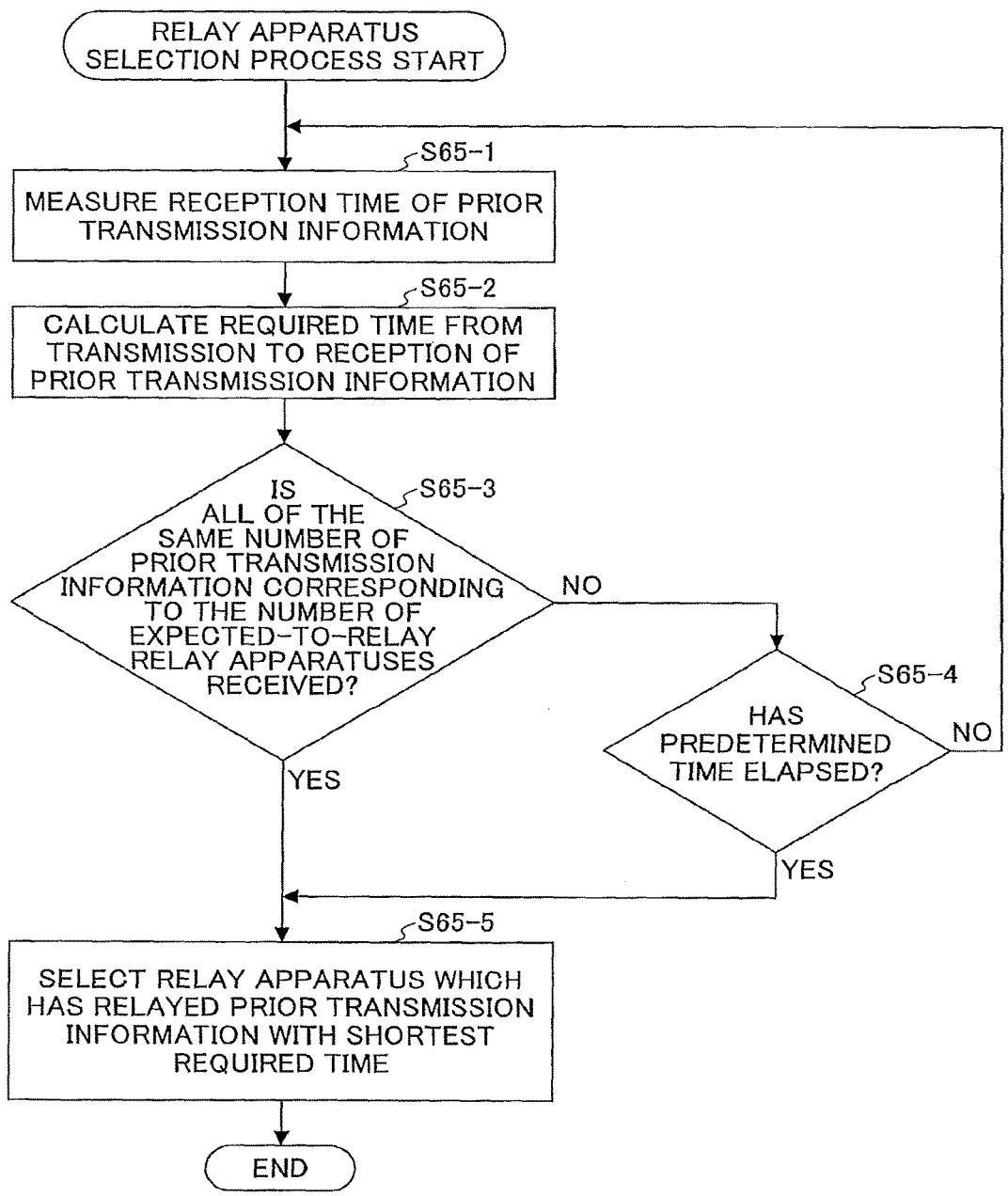
FIG. 22 is a process flowchart illustrating a process of a transmission terminal for selecting a relay apparatus.
Figure 23:
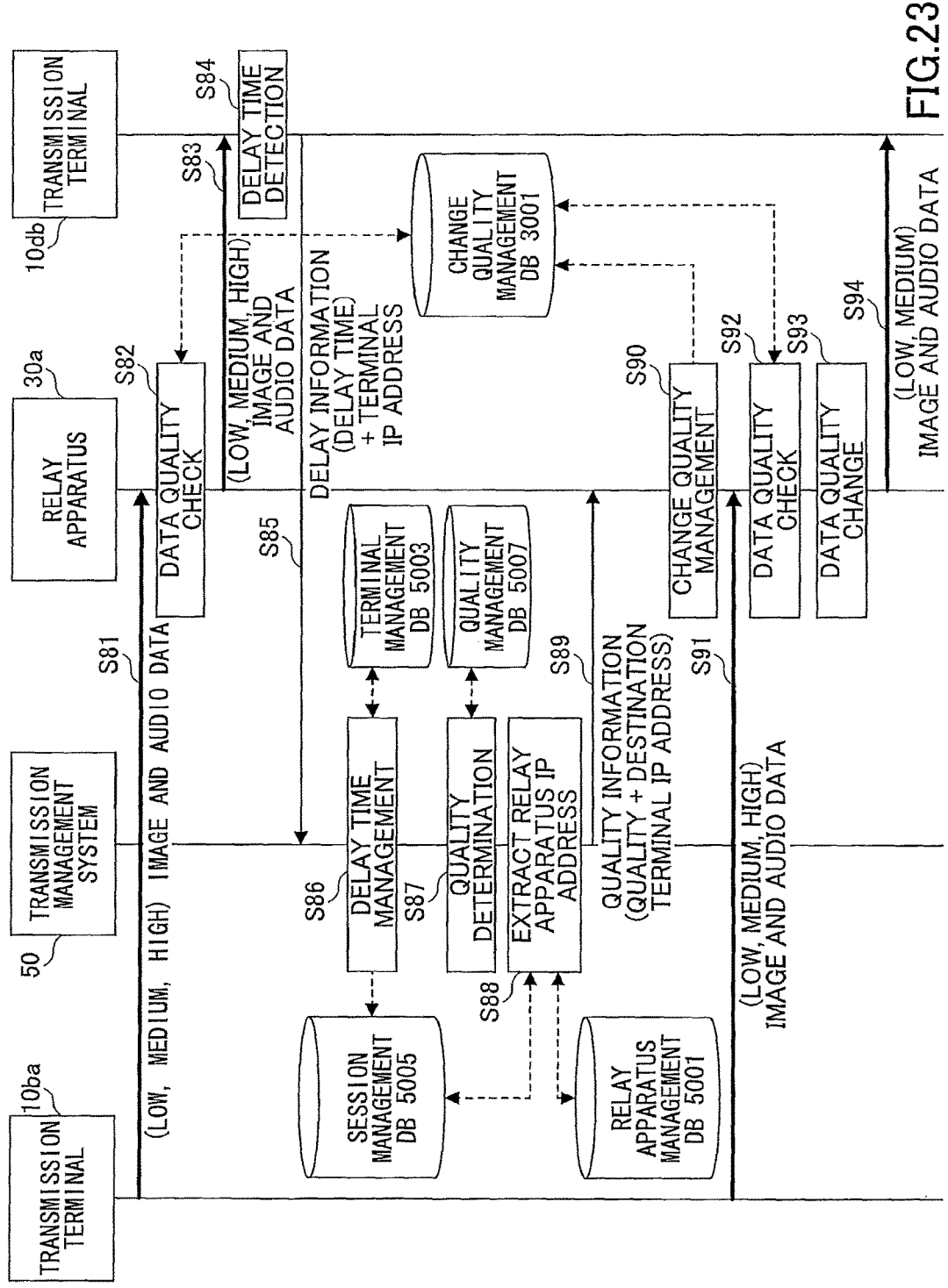
FIG. 23 is a sequence diagram illustrating a process for transmitting and receiving image data and audio data between transmission terminals.
Figure 25:
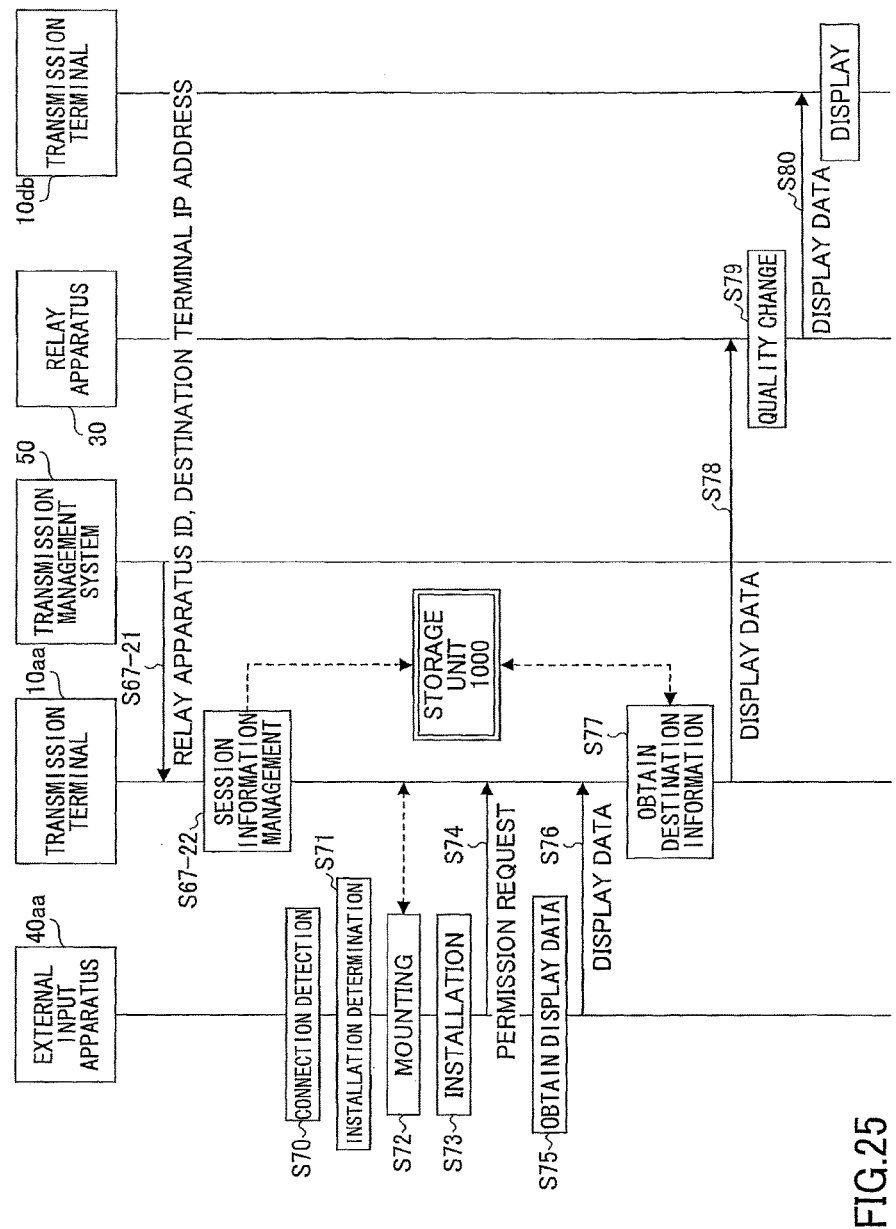
FIG. 25 is a sequence diagram illustrating a process for causing a destination transmission terminal of the conference to display display data displayed by an external input apparatus.
Figure 26:
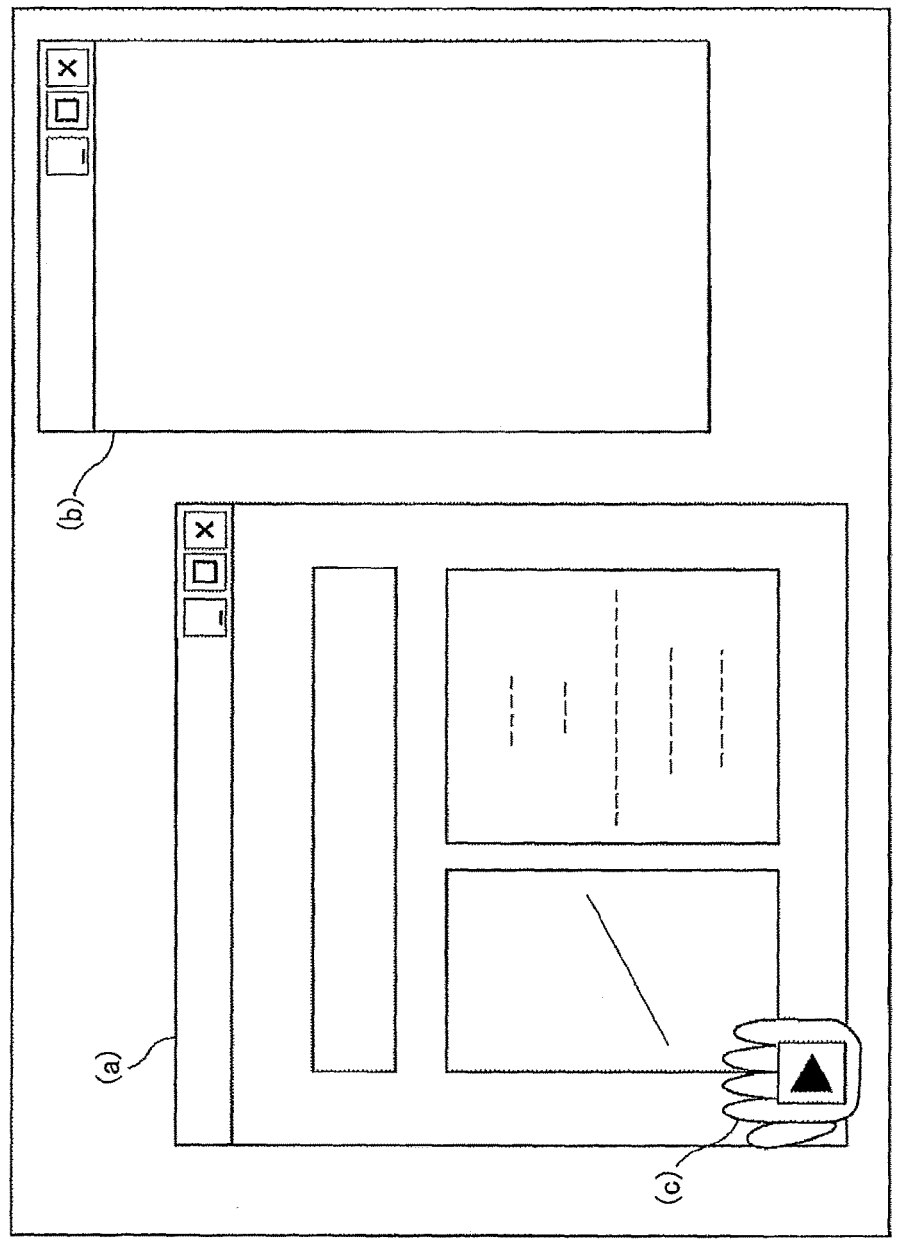
FIG. 26 is an example of a screen displayed by an external input apparatus.
Figure 27:
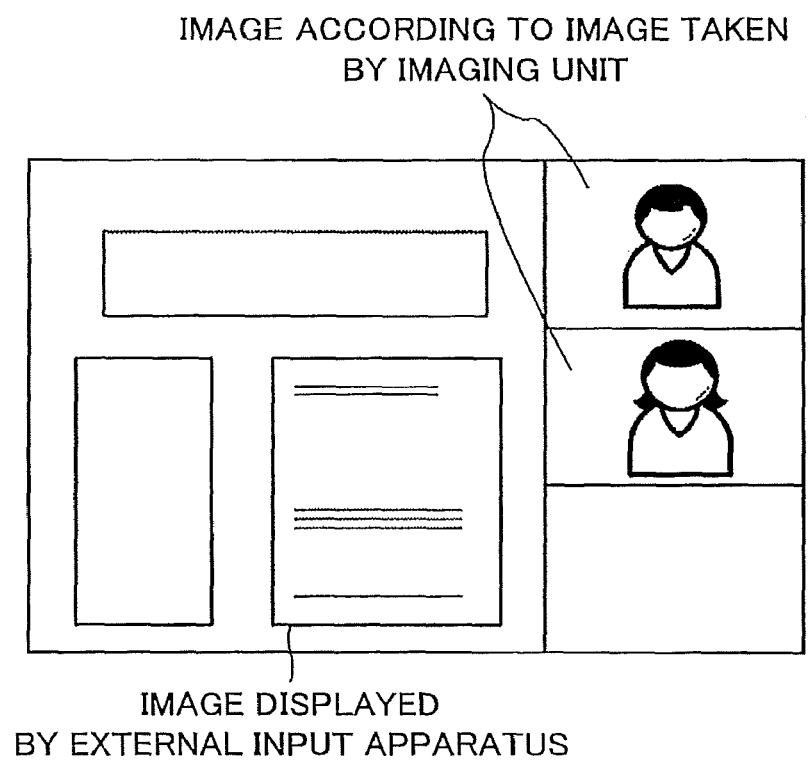
FIG. 27 is an example of a screen on which a transmission terminal displays image data and display data.
Figure 28:
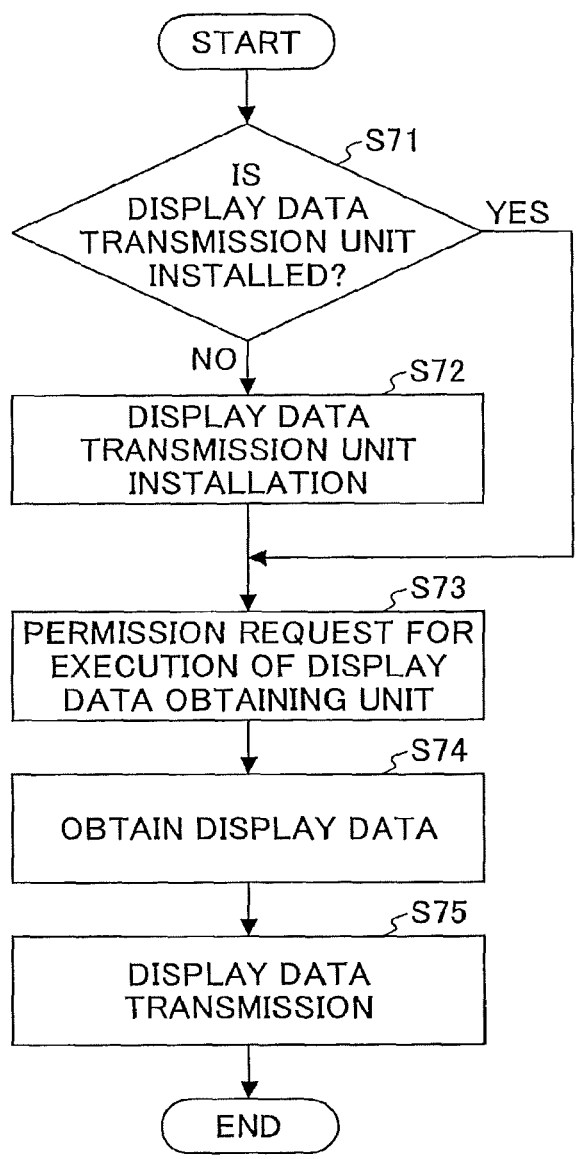
FIG. 28 is a process flowchart illustrating a process for installing a display data obtaining unit in an external input apparatus.

Configurations and functions (or means) of a transmission system 1 according to the embodiment have been described above. Next, referring to FIG. 16 through FIG. 23, and FIG. 25 through FIG. 28, a processing method of the transmission system 1 will be described. It should be noted that FIG. 16 is a sequence diagram illustrating a process for controlling status information indicating operational states of the relay apparatuses 30 transmitted from the relay apparatuses 30 to the transmission management system 50. FIG. 17 is a sequence diagram illustrating a preparation stage process for starting communications between a plurality of transmission terminals. FIG. 18 is a sequence diagram illustrating a process for narrowing down the relay apparatuses 30. FIG. 19 is a process flowchart illustrating a process for narrowing down the relay apparatuses 30. FIG. 20 is a drawing illustrating a point calculation state when a process for narrowing down the relay apparatuses 30 is performed. FIG. 21 is a sequence diagram illustrating a process of a transmission terminal 10 for selecting a relay apparatus 30. FIG. 22 is a process flowchart illustrating a process of a transmission terminal 10 for selecting a relay apparatus 30. FIG. 23 is a sequence diagram illustrating a process for transmitting and receiving image data and audio data between transmission terminals 10. FIG. 25 is a sequence diagram illustrating a process for causing a conference destination transmission terminal 10 to display display data displayed by an external input apparatus 40. FIG. 26 is an example of a screen displayed by an external input apparatus 40. FIG. 27 is an example of a screen on which a transmission terminal 10 displays image data and display data. FIG. 28 is a process flowchart illustrating a process for installing the display data obtaining unit in an external input apparatus 40.

First, referring to FIG. 16, a process for controlling status information indicating operational states of the relay apparatuses 30 transmitted from the relay apparatuses 30 to the transmission management system 50 will be described. First, in each of the relay apparatuses 30, the state detection unit 32 illustrated in FIG. 5B periodically detects an operational state of the relay apparatus 30 (steps S1-1 through S1-4). Further, in order for the transmission management system 50 to control operational states of the relay apparatuses 30 in real time, the transmitting and receiving unit 31 of each of the relay apparatuses 30 periodically transmits status information of the relay apparatus 30 to the transmission management system 50 via the communication network 2 (steps S2-1 through S2-4). The status information includes an relay apparatus ID of the relay apparatus 30 and the operational state of the relay apparatus 30 corresponding to the relay apparatus ID detected by the state detecting unit 32. It should be noted that it is assumed in the embodiment that the relay apparatuses (30a, 30b, 30d) are in an "ONLINE" state and operating normally, and the relay apparatus 30c is operating but is in a "OFFLINE" state because there is some problem in a program used for the relay apparatus 30c to perform a relay operation.

Next, in the transmission management system 50, the transmission and reception unit 51 receives the status information transmitted from each of the relay apparatuses, and the storing and reading processing unit 59 stores the status information associated with the relay apparatus ID in the relay apparatus management table of the storage unit 5000 (refer to FIG. 8) (steps S3-1 through S3-4). With the above operation, for each relay apparatus ID, any one of operational states "ONLINE", "OFFLINE" and "OUT OF ORDER" is stored in the relay apparatus management table as illustrated in FIG. 8. Further, at this time, for each relay apparatus ID, receive date and time when the status information is received by the transmission management system 50 is also stored. It should be noted that in the case where the status information is not transmitted from the relay apparatus 30, a field of an operational state and a field of receive date and time in a record of the relay apparatus management table may be blank or the fields may retain the previous operational state and the previous receive date and time.

Next, referring to FIG. 17, a preparation stage process before starting communications between the transmission terminal 10aa and the transmission terminal 10db will be described. First, when a user turns on the power supply switch 109 illustrated in FIG. 3, the operation input accepting unit 12 illustrated in FIG. 5B accepts an input of power supply ON, and turns on the power supply (step S21). Next, triggered by the reception of the power supply ON input, the login request unit 13 automatically transmits from the transmission and reception unit 11 login request information indicating a login request to the transmission management system 50 via the communication network 2 (step S22). The login request information includes a terminal ID used for identifying the transmission terminal 10aa as a request source, and a password. The terminal ID and the password have been read from the storage unit 1000 via the storing and reading processing unit 19 and transmitted to the transmission and reception unit 11. It should be noted that, when the login request information is transmitted from the transmission terminal 10aa to the transmission management system 50, the receiving side (the transmission management system 50) can obtain an IP address of the transmitting side (the transmission terminal 10ab).

Next, the terminal authentication unit 52 of the transmission management system 50 performs terminal authentication by searching the terminal authentication management table of the storage unit 5000 (refer to FIG. 9) by using as search keys the terminal ID and the password included in the login request information received via the transmission and reception unit 51, and determining whether the same terminal ID and the password are stored in the terminal authentication management table (step S23). In the case where it is determined that the same terminal ID and the password are stored in the the terminal authentication management table and that the login request is from a transmission terminal 10 that has a proper use permission, the status management unit 53 associates the terminal ID of the transmission terminal 10aa with the operational state, receive date and time when the login request information is received, and the IP address of the transmission terminal 10aa, and stores the association result in the terminal management table (refer to FIG. 10)(step S24). With the above operation, the transmission terminal ID "01aa" is associated with the operational state "ONLINE", the receive date and time "Nov. 10, 2009 13:40", and the terminal IP address "1. 2. 1. 3.", and the association result is stored in the terminal management table illustrated in FIG. 10.

Further, the transmission and reception unit 51 of the transmission management system 50 transmits authentication result information indicating the authentication result obtained by the terminal authentication unit 52 to the request source terminal 10aa as a request source of the login request via the communication network 2 (step S25). In the embodiment, the description continues for the case where it is determined by the terminal authentication unit 52 that the terminal has a proper use permission.

The terminal extracting unit 54 of the transmission management system 50 extracts terminal IDs of candidates of the destination terminal 10B that can communicate with the request source terminal 10aa by, using as a search key a terminal ID "01aa" of the request source terminal 10aa as a source of login request, searching the destination list management table (refer to FIG. 11), and reading terminal IDs of candidates of the destination terminal 10B that can communicate with the request source terminal 10aa (step S26). Here, terminal IDs "01ab", "01ba" and "01db" of the destination terminals (10ab, 10ba, 10db) corresponding to the terminal ID "01aa" of the request source terminal 10aa are extracted.

Next, the terminal state obtaining unit 55 obtains operational states of the transmission terminals (10ab, 10ba, 10db) by, using as keys the terminal IDs ("01ab", "01ba", "01db") of the candidates of the destination terminal 10B extracted by the terminal extracting unit 54, searching the terminal management table, and reading operational states ("OFFLINE", "ONLINE", "ONLINE") of the terminal IDs extracted by the terminal extracting unit 54 (step S27).

Next, the transmission and reception unit 51 transmits to the request source terminal 10aa destination state information including the terminal IDs ("01ab", "01ba", "01db") used as search keys in step S27 and the operational states ("OFFLINE", "ONLINE", "ONLINE") of the corresponding destination terminals (10ab, 10ba, 10db) via the communication network 2 (step S28). With the above operation, the request source terminal 10aa can obtain the current operational states ("OFFLINE", "ONLINE", "ONLINE") of the transmission terminals (10ab, 10ba, 10db) as the candidates of the destination terminal 10b that can communicate with the request source terminal 10aa.

Further, the terminal extracting unit 54 of the transmission management system 50 searches the destination list management table by using as a search key the terminal ID "01aa" of the request source terminal 10aa requesting login, and extracts terminal IDs of other request source terminals 10A for which the terminal ID "01aa" of the request source terminal 10aa is registered as a candidate of the destination terminal 10B (step S29). In the destination list management table illustrated in FIG. 11, extracted terminal IDs of the other request source terminals are "01ab", "01ba", and "01db".

Next, the terminal state obtaining unit 55 of the transmission management system 50 searches the terminal management table (refer to FIG. 10) by using as a search key the terminal ID "01aa" of the request source terminal 10aa requesting login, and obtains the operational state of the request source terminal 10aa (step S30).

Next, the transmission and reception unit 51 transmits destination state information including the terminal ID "01aa" and an operational state "ONLINE" of the request source terminal 10aa obtained in step S30 to the transmission terminals (10ba, 10db) whose operational states in the terminal management table are "ONLINE", selected from the transmission terminals (10ab, 10ba, 10db) corresponding to the terminal IDs ("01ab", "01ba", and "01db") extracted in step S29 (steps S31-1, S31-2). It should be noted that when the transmission and reception unit 51 transmits the destination state information to the transmission terminals (10ba and 10db), the transmission and reception unit 51 refers to IP addresses of the terminals stored in the terminal management table illustrated in FIG. 10, based on the terminal IDs ("01ba" and "01db"). With the above operation, the terminal ID "01aa" and the operational state "ONLINE" of the request source terminal 10aa requesting login can be transmitted to other destination terminals (10db and 10ba) that can communicate with the request source terminal 10aa requesting login as a destination.

On the other hand, in other transmission terminals 10, similar to step S21, when a user turns on the power supply switch 109 illustrated in FIG. 4, the operation input accepting unit 12 illustrated in FIG. 5B accepts an input of power supply ON, and a process similar to steps S22 through S31-1, 31-2 is performed. The detailed description will be omitted.

Next, referring to FIG. 18, a process for narrowing down the relay apparatuses 30 will be described. It should be noted that, in the embodiment, it is assumed that the request source terminal 10aa can communicate with at least one of the transmission terminals (10ba, 10db), which are transmission terminals 10 as a destination candidate and whose operational states are "ONLINE" according to the destination state information received in step S28. Therefore, in the following description, it is assumed that the user of the request source terminal 10aa chooses to start communications with the destination terminal 10db.

First, when the user presses the operation button 108 illustrated in FIG. 3 to select the transmission terminal 10db, the operation input accepting unit 12 illustrated in FIG. 5B accepts a request for starting communications with the transmission terminal 10db (step S41). Further, the transmission and reception unit 11 of the transmission terminal 10aa transmits start request information indicating a communication start request and including a terminal ID "01aa" of the request source terminal 10aa and a terminal ID "01db" of the destination terminal 10db (step S42). With the above operation, the transmission and reception unit 51 of the transmission management system 50 receives the start request information, and obtains an IP address "1. 2. 1. 3" of the request source terminal 10aa as a transmission source. Further, based on an terminal ID "01aa" of the request source terminal 10aa and a terminal ID "01db" of the destination terminal 10db included in the start request information, the state management unit 53 changes the fields of operational state of records that include the terminal ID "01aa" and the terminal ID "01db", respectively, in the terminal management table (refer to FIG. 10) to "COMMUNICATING" (step S43). In the above state, the request source terminal 10aa and the destination terminal 10db have not started a communication (call) yet, but are already in a communicating state. If another transmission terminal 10 tries to communicate with the request source terminal 10aa and the destination terminal 10db, an audio message or a display message is output indicating the communicating state.

Next, referring to steps S44 through S48, and steps S61-1 through 66, a process for performing a session for selecting the relay apparatus 30 will be described. First, the selection session ID generating unit 56a generates a selection session ID used for performing a session for selecting the relay apparatus 30 (step S44). Further, the session management unit 57 associates the selection session ID "sel" generated in step S44 with a terminal ID "01aa" of the request source terminal 10aa and a terminal ID "01db" of the destination terminal 10db, and stores the association result in the session management table (refer to FIG. 12) of the storage unit 5000 (step S45).

Next, the narrowing down unit 56 of the transmission management system 50 performs a primary narrowing down of the relay apparatuses 30 used for relaying communications between the request source terminal 10aa and the destination terminal 10db based on the relay apparatus management DB 5001, the terminal management DB 5003, and the priority management DB 5006 (step S46).

Here, referring to FIG. 19, a process in step S46 will be further described in detail. First, the terminal IP address extracting unit 56b extracts IP addresses ("1. 2. 1. 3", "1. 3. 2. 4") of the transmission terminals (10aa, 10db) corresponding to a terminal ID "01aa" of the request source terminal 10aa and a terminal ID "01db" of the destination terminal 10db included in the start request information transmitted from the request source terminal 10aa, by searching the terminal management table (refer to FIG. 10) based on the terminal ID "01aa" of the request source terminal 10aa and the terminal ID "01db" of the destination terminal 10db (step S46-1). Next, the primary selection unit 56c selects the relay apparatuses 30 by selecting relay apparatus IDs (111a, 111b, 111d) of the relay apparatuses (30a, 30b, 30d), operational states of which are "ONLINE", from the relay apparatuses 30 stored in the relay apparatus management table (refer to FIG. 8)(step S46-2). Further, the primary selection unit 56c examines whether, for each of the IP addresses ("1. 2. 1. 2", "1. 2. 2. 2.", "1. 3. 2. 2") of the selected relay apparatuses (30a, 30b, 30d), each of the dot addresses of the IP address of the selected relay apparatus 30 is the same as the corresponding dot address of the IP address ("1. 2. 1. 3") of the request source terminal 10aa and the corresponding dot address of the IP address ("1. 3. 2. 4") of the destination terminal 10db, by searching the relay apparatus management table (refer to FIG. 8) based on the IP address ("1. 2. 1. 3") of the request source terminal 10aa and the IP address ("1. 3. 2. 4") of the destination terminal 10db extracted in step S46-1 (step S46-3).

Next, the priority determination unit 56d refers to the priority management table (refer to FIG. 13), and determines an address priority point for each of the relay apparatuses (30a, 30b, 30d) examined in step S46-3 (step S46-4). A result of the above determination is illustrated in FIG. 20. It should be noted that FIG. 20 is a drawing illustrating a calculation state of priority points when a process for narrowing down the relay apparatuses 30 is performed. An address priority point, a transmission speed priority point, and an integrated point for each relay apparatus ID are illustrated in FIG. 20. Further, the address priority point includes a point of the relay apparatus 30 with respect to the request source terminal 10aa and a point of the relay apparatus 30 with respect to the destination terminal 10db. The integrated point is a sum of a higher point between the two address priority points and the transmission speed priority point.

In the embodiment, with respect to the IP address "1. 2. 1. 3" of the request source terminal 10aa, the IP address "1. 2. 1. 2" of the relay apparatus 30a is "same.same.same.different", and thus, the address priority point is "5" as illustrated in FIG. 20. Further, with respect to the IP address "1. 3. 2. 4" of the destination terminal 10db, the IP address "1. 2. 1. 2" of the relay apparatus 30a is "same.different.different.different", and thus, the address priority point is "1". Further, with respect to the IP address "1. 2. 1. 3" of the request source terminal 10aa, the IP address "1. 2. 2. 2" of the relay apparatus 30b is "same.same.different.different", and thus, the address priority point is "3". Further, with respect to the IP address "1. 3. 2. 4" of the destination terminal 10db, the IP address "1. 2. 2. 2" of the relay apparatus 30b is "same.different.same.different", and thus, the address priority point is "1". Further, with respect to the IP address "1. 2. 1. 3" of the request source terminal 10aa, the IP address "1. 3. 2. 2" of the relay apparatus 30d is "same.different.different.different", and thus, the address priority point is "1". Further, with respect to the IP address "1. 3. 2. 4" of the destination terminal 10db, the IP address "1. 3. 2. 2" of the relay apparatus 30d is "same.same.same.different", and thus, the address priority point is "5".

Next, referring back to FIG. 19, the priority determination unit 56d determines a transmission speed priority point for each of the relay apparatuses (30a, 30b, 30d) narrowed down by the primary narrowing down process in step S46-2, by searching the priority management table (refer to FIG. 14) based on the maximum data transmission speed of each relay apparatus 30 stored in the relay apparatus management table (refer to FIG. 8) (step S46-5). According to the embodiment, the maximum data transmission speed of the relay apparatus 30a is 100 (Mbps) as illustrated in FIG. 8. Therefore, referring to the transmission speed priority point illustrated in FIG. 14, the transmission speed priority point of the relay apparatus 30a is "3". Further, similarly, the maximum data transmission speed of the relay apparatus 30b is 1000 (Mbps), and the transmission speed priority point of the relay apparatus 30b is "5". Further, similarly, the maximum data transmission speed of the relay apparatus 30d is 10 (Mbps), and the transmission speed priority point of the relay apparatus 30d is "1".

Next, the primary selection unit 56c further selects the top two relay apparatuses 30 by selecting the relay apparatuses 46 whose integrated points are the highest and the second highest, where integrated point is obtained by integrating the higher address priority point and the transmission speed priority point, and where the higher address priority point is obtained by selecting the higher point from the address priority points with respect to the IP addresses of the transmission terminals (10a, 10db) (step S46-6). According to the embodiment, as illustrated in FIG. 20, integrated points of the relay apparatus IDs (111a, 111b, 111d) are "8", "8", and "6", respectively. Therefore, the relay apparatus 30a corresponding to the relay apparatus ID "111a" and the relay apparatus 30b corresponding to the relay apparatus ID "111b" are selected.

After the narrowing down process in step S46 is completed, the transmission and reception unit 51 illustrated in FIG. 5B transmits to the destination terminal 10db relay apparatus narrowing down information for indicating the number of the narrowed down relay apparatuses 30 via the communication network 2 (step S47). In the relay apparatus narrowing down information, the number "2" of the narrowed down relay apparatuses 30 narrowed down in step S46, the terminal ID "01aa" of the request source terminal 10aa, and the selection session ID "se1" are included. With the above operation, the transmission terminal db understands that, in performing a session with the selection session ID "se1", what is the number of the relay apparatuses 30, which transmission terminal 10 has requested the start of video conference, and the IP address "1. 1. 1. 2" of the transmission management system 50 as a transmission source of the relay apparatus narrowing down information.

Further, the transmission terminal 10db transmits reception complete information, indicating that the reception of the relay apparatus narrowing down information is completed, from the transmission and reception unit 11 to the transmission management system 50 via the communication network 2 (step S48). In the reception complete information, the session ID "se1" is included. With the above operation, the transmission management system 50 understands that the transmission of the number of the relay apparatuses 30 performed in session ID "se1" is completed and obtains the IP address "1. 3. 2. 4" of the destination terminal 10db as a reception complete information transmission source.

Next, referring to FIG. 21, a process will be described in which the destination terminal 10db selects the relay apparatus 30. First, the transmission management system 50 transmits prior relay request information for requesting an relay in advance to each of the relay apparatuses (30a, 30b) narrowed down in step S46 before starting an video conference (step S61-1, S61-2). In the prior relay request information, the session ID "se1", the IP address of the request source terminal 10aa, and the IP address of the destination terminal 10db are included. With the above operation, the relay apparatuses (30a, 30b) obtain the session ID of the selection session, the IP address of the request source terminal 10aa, and the IP address of the destination terminal 10db. The relay apparatuses (30a, 30b) also obtain the IP address "1. 1. 1. 2" of the transmission management system 50 as a prior relay request information transmission source.

Next, each of the relay apparatuses (30a, 30b) transmits prior transmission request information, requesting to transmit prior transmission information including a Packet Internet Groper (ping) which will be described later to the corresponding relay apparatuses (30a, 30b) prior to the start of video conference, to the request source terminal 10aa obtained from the transmission and reception unit 31 via the communication network 2 in steps S61-1 and S61-2 (step S62-1, S62-2). In the prior transmission request information, the session ID "se1" is included. With the above operation, the request source terminal 10aa understands that the prior transmission information should be transmitted to the relay apparatuses (30a, 30b) in the selection process of the relay apparatus 30 performed in the session ID "se1". The request source terminal 10aa obtains the IP addresses ("1. 2. 1. 2", "1. 2. 2. 2") of the relay apparatuses (30a, 30b) as a prior transmission request information transmission source.

It should be noted that the transmission management system 50 does not transmits the IP address of the destination terminal 10db directly to the request source terminal 10aa, but transmits the IP address of the destination terminal 10db to the relay apparatus 30a as illustrated in step S61-1, and the relay apparatus 30 requests the request source terminal 10aa to transmit the prior transmission information to the relay apparatus 30a, for the purpose of ensuring the security by not transmitting an IP address of one transmission terminal 10 to another transmission terminal 10.

Next, the request source terminal 10aa transmits the prior transmission information to the relay apparatuses (30a, 30b) from the transmission and reception unit 11 via the communication network 2 (steps S63-1 and S63-2). The prior transmission information is transmitted to the destination terminal 10db via the relay apparatuses (30a, 30b) prior to the transmission of image data and audio data, and used for measuring the required time from transmission by the request source terminal 10aa to reception by the destination terminal 10db. Further, the prior transmission information includes a ping used for checking that the request source terminal 10aa, the relay apparatuses (30a, 30b), and the destination terminal 10db are connected to each other and capable of communicating with each other; transmission date and time when the prior transmission information is transmitted from the request source terminal 10aa; and a session ID "se1". With the above operation, the relay apparatuses (30a, 30b) understand that the prior transmission information is transmitted in execution of a session with the selection session ID "se1". The relay apparatuses (30a, 30b) obtains the IP address "1. 2. 1. 3" of the request source terminal 10aa as a prior transmission information transmission source.

Next, the relay apparatuses (30a, 30b) relay the prior transmission information to the IP address "1. 3. 2. 4" of the destination terminal 10db included in the prior relay request information received in step S61-1, S61-2 (step S64-1, S64-2). With the above operation, the destination terminal 10db understands that the prior transmission information is transmitted in execution of a session with the selection session ID "se1". The destination terminal 10db obtains the IP addresses ("1. 2. 1. 2", "1. 2. 2. 2") of the relay apparatuses (30a, 30b) as a prior transmission information transmission source (relay source).

Next, the destination terminal 10db finally narrows down the relay apparatuses 30 to a single relay apparatus 30 which relays the image data and the audio data of the video conference based on the prior transmission information (step S65).

Here, referring to FIG. 5A, FIG. 5B, and FIG. 22, a process in step S65 will be described further in detail. First, the measurement unit 16a of the selection processing unit 16 illustrated in FIG. 5B measures reception date and time when the prior transmission information is received by the transmission and reception unit 11 of the transmission terminal 10db for each of the prior transmission information relayed by the relay apparatuses (30a, 30b) (step S65-1). Next, for each prior transmission information whose reception date and time has been measured, the calculation unit 16b calculates required time required from transmission of the prior transmission information to reception of the prior transmission information based on a difference between the measured reception date and time and transmission date and time included in the prior transmission information (step S65-2). Next, the selection unit 16c determines whether, in execution of a session with the session ID "se1", the prior transmission information has been received from all (two) relay apparatus candidates of the relay apparatuses 30 (step S65-3). Further, in the case where the prior transmission information has not been received from all relay apparatus candidates (NO in S65-3), the selection unit 16c determines whether a predetermined time (here, one minute) has elapsed since the first prior transmission information was received by the transmission terminal 10db (step S65-4). Further, in the case where the predetermined time has not elapsed (NO in S65-4), the process returns to step S65-1. On the other hand, in the case where the prior transmission information has been received from all relay apparatus candidates (YES in step S65-3) or the predetermined time has elapsed (YES in step S65-4), the selection unit 16c selects a single relay apparatus 30 which has relayed the prior transmission information with the minimum required time of the required times calculated by the calculation unit 16b (step S65-5). According to the embodiment, a case is illustrated in which the relay apparatus 30a is selected by assuming that the time required from transmission to reception of the prior transmission information relayed by the relay apparatus 30a is less than the time required from transmission to reception of the prior transmission information relayed by the relay apparatus 30b.

It should be noted that, in an embodiment, it is the destination terminal 10db that narrows down the relay apparatuses 30, but it is not limited to the destination terminal 10*db* that narrows down the relay apparatuses. By transmitting all of the required time information indicating required time of the prior transmission information from transmission to reception from the destination terminal 10*db* to the request source terminal 10*aa* or the transmission management system 50, the request source terminal 10*aa* or the transmission management system 50 may narrow down the relay apparatuses 30 to the relay apparatus 30*a*.

Next, the destination terminal 10*db* transmits selection information indicating that the relay apparatus 30*a* is selected from the transmission and reception unit 11 to the transmission management system 50 via the communication network 2 (step S66). In the selection information, the session ID "se1" and the relay apparatus ID "111*a*" of the selected relay apparatus 30*a* are included. With the above operation, the transmission management system 50 understands that the relay apparatus 30*a* is selected in execution of a session with the selection session ID "se1". The transmission management system 50 also obtains the IP address "1. 3. 1. 4" of the transmission terminal 10*db* as a transmission source of the selection information.

Next, the session management unit 57 of the transmission management system 50 stores a relay apparatus ID "111*a*" of the relay apparatus 30*a* finally selected as the relay apparatus 30 in a field of the relay apparatus ID of a record of the session management table (refer to FIG. 12) of the session management DB 5005, in which record the selection session ID "se1" is included (step S67-1). The transmission and reception unit 51 transmits the relay apparatus ID "111*a*" and the IP address "1. 3. 2. 4." of the destination terminal 10*db* to the request source terminal 10*aa* (step S67-21). Further, the transmission and reception unit 51 of the transmission management system 50 transmits relay start request information indicating a relay start to the relay apparatus 30*a* via the communication network (step S68). In the relay start request information, the corresponding IP addresses ("1. 2. 1. 3", "1. 3. 2. 4") of the request source terminal 10*aa* and the destination terminal 10*db* as relay targets are included. According to the above operation, the relay apparatus 30*a* establishes a session for communicating image data with three resolutions including a low resolution, a medium resolution and a high resolution, and audio data between the transmission terminals (10*aa*, 10*db*) (step S69). As a result, the transmission terminals (10*aa*, 10*db*) can start a video conference.

It should be noted that the relay apparatus narrowing down information is transmitted from the transmission management system 50 to the destination terminal 10*db* in step S47, and it is the destination terminal 10*db* that performs the relay apparatus selection process (step S65) after the steps S48 to S64-1 and S64-2, which does not limit the embodiment. The relay apparatus narrowing down information may be transmitted from the transmission management system 50 to the request source terminal 10*aa* in step S47, and, in steps up to S64-1 and S64-2, the information transmission source and destination may be switched between the request source terminal 10*aa* and the destination terminal 10*db*. With the above operation, instead of the destination terminal 10*db*, the request source terminal 10*aa* may perform the selection process of the relay apparatus 30 in step S65, and may transmit the selection information in step S66.

Next, referring to FIG. 5A, FIG. 5B, and FIG. 23, a process of transmitting and receiving image data and audio data between the request source terminal 10*aa* and the destination terminal 10*db* in order to perform a video conference will be described. First, the request source terminal 10*aa* transmits image data of a subject taken by the imaging unit 14*a* and audio data of voice input to the audio input unit 15*a*, from the transmission and reception unit 11 to the relay apparatus 30*a* via the communication network (step S81). It should be noted that, according to the embodiment, high quality image data including the low resolution data, the medium resolution data, and the high resolution data illustrated in FIGS. 6A through 6C, and audio data are transmitted. With the above operation, the transmission and reception unit 31 of the relay apparatus 30*a* receives the image data with the three resolutions and the audio data. Further, the data quality checking unit 33 checks image quality of the relayed image data by using an IP address "1. 3. 2. 4" of the destination terminal 10*db* as a search key, searching the change quality management table (refer to FIG. 7), and extracting the image quality of the corresponding relayed image data (step S82). According to the embodiment, the checked image quality of the image data is "high quality", which is the same as the image quality of the image data received by the transmission and reception unit 31. As a result, the received image data and the audio data are transferred to the destination terminal 10*db* with the same image quality and audio quality (step S83). With the above operation, the transmission and reception unit 11 of the destination terminal 10*db* receives the image data and the audio data, the image display control unit 14*b* can display an image on the display 120 based on the received image data, and the voice output unit 15*b* can output voice based on the received audio data.

Next, the delay detection unit 17 of the transmission terminal 10*db* detects delay time of the image data received by the transmission and reception unit 11 at a predetermined period (every one second) (step S84). It should be noted that, according to the embodiment, the following description is based on a case where the delay time is 200 ms.

The transmission and reception unit 11 of the destination terminal 10*db* transmits the delay information indicating the delay time "200 ms" to the transmission management system 50 via the communication network 2 (step S85). With the above operation, the transmission management system 50 obtains the delay time and an IP address "1. 3. 2. 4" of the transmission terminal 10*db* as a transmission source of the delay information.

Next, the delay time management unit 60 of the transmission management system 50 searches the terminal management table (refer to FIG. 10) by using an IP address "1. 3. 2. 4" of the destination terminal 10*db* as a search key, extracts a corresponding terminal ID "01*db*", and further, stores the delay time "200 ms" indicated by the delay information in a delay time field of a record in the session management table (refer to FIG. 12) of the session management DB 5005, in which record the extracted terminal ID "01*db*" is included (step S86).

Next, the quality determination unit 58 determines the image quality as "medium image quality" by searching the quality management table (refer to FIG. 15) by using the above delay time "200 ms" as a search key, and extracting the corresponding image quality of the image data "medium image quality" (step S87).

Next, the transmission and reception unit 51 extracts an IP address "1. 2. 1. 2" of the corresponding relay apparatus 30*a* by searching the relay apparatus management table (refer to FIG. 8) by using the relay apparatus ID "111*a*" associated with the terminal ID "01*db*" in the session management table (refer to FIG. 12) as a search key (step S88). Further, the transmission and reception unit 51 transmits quality information indicating the image quality of the image data "medium image quality" determined in step S87 to the relay apparatus 30a via the communication network 2 (step S89). In the quality information, the IP address "1. 3. 2. 4" of the destination terminal 10db used as a search key in step S86 is included. With the above operation, the change quality management unit 34 of the relay apparatus 30a associates the IP address "1. 3. 2. 4" of the transmission terminal 10 (here, the destination terminal 10db) with the image quality of the relayed image data "medium image quality", and stores the association result in the change quality management table (refer to FIG. 7) (step S90).

Next, similar to step S81, the transmission terminal 10aa continues transmitting the image data including the low quality image data, the medium quality image data, and the hight quality image data, and the audio data to the relay apparatus 30a (step S91). With the above operation, similar to step S82, the data quality checking unit 33 of the relay apparatus 30a checks image quality of the relayed image data by using an IP address "1. 3. 2. 4" of the destination terminal 10db as a search key, searching the change quality management table (refer to FIG. 7), and extracting the image quality "medium image quality" of the corresponding relayed image data (step S92). According to the embodiment, the checked image data quality is "medium image quality", which is lower than the image quality "high image quality" of the image data received by the transmission and reception unit 31. As a result, the data quality change unit 35 changes the quality of the image of the image data by lowering the quality of the image data from "high image quality" to "medium image quality" (step S93). Further, the transmission and reception unit 31 transmits the image data whose image quality has been changed to "medium image quality" and the audio data whose audio quality has not been changed to the transmission terminal 10db via the communication network 2 (step S94). As described above, in the case where a reception delay occurs at the destination terminal 10db that receives the image data, the relay apparatus 30a can change the image quality in order not to give a feeling of strangeness to participants of the video conference.

Next, a process will be described referring to FIG. 25, in which, after the relay apparatus 30 is determined, an entire screen on which document data stored in the storage unit 4000 of the external input apparatus 40 is displayed is shared. Here, an example will be described in which information displayed by the external input apparatus 40aa connected to the transmission terminal 10aa is displayed by the transmission terminal 10db as a destination terminal.

As described above, when the relay apparatus 30 is determined, the relay apparatus ID "111a" and the IP address "1. 3. 2. 4" of the destination terminal 10db transmitted by the transmission management system 50 in S67-21 are received by the transmission and reception unit 11 of the transmission terminal 10aa, and the received relay apparatus ID "111a" and the IP address "1. 3. 2. 4" are stored in the storage unit 1000 by the storing and reading processing unit 19 (step S67-22).

Further, when the external input apparatus 40aa is connected to the transmission terminal 10aa, the connection detection unit 42 of the external input apparatus 40aa detects the connection (step S70). When the connection detection unit 42 detects that the external input apparatus 40aa is connected to the transmission terminal 10aa, the installation determination unit 43 determines whether the display data transmission unit 452 has already been installed as illustrated in FIG. 28 (step S71). In the case where it is determined that the display data transmission unit 452 has not been installed, the program obtaining unit 44 obtains the display data transmission unit 452 stored in the transmission terminal 10aa, and installs the obtained display data transmission unit 452. When the display data transmission unit 452 is installed in step S72, the external input apparatus 40aa requests the transmission terminal 10aa to permit the display data obtaining unit 451 to perform the process (step S73). When the transmission terminal 10aa permits the display data obtaining unit 451 of the external input apparatus 40aa to perform the process, the display data obtaining unit 451 obtains the display data (step S74). Next, the display data transmission unit 452 transmits the display data obtained by the display data obtaining unit 451 to the transmission terminal 10aa (step S75).

In the case where it is determined that the display data transmission unit 452 has been installed in step S71, the process moves to step S73.

When the external information transmission and reception unit 18 of the transmission terminal 10aa receives the display data, the storing and reading processing unit 19 obtains the relay apparatus ID "111a" and the IP address "1. 3. 2. 4" of the destination transmission terminal 10db stored in the storage unit 1000 (step S77). Further, the transmission and reception unit 11 transmits the display data and the IP address "1. 3. 2. 4" of the destination transmission terminal 10db to the relay apparatus 30 indicated by the relay apparatus ID "111a" obtained in step S77 (step S78). When the relay apparatus 30 receives the display data transmitted from the transmission terminal 10aa in step S78, the relay apparatus 30 changes the quality of the display data based on the IP address "1. 3. 2 4." of the transmission terminal 10db (step S79), and transmits the display data to the transmission terminal 10db (step S80). The detailed process of step S77 is similar to the process of changing quality of the audio data and the image data described above (step S81 through S94), and thus, the description will be omitted. When the transmission and reception unit 11 of the transmission terminal 10db receives the display data transmitted by the relay apparatus 30, the image display control unit 14b displays the received display data. In an example illustrated in FIG. 27, the image displayed by the external input apparatus 40aa is displayed on the left portion of a screen based on the display data, and the image data, taken by the imaging unit 14a of the transmission terminal 10aa and transmitted by the transmission and reception unit 11, is displayed on the upper right portion of the screen. Further, the image data taken by the imaging unit 14a of the transmission terminal 10db is displayed on the lower right portion of the screen.

(Process and Operation of Display Control)

Figure 31A:
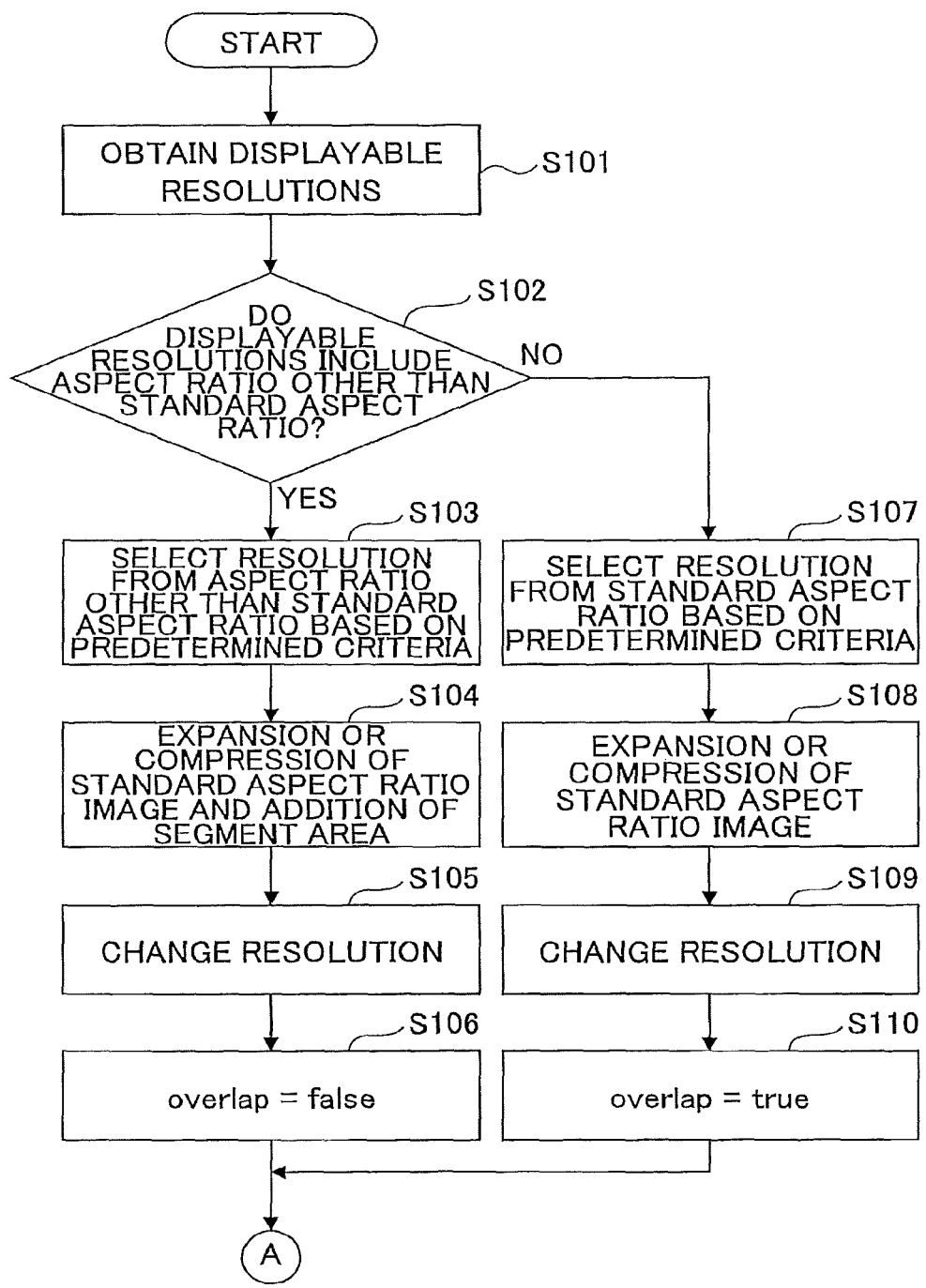
FIG. 31A is a process flowchart illustrating an example of a resolution control process.
Figure 31B:
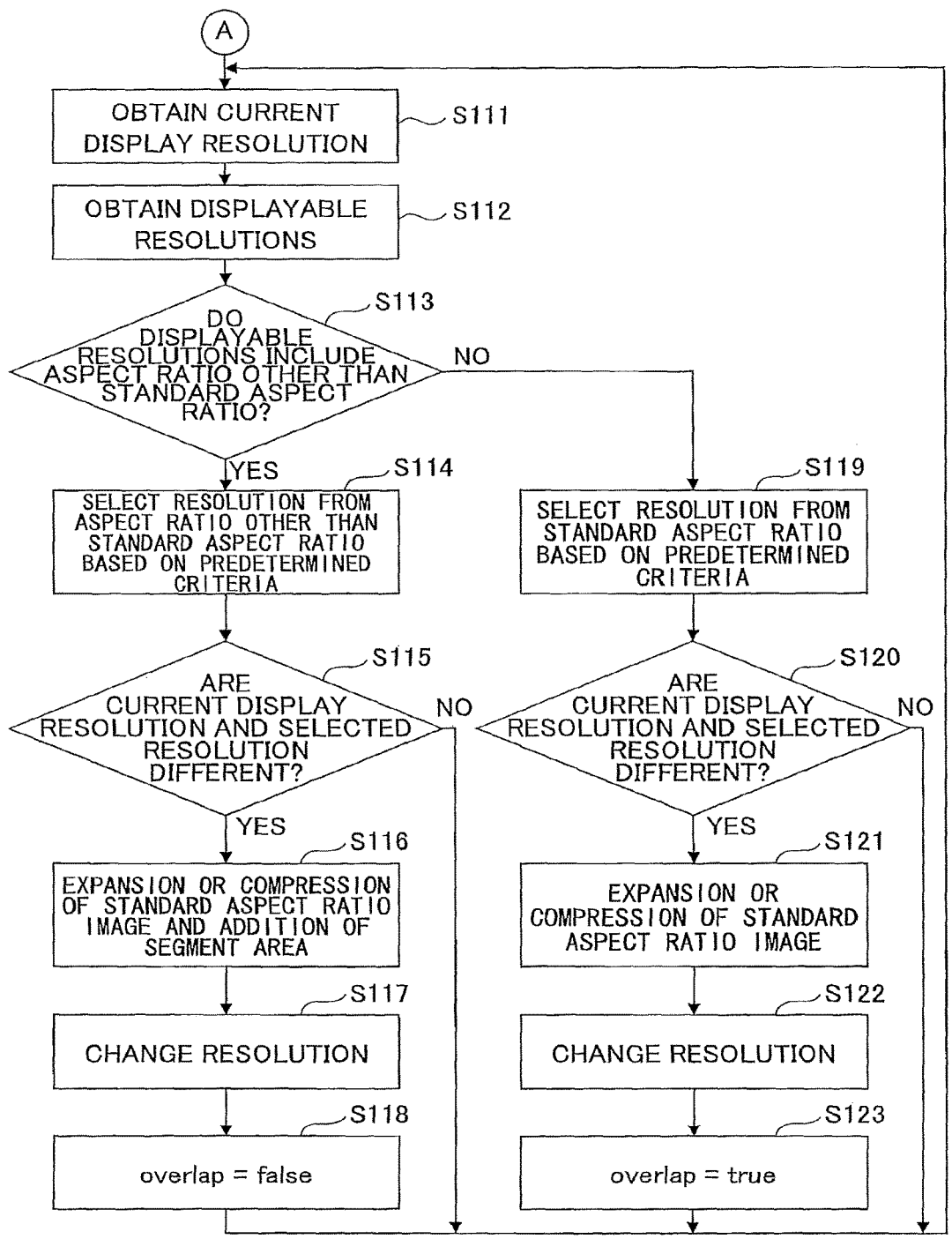
FIG. 31B is a process flowchart illustrating an example of a resolution control process.

FIG. 31A and FIG. 31B are process flowcharts illustrating an example of a resolution control process by the image display control unit 14b of the transmission terminal 10.

In FIG. 31A, when the process is started by turning on the power supply of the transmission terminal, the resolution obtaining unit 14b10 of the image display control unit 14b accesses the display 120 and obtains displayable resolutions (step S101).

Next, the resolution determination unit 14b11 determines whether the displayable resolutions include a resolution of an aspect ratio other than the standard aspect ratios used for image data transmission between the transmission terminal 10 and the relay apparatus 30 (for example, 16:9, and resolution example 1280×720) (step S102). The reason for determining whether an resolution of an aspect ratio other than the standard aspect ratios is included is to, if possible, select the resolution of an aspect ratio other than the standard aspect ratio, and to add a segment area for displaying auxiliary information.

In the case where the resolution of an aspect ratio other than the standard aspect ratios is included (YES in step S102), the resolution selection unit 14*b*12 selects a resolution from the resolutions of aspect ratios other than the standard aspect ratios based on a predetermined criterion (step S103). As the predetermined criterion, various criteria may be used including preferably selecting the highest resolution (resolution having the maximum value of width× height), preferably selecting a resolution of a specific aspect ratio (e.g., 8:5), selecting a resolution preferable for the character size and the number of characters of the auxiliary information, defining the preferable resolution by a user (e.g., WXGA (1280×800), XGA (1024×768)).

Next, the image processing unit 14*b*13 expands or compresses the image data internally generated with the standard aspect ratio into the selected resolution, and adds a segment area (step S104). The image processing unit 14*b*13 specifically performs the following process. First, the image processing unit 14*b*13 expands or compresses the image data in such a way that the width of the converted image matches the the width of the selected resolution. In the case where the widths before and after the conversion are the same, no expansion or compression is performed (or, expansion rate or compression rate is one). Next, the image processing unit 14*b*13 examines the height of the image after the conversion, and adds the segment area to the lower end of the converted image. The position to which the segment area is added is not limited to the lower end of the image, but the segment area may be added to the upper end of the image, or segment areas of a half height may be added to the upper end and the lower end of the image.

Figure 32A:
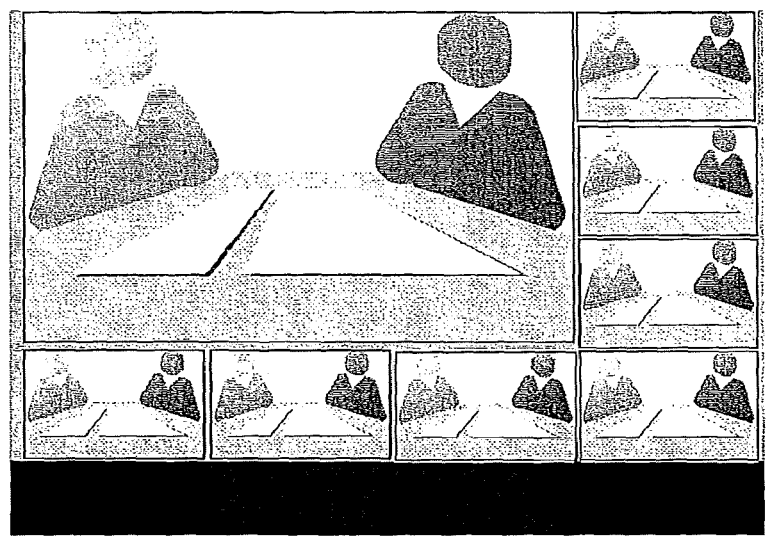
FIG. 32A is an example of a screen in the case where a segment area is added.
Figure 35A:
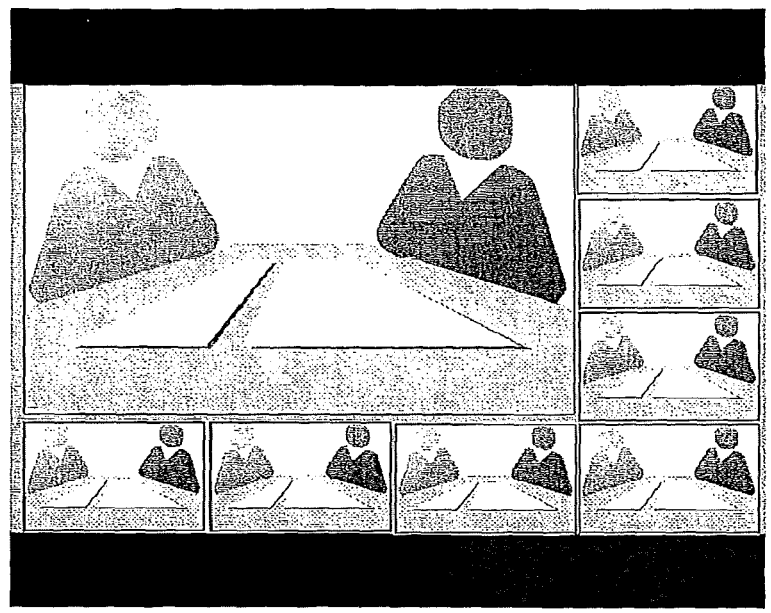
FIG. 35A is an example of a screen in the case where segment areas are added to an upper end and a bottom end.

FIG. 32A is an example of a case where a resolution of an aspect ratio 8:5 is selected for the image data of the standard aspect ratio 16:9, and illustrates a state in which a segment area is added to the lower end of the image data indicated by black color. It should be noted that the original data of the aspect ratio 16:9 is created by receiving image data items from the relay apparatuses of eight sites including the site of the transmission terminal 10, and by synthesizing the image data items by using a resolution of 1280×720. Further, FIG. 35A is an example of a case where a resolution of an aspect ratio 4:3 is selected for the image data of the standard aspect ratio 16:9, and illustrates a state in which two segment areas are added to the upper end and the lower end of the image data, respectively.

Next, referring back to FIG. 31A, the resolution change unit 14*b*15 changes the resolution of the display 120 to the selected resolution (step S105). With the above operation, the display 120 displays an image with the changed resolution.

Next, the flag setting unit 14*b*14 sets the overlap flag to false (step S106). The overlap flag is referenced when the image display control unit 14*b* detects an error or the like and displays auxiliary information other than the currently displaying image data. The value of the overlap flag is true when the auxiliary information is displayed in such a way that the auxiliary information is superimposed upon the currently displaying image data, and is false when the auxiliary information is not superimposed upon the currently displaying image data. A detailed control process of the auxiliary information will be described later.

On the other hand, in the case where the resolution of an aspect ratio other than the standard aspect ratios is not included (NO in step S102), the resolution selection unit 14*b*12 selects a resolution from the resolutions of the standard aspect ratios based on a predetermined criterion (step S107). The predetermined criterion is similar to the criterion in step S103.

Figure 32B:
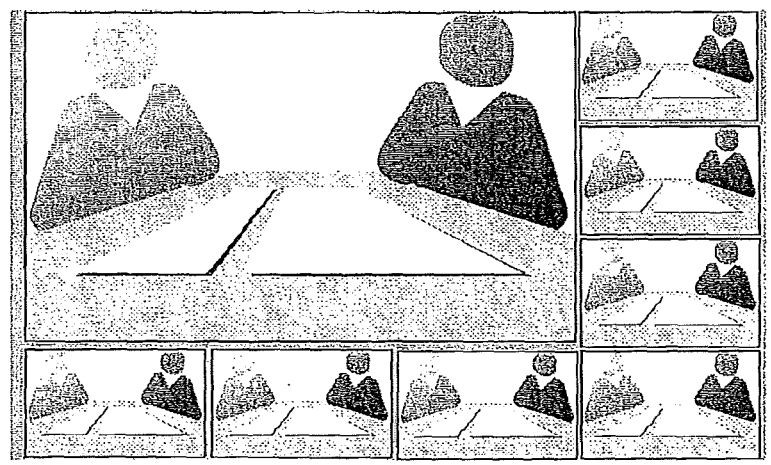
FIG. 32B is an example of a screen in the case where a segment area is not added.

Next, the image processing unit 14*b*13 expands or compresses the image data internally generated with a standard aspect ratio into the selected resolution (step S108). In this case, because the ratios before and after the conversion is the same, no blank area is generated in the width direction or in the height direction of the image data and no segment area is added. FIG. 32B illustrates an example of a screen in which the imaged data is expanded or compressed and displayed without having added segment area.

Next, referring back to FIG. 31A, the resolution change unit 14*b*15 changes the resolution of the display 120 to the selected resolution (step S109).

Next, the flag setting unit 14*b*14 sets the overlap flag to true (step S110).

The process described so far is an initial process when the power supply of the transmission terminal 10 is turned on. The following process is a loop process corresponding to a case where the display 120 is replaced after the power supply is turned on.

In FIG. 31B, the resolution obtaining unit 14*b*10 accesses the display 120 and obtains the resolution with which the display 120 currently displays an image (step S111).

Next, the resolution obtaining unit 14*b*10 accesses the display 120 and obtains the displayable resolutions with which the display 120 can display an image (step S112).

Next, the resolution determination unit 14*b*11 determines whether the displayable resolutions include a resolution of an aspect ratio other than the standard aspect ratios used for image data transmission between the transmission terminal 10 and the relay apparatus 30 (for example, 16:9) (step S113).

In the case where the resolution of an aspect ratio other than the standard aspect ratios is included (YES in step S113), the resolution selection unit 14*b*12 selects a resolution from the resolutions of aspect ratios other than the standard aspect ratios based on a predetermined criterion (step S114). The predetermined criterion is similar to the criterion in step S103.

Next, the resolution determination unit 14*b*11 determines whether the resolution with which the display 120 currently displays an image and the selected resolution are different (step S115).

In the case where the current display resolution and the selected resolution are different (YES in step S115), image processing unit 14*b*13 expands or compresses the image data internally generated with the standard aspect ratio into the selected resolution, and adds a segment area (step S116).

Next, the resolution change unit 14*b*15 changes the resolution of the display 120 to the selected resolution (step S117).

Next, the flag setting unit 14*b*14 sets the overlap flag to false (step S118).

In the case where the current display resolution and the selected resolution are not different (NO in step S115), processes in step S116 through S118 are not performed because it is not necessary to change the resolution.

On the other hand, in the case where the resolution of an aspect ratio other than the standard aspect ratios is not included (NO in step S113), the resolution selection unit 14*b*12 selects a resolution from the resolutions of the standard aspect ratios based on a predetermined criterion (step S119). The predetermined criterion is similar to the criterion in step S103.

Next, the resolution determination unit 14*b*11 determines whether the resolution with which the display 120 currently displays an image and the selected resolution are different (step S120).

In the case where the current display resolution and the selected resolution are different (YES in step S120), image processing unit 14*b*13 expands or compresses the image data internally generated with the standard aspect ratio into the selected resolution (step S121).

Next, the resolution change unit 14*b*15 changes the resolution of the display 120 to the selected resolution (step S122).

Next, the flag setting unit 14*b*14 sets the overlap flag to true (step S123).

In the case where the current display resolution and the selected resolution are not different (NO in step S120), processes in step S121 through S123 are not performed.

The above processes are repeated as long as the program is running. As a result, even in the case where another display 120 with different resolutions is reconnected, processes of FIG. 31A and FIG. 31B are continued to be performed. The above repetitive processes correspond to a process of periodically monitoring a change of resolution of the display 120, which process may be performed by introducing an event-driven mechanism well-known for the program Windows (registered trademark). In this case, an event notification is registered at the start of the program so that the event notification is performed in the case where there is a change of resolution by having another display 120 connected. Afterwards, every time the event occurs, the image display control unit 14*b* performs processes in step S111 and the subsequent steps in FIG. 31B. It should be noted that the event notification only indicates that the change of resolution is performed and may not indicate that the temporary storage of resolution information has been completed. Therefore, if the processes in step S111 and the subsequent steps are performed right after receiving the event notification when the temporary storage of resolution information has not been completed, the processes may cause an error. In order to avoid such an error, it is preferable to wait for a predetermined period before going to step S111. There is a case where the similar problem may happen right after the beginning of the process. In order to avoid such a case, it is preferable to add a process of waiting for a predetermined period before step S101. The correct resolution information can be referenced by adding wait time.

Figure 33:
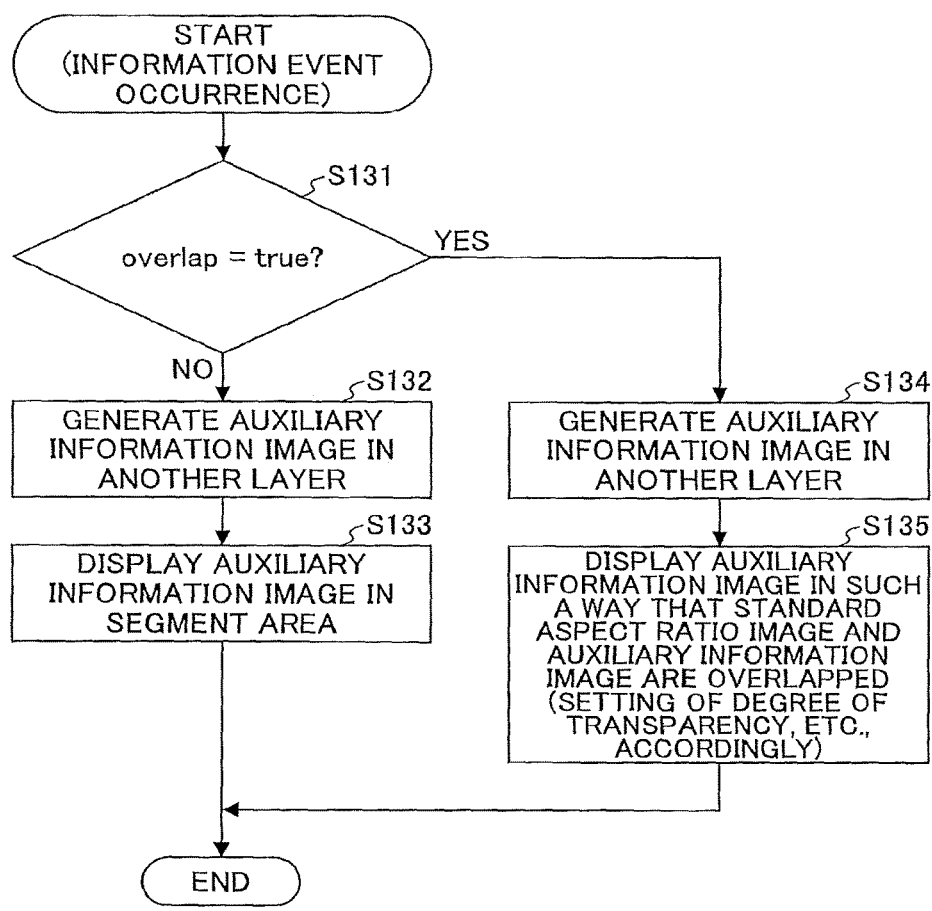
FIG. 33 is a process flowchart illustrating an example of an auxiliary information display process.

FIG. 33 is a process flowchart illustrating an example of an auxiliary information display process.

In FIG. 33, when an information event for displaying auxiliary information such as an operation menu or an error message occurs and the process is started, the auxiliary information image generation unit 14*b*21 of the image display control unit 14*b* determines whether the overlap flag is true (step S131).

In the case where the overlap flag is false (NO in step S131), the auxiliary information image generation unit 14*b*21 generates an auxiliary information image in another layer different from the image data (step S132).

Figure 34A:
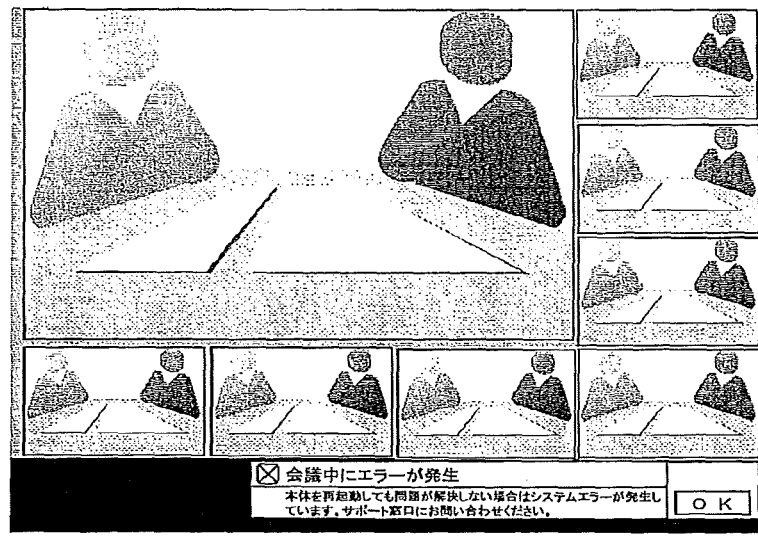
FIG. 34A is an example of an auxiliary information display screen in the case where a segment area is added.
Figure 35B:
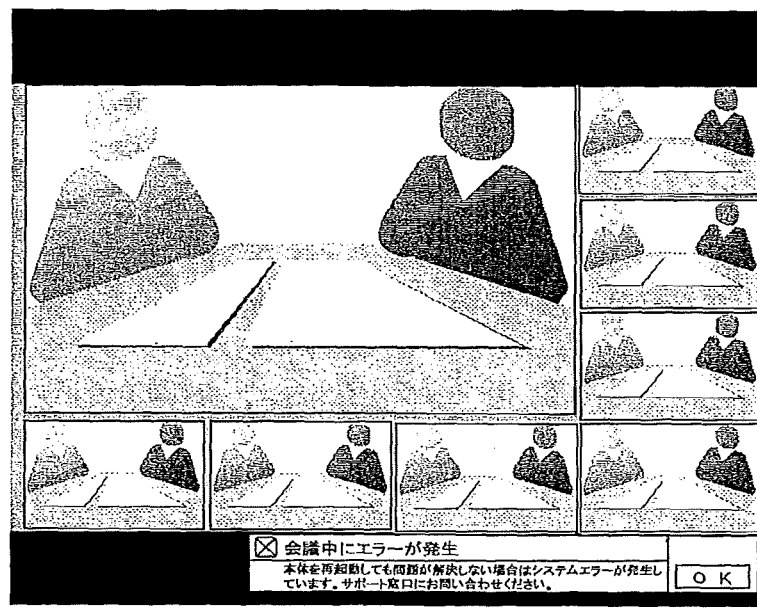
FIG. 35B is an example of a screen in the case where segment areas are added to an upper end and a bottom end.

Next, the auxiliary information image display unit 14*b*22 displays the generated auxiliary information image in the segment area which has been already added in the resolution control process (step S104 in FIG. 31A and step S116 in FIG. 31B) (step S133). Further, the process ends. FIG. 34A illustrates a state in which auxiliary information (an error message and an operation button) is displayed in the segment area added to the lower end of the screen. It should be noted that when an OK button displayed in the right area is pressed by a user in a state where an error message is displayed, the operation input accepting unit 12 of the transmission terminal 10 accepts the pressed button input. Afterwards, the image display control unit 14*b* stops displaying the error message, and returns the display of the display 120 to a state illustrated in FIG. 32A. FIG. 35B illustrates a state in which auxiliary information (an error message and an operation button) is displayed in the segment area added to the lower end of the screen when there are segment areas added to the upper end and the lower end of the screen.

It should be noted that, in the above screen example, error information is indicated as the auxiliary information, but an embodiment is not limited to this example. An embodiment can be applied to any case where information other than the image data needs to be displayed. For example, in the case where it is necessary to display an operation menu on the display 120, used by a user to end the conference, the image display control unit 14*b* displays the operation menu when the operation input accepting unit 12 receives a pressed input of a disconnect button of the transmission terminal 10 from the user. In this case, the display content of the screen is changed to "END CONFERENCE?", "CONFERENCE ENDS BY SELECTING OK. CONFERENCE CONTINUES BY SELECTING CANCEL.", etc., and a CANCEL button is displayed in the right area in addition to the OK button. The selection of the user may be accepted from the OK button and the CANCEL button (not shown). Other than the above, information on the transmission terminals 10 managed by the transmission management system 50, information on the participants of the conference, etc., may be displayed as the auxiliary information.

Next, referring back to FIG. 33, in the case where the overlap flag is true (YES in step S131), the auxiliary information image generation unit 14*b*21 generates an auxiliary information image in another layer different from the image data (step S134).

Figure 34B:
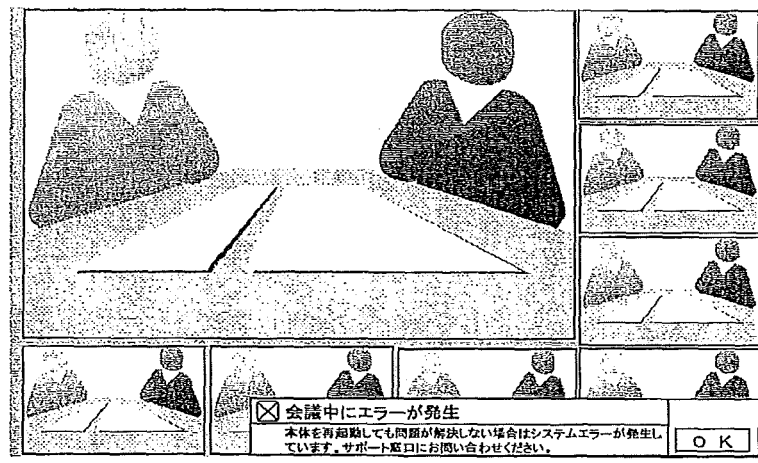
FIG. 34B is an example of an auxiliary information display screen in the case where a segment area is not added.

Next, the auxiliary information image display unit 14*b*22 displays the generated auxiliary information image superimposed upon, for example, the lower part of the image of the standard aspect ratio (step S135). Here, to display the auxiliary information image superimposed upon the original image means to display pixels of the auxiliary information image instead of pixels of the original image data, which pixels exist in the display range of the auxiliary information image. It is possible to display the pixels of the original image data existing behind the auxiliary information in the background portion of the auxiliary information, or to display pixels in mixed color mixed with the pixels of the original image data, by making the background portion of the auxiliary information transparent or semi-transparent. In practice, the above operation can be realized by using image processing functions provided by an operating system (OS) of a computer included in the transmission terminal 10, by specifying the auxiliary information image and the display position, by specifying that the auxiliary information image should be displayed on a front-most surface, and, if necessary, by specifying the degree of transparency. Further, after displaying the auxiliary information image, the process ends. FIG. 34B illustrates a state in which auxiliary information (an error message and an operation button) is displayed in the lower part of the main image of the screen.

With the above operation, according to the capability of the display 120 connected to the transmission terminal 10, the viewability of the original image data and the auxiliary information image can be increased and the screen area can be used effectively. In other words, the viewability can be increased by selecting the appropriate resolution from the displayable resolutions of the display 120. Further, the viewability of the auxiliary information can be also secured by changing the display method of the auxiliary information according to the aspect ratio. It should be noted that, as described above, the display method of the auxiliary information includes a method of displaying the auxiliary information in the segment area added to the image data, and a method of displaying the auxiliary information superimposed upon the image data. The method of displaying the auxiliary information superimposed upon the image data normally involves a complicated layer implementation and leads to slow processing. According to the embodiment, a priority is given to selecting a resolution in which non-superimposition display method is involved, and thus, the resolution which results in a faster display can be selected without requiring operation load of a user.

Next, FIG. 36 through FIG. 38B illustrate another embodiment of the display control. According to the above, a process based on aspect ratios of the display 120 is performed. According to the following, the resolution management table is introduced, and the display control can be set in detail for each of the resolutions.

FIG. 36 and FIG. 37 illustrate an example of the resolution management table used in an embodiment. The resolution management table illustrated in FIG. 36 and FIG. 37 includes items of "item name", "resolution", "overlap (overlap flag)", and "segment value". The "item name" is a code for identifying a line of data (line data). The "resolution" defined in the line data includes a width value and a height value which indicate a number of width pixels and a number of height pixels, respectively. The "overlap (overlap flag)" indicates whether the auxiliary information is superimposed upon the original image data, "true" is set in the case of superimposition, and "false" is set in the case of non-superimposition. In the case of non-superimposition, the auxiliary information is displayed in the added segment area. The "segment value" is information indicating a size and a position of the segment area, which is used for controlling the added segment area in the case where the "overlap" is "false", and which has values for width, height, and position. The values for width and height indicate a number of width pixels and a number of height pixels, respectively. A segment area indicated by the value for width and height is added to the image data. Further, the value for position includes "lower", "upper", and "both", which respectively indicate a case where the segment area defined by the values for width and height is added to the lower end of the image, a case where the segment is added to the upper end of the image, and a case where the segments are added to respective ends of the image. It should be noted that, in the case where "overlap" is "true", the segment value is "not available (NA): no data". When the segment value is "NA", the segment area is not added.

It should be noted that FIG. 36 is an example in which the higher is the resolution of a record, the record is positioned in the higher line (the line closer to the top). FIG. 37 is an example in which records without superimposition (resolution with overlap "false") are positioned in higher lines. In the case illustrated in FIG. 37, a preference is given to a resolution with which the auxiliary information is displayed without superimposition upon the image data, which is advantageous in the case where, according to a design policy, it is desired that the display speed is increased or it is not desired that the auxiliary information is superimposed upon the image data even if it is temporary. Different display control according to other criteria may be implemented by changing the configuration of the resolution management table.

Figure 38A:
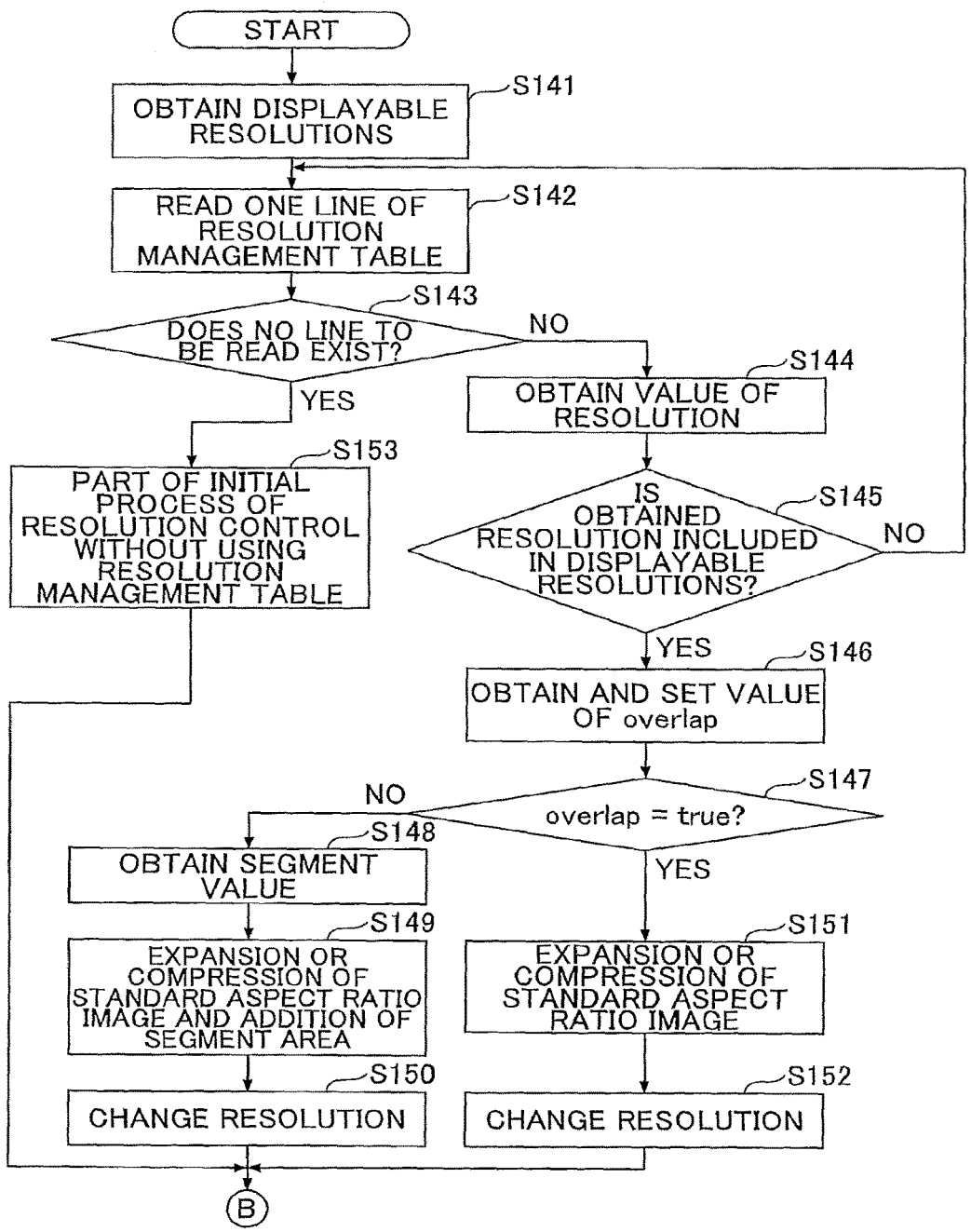
FIG. 38A is a process flowchart illustrating another example of a resolution control process.
Figure 38B:
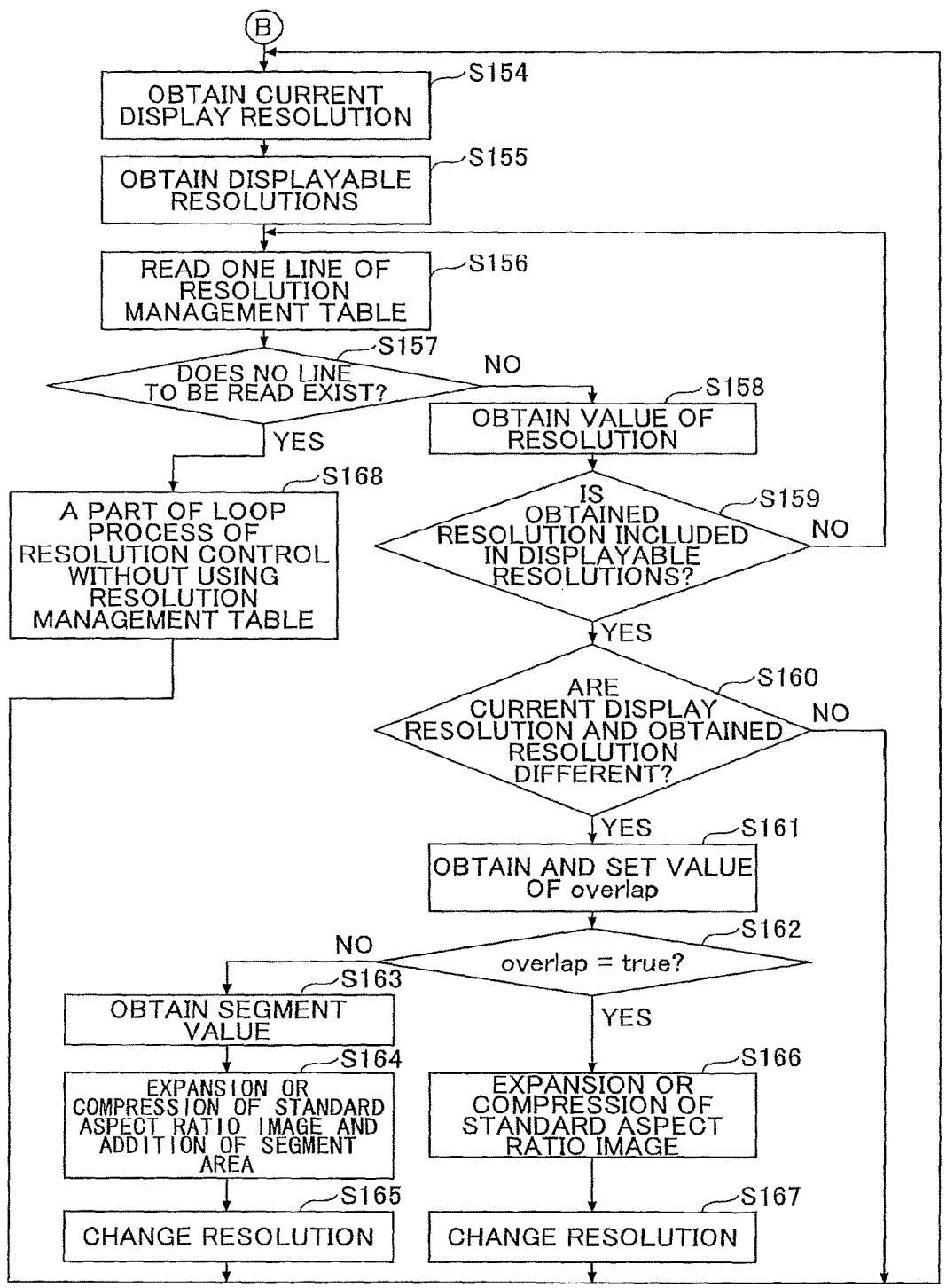
FIG. 38B is a process flowchart illustrating another example of a resolution control process.

FIG. 38A and FIG. 38B are process flowcharts illustrating an example of a control process according to an embodiment.

In FIG. 38A, when the process is started by turning on the power supply of the transmission terminal 10, the resolution obtaining unit 14b10 of the image display control unit 14b accesses the display 120 and obtains displayable resolutions (step S141).

Next, the resolution management table reading unit 14b16 tries to read one line of data of the resolution management table (step S142), and determines whether there is no line to be read (step S143).

In the case where there isn't no line to be read (there is a line to be read) (NO in step S143), the resolution obtaining unit 14b10 obtains values of resolution (width value and height value) from the read line data (step S144).

Next, the resolution determination unit 14b11 determines whether the obtained resolution is included in the displayable resolutions (step S145). In the case where the obtained resolution is not included in the displayable resolutions (NO in step S145), the process returns to reading the next line data in the resolution management table (step S142). In the case where the obtained resolution is included in the displayable resolutions (YES in step S145), the flag obtaining unit 14b17 obtains a value of the overlap flag from the read line data, and the flag setting unit 14b14 sets the obtained value to an overlap flag for management (step S146).

Next, the flag determination unit 14b18 determines whether the obtained-and-set overlap flag is true (step S147).

In the case where the obtained-and-set overlap flag is false (NO in step S147), the segment value obtaining unit 14b19 obtains the segment values from the read line data (step S148).

Next, the image processing unit 14b13 expands or compresses the image data internally generated with the standard aspect ratio into the obtained resolution, and adds a segment area (step S104) based on the obtained segment values (step S149). In other words, the image data is expanded or compressed symmetrically to the width direction and the height direction according to the width value of the obtained resolution. Afterwards, a segment area defined by the width value and the height value of the obtained resolution is created. The created segment area is added to the expanded or compressed image data at a position defined by the position value.

Next, the resolution change unit 14b15 changes the resolution of the display 120 to the obtained resolution (step S150).

Further, in the case where the overlap flag is true (YES in step S147), image processing unit 14b13 expands or compresses the image data internally generated with the standard aspect ratio into the obtained resolution (step S151).

Next, the resolution change unit 14b15 changes the resolution of the display 120 to the obtained resolution (step S152).

Further, in the case where there is no line to be read (YES in step S143), a part of the initial processes of the resolution control without using the resolution management table, that is, processes similar to steps S102 through S110 of FIG. 31A, are performed (step S153).

The process described so far is an initial process when the power supply of the transmission terminal 10 is turned on.

The following process is a loop process corresponding to a case where the display 120 is replaced after the power supply is turned on.

In FIG. 38B, the resolution obtaining unit 14b10 accesses the display 120 and obtains the resolution with which the display 120 currently displays an image (step S154).

Next, the resolution obtaining unit 14b10 accesses the display 120 and obtains the displayable resolutions with which the display 120 can display an image (step S155).

Next, the resolution management table reading unit 14b16 tries to read one line of data of the resolution management table (step S156), and determines whether there is no line to be read (step S157).

In the case where there isn't no line to be read (NO in step S157), the resolution obtaining unit 14b10 obtains values of resolution from the read line data (step S158).

Next, the resolution determination unit 14b11 determines whether the obtained resolution is included in the displayable resolutions (step S159). In the case where the obtained resolution is not included in the displayable resolutions (NO in step S159), the process returns to reading the next line data in the resolution management table (step S156).

In the case where the obtained resolution is included in the displayable resolutions (YES in step S159), the resolution determination unit 14b11 determines whether the current display resolution and the obtained resolution are different (step S160).

In the case where the current display resolution and the obtained resolution are different (YES in step S160), the flag obtaining unit 14b17 obtains a value of the overlap flag from the read line data, and the flag setting unit 14b14 sets the obtained value to the overlap flag for management (step S161).

Next, the flag determination unit 14b18 determines whether the obtained-and-set overlap flag is true (step S162).

In the case where the obtained-and-set overlap flag is false (NO in step S162), the segment value obtaining unit 14b19 obtains the segment values from the read line data (step S163).

Next, the image processing unit 14b13 expands or compresses the image data internally generated with the standard aspect ratio into the obtained resolution, and adds a segment area based on the obtained segment values (step S164).

Next, the resolution change unit 14b15 changes the resolution of the display 120 to the obtained resolution (step S165).

Further, in the case where the overlap flag is true (YES in step S162), image processing unit 14b13 expands or compresses the image data internally generated with the standard aspect ratio into the obtained resolution (step S166).

Next, the resolution change unit 14b15 changes the resolution of the display 120 to the obtained resolution (step S167).

Further, in the case where the current display resolution and the obtained resolution are not different (NO in step S160), processes in step S161 through S167 are not performed.

Further, in the case where there is no line to be read (YES in step S157), a part of the loop processes of the resolution control without using the resolution management table, that is, processes similar to steps S113 through S123 of FIG. 31B, are performed (step S168).

The above processes are repeated, similar to the previous embodiment, as long as the program is running. As a result, even in the case where another display 120 with different resolutions is reconnected, processes of FIG. 38A and FIG. 38B is continued to be performed. As described before, the above repetitive processes may be performed by introducing an event-driven mechanism.

The display process of the auxiliary information is similar to the process illustrated in FIG. 33.

According to an embodiment, the criteria of the display form can be changed by rewriting the resolution management table, which is advantageous in terms of maintenance compared with a case where it is necessary to change the program. In other words, even if it becomes necessary to change the display control in the future, the display control can be changed only by adding, deleting, and changing the items in the resolution management table, which is easier than directly changing the program, and thus, the display control can be maintained easily. Therefore, according to an embodiment, it is advantageous that, in the case where a new display with higher resolution and good viewability appears in the future, the resolution of the new display can be controlled easily.

Next, FIG. 39 through FIG. 41B illustrate yet another embodiment of the display control. In an embodiment described above, it is not distinguished whether the display 120 connected to the transmission terminal 10 is an analog type or a digital type. However, in the case where a digital type display 120 is connected, a user often uses a digital input, and the aspect ratio of the digital type is practically the same as the standard aspect ratio of the transmission terminal 10 (the digital type is the mainstream of the future, and the standard aspect ratio of the transmission terminal 10 is designed to be 16:9, which is the same as the aspect ratio of a digital television). Therefore, in the case where it is recognized that the connected display 120 is a digital type, the resolution control is simplified and the processing speed is increased.

Figure 39:
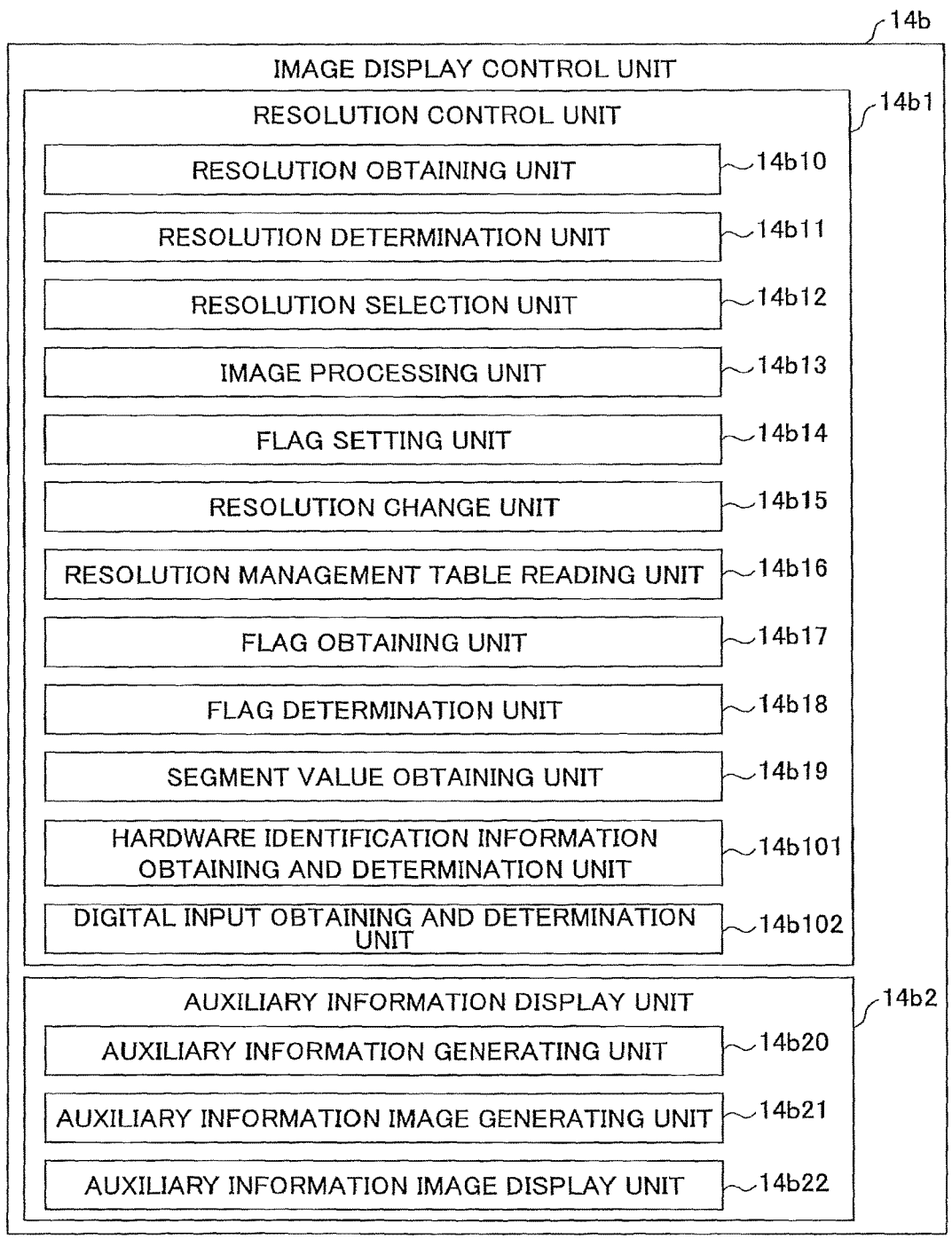
FIG. 39 is a drawing illustrating another example of a structure of an image display control unit.

FIG. 39 is a drawing illustrating an example of a structure of an image display control unit 14b. A hardware identification information obtaining and determination unit 14b101 and a digital input obtaining and determination unit 14b102 are newly added to a configuration of the resolution control unit 14b1 of the image display control unit 14b illustrated in FIG. 29. The hardware identification information obtaining and determination unit 14b101 obtains hardware identification information of the transmission terminal 10, and determines whether a value of the obtained information is, for example, "TV" which indicates corresponding to a digital television. The digital input obtaining and determination unit 14b102 obtains from a connected display 120 information indicating whether the connected display 120 is in a digital input state, and determines whether the connected display 120 is in a digital input state.

FIG. 40 is a drawing illustrating an example of data used in an example of a resolution control process. In FIG. 40, items of "digital input", "recommended resolution", "hardware identification information", etc., are newly added to the items illustrated in FIG. 30. The "digital input" is information obtained from the display 120 for indicating whether the current image input signal is a digital input. The "recommended resolution" is a recommended resolution obtained from the display 120. The recommended resolution corresponds to a (dot by dot) resolution which can be displayed without expansion or compression and which corresponds to a number of display pixels of a full screen. The "hardware identification information" is set in the transmission terminal 10 beforehand at the time of shipping. For example, "TV" is set in the case where the transmission terminal 10 corresponds to a digital television, and "D1" is set in the case where the transmission terminal 10 is for a typical television.

Figure 41A:
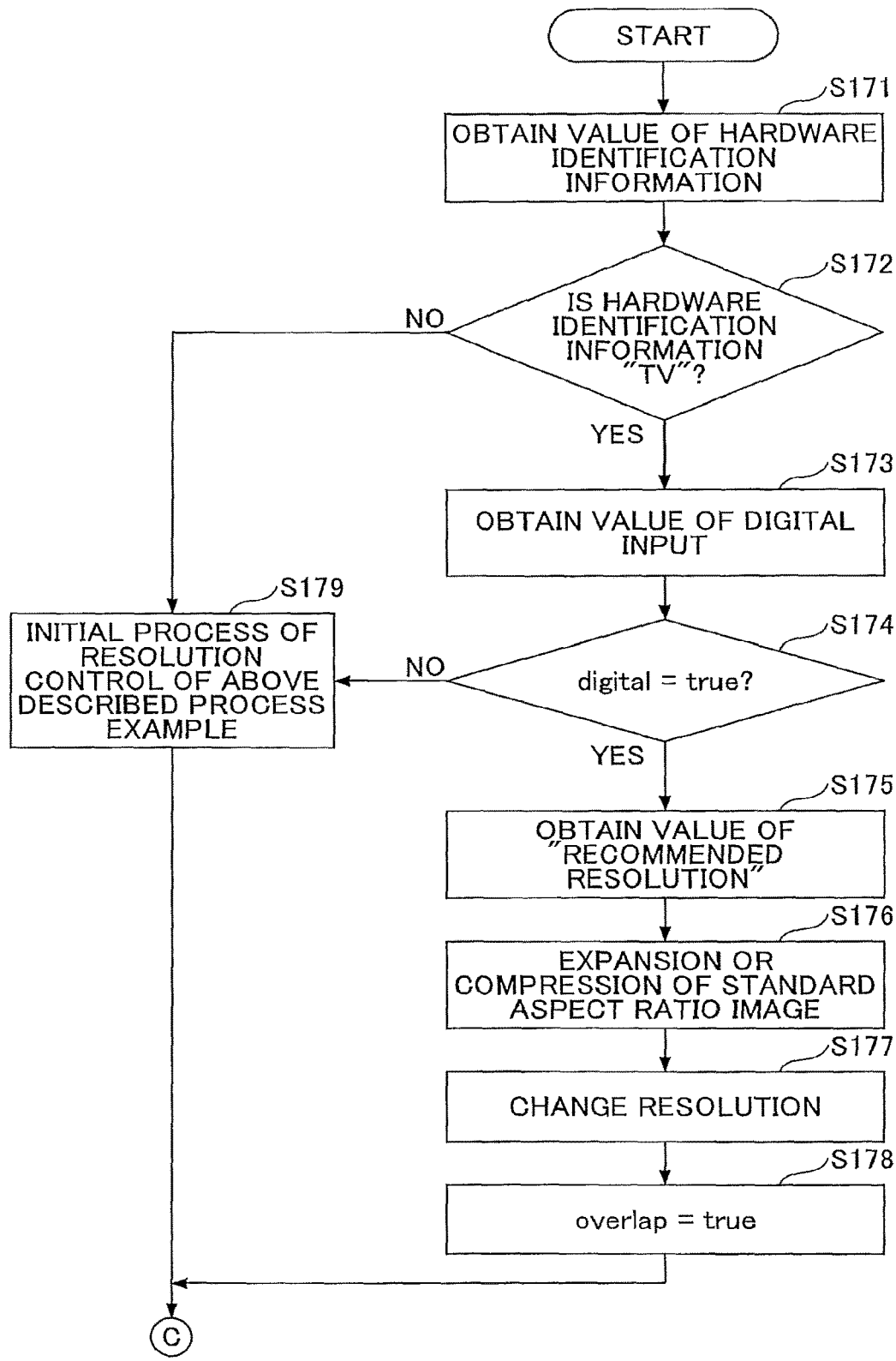
FIG. 41A is a process flowchart illustrating yet another example of a resolution control process.
Figure 41B:
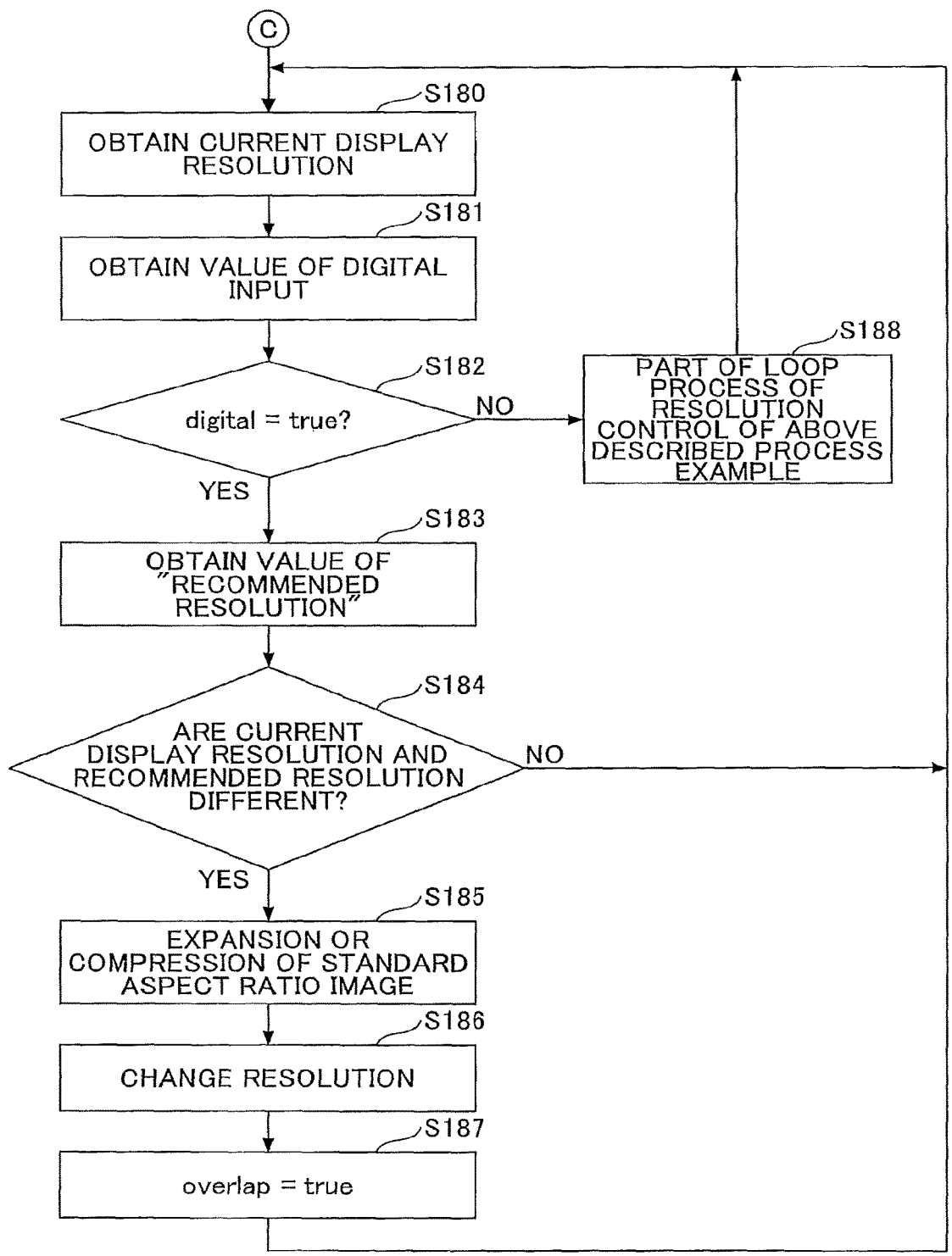
FIG. 41B is a process flowchart illustrating yet another example of a resolution control process.

FIG. 41A and FIG. 41B are process flowcharts illustrating an example of a resolution control process by the image display control unit 14b of the transmission terminal 10.

In FIG. 41A, the process starts when the power supply of the transmission terminal 10 is turned on, and the hardware identification information obtaining and determination unit 14b101 of the image display control unit 14b obtains hardware identification information of the transmission terminal 10 (step S171), and determines whether the hardware identification information is "TV" (step S172).

In the case where the hardware identification information is "TV" (YES in step S172), the digital input obtaining and determination unit 14b102 accesses the display 120, obtains a value of digital input (digital) (step S173), and determines whether the value is "true" (step S174).

In the case where the value of digital input (digital) is "true" (YES in step S174), the resolution obtaining unit 14b10 accesses the display 120 and obtains the recommended resolution (step S175).

Next, the image processing unit 14b13 expands or compresses the image data internally generated with the standard aspect ratio into the obtained recommended resolution (step S176). In this case, because the ratios before and after the conversion is the same, no blank area is generated in the width direction or in the height direction of the image data and no segment area is added.

Next, the resolution change unit 14b15 changes the resolution of the display 120 to the obtained recommended resolution (step S177).

Next, the flag setting unit 14b14 sets the overlap flag to true (step S178).

Further, in the case where the hardware identification information is not "TV" (NO in step S172), or in the case where the value of digital input (digital) is not "true" (NO in step S174), the initial processes of the resolution control as described in the above process example, that is, processes similar to steps S101 through S110 of FIG. 31A, or similar to steps S141 through S152 of FIG. 38A are performed (step S179).

The process described so far is an initial process when the power supply of the transmission terminal 10 is turned on. The following process is a loop process corresponding to a case where the display 120 is replaced after the power supply is turned on.

In FIG. 41B, the resolution obtaining unit 14b10 accesses the display 120 and obtains the resolution with which the display 120 currently displays an image (step S180).

Next, the digital input obtaining and determination unit 14b102 accesses the display 120, obtains a value of digital input (digital) (step S181), and determines whether the value is "true" (step S182).

In the case where the value of digital input (digital) is "true" (YES in step S182), the resolution obtaining unit 14b10 accesses the display 120 and obtains the recommended resolution (step S183), and the resolution determination unit 14b11 determines whether the current display resolution and the obtained recommended resolution are different (step S184).

In the case where the current display resolution and the obtained recommended resolution are different (YES in step S184), image processing unit 14b13 expands or compresses the image data internally generated with the standard aspect ratio into the obtained recommended resolution (step S185).

Next, the resolution change unit 14b15 changes the resolution of the display 120 to the obtained recommended resolution (step S186).

Next, the flag setting unit 14b14 sets the overlap flag to true (step S187).

In the case where the current display resolution and the obtained resolution are not different (NO in step S184), processes in step S185 through S187 are not performed.

Further, in the case where the value of digital input (digital) is not "true" (NO in step S182), a part of the loop processes of the resolution control as described in the above process example, that is, processes similar to steps S112 through S123 of FIG. 31B, or similar to steps S155 through S167 of FIG. 38B are performed (step S188).

The above processes are repeated, similar to the previous embodiment, as long as the program is running. As a result, even in the case where another display 120 with different resolutions is reconnected, processes of FIG. 41A and FIG. 41B is continued to be performed. As described before, the above repetitive processes may be performed by introducing an event-driven mechanism.

The display process of the auxiliary information is similar to the process illustrated in FIG. 33.

According to an embodiment, assuming that the aspect ratio of the display 120 is the same as the standard aspect ratio if the connected display 120 is in a digital input state, the resolution can be set immediately and the speed of the resolution control process can be increased.

<<Main Advantages According to the above Configuration>>

As described above, according to an embodiment, it becomes possible to transmit to the transmission terminal 10db as the other party of the conference display data of documents stored in the storage unit 4000 of the external input apparatus 40 which is not managed by the transmission management system 50 by storing the relay apparatus ID of the relay apparatus 30, which relays the audio data and the image data, in the storage unit 1000 of the transmission terminal 10aa. With the above operation, it is not necessary for the transmission management system 50 to perform a process of authenticating the external input apparatus 40, and thus, management load of the transmission management system 50 can be reduced.

Further, in the case where it is necessary to share a screen displayed on the external input apparatus 40 that does not include the display data obtaining unit 451 and the display data transmission unit 452, the screen can be shared because the display data obtaining unit 451 and the display data transmission unit 452 are installed in the external input apparatus 40 by using as a trigger the connection with the transmission terminal 40.

It may be possible to obtain information, such as an IP address of the relay apparatus 30, related to an environment of LANs 2a through 2d of the communication network 2, but it is difficult to further obtain information related to the Internet 2i of the communication network 2. Therefore, first, a plurality of the relay apparatuses 30 for relaying image data and audio data are narrowed down to two or more of the relay apparatuses 30 based on the obtainable environmental information. Further, before the image data and the audio data are actually transmitted and received among a plurality of the transmission terminals 10, the prior transmission information is transmitted and received, and the relay apparatuses 30 can be narrowed down to a single relay apparatus 30 that has actually relayed the fastest the prior transmission information, which is advantageous.

In other words, it is possible to leave two or more candidates of the relay apparatus 30 which is finally used, by selecting top two or more relay apparatuses 30, assigned IP addresses of which are close to an IP address of any one of the transmission terminals 10. With the above operation, afterwards, by having the prior transmission information transmitted and received between the request source terminal 10A and the destination terminal 10B, the two or more candidates of the final relay apparatus 30 can be narrowed down to a single relay apparatus 30 that has relayed the prior transmission information with the shortest time required from transmission to reception. Therefore, it is possible to realize transmitting and receiving the image data or the audio data with the highest available quality under the current environment of the communication network 2, which is advantageous.

Further, according to the embodiment, when narrowing down the relay apparatuses 30, two or more relay apparatuses 30 are selected, not only by preferentially selecting the relay apparatuses 30 IP addresses of which are closer to the IP addresses of the transmission terminals 10 that perform the video conference, but also by taking into account the maximum data transmission speeds of the relay apparatuses 30. With the above operation, the candidates of the relay apparatus 30 can be narrowed down according to the actual environment of the communication network 2, which is advantageous.

Further, according to the embodiment, when narrowing down the relay apparatuses 30, the narrowing down process starts from narrowing down the relay apparatuses 30 whose operational state is an ONLINE state. Therefore, it is possible to narrow down candidates of the relay apparatus 30 further in line with the actual environment of the communication network 2, which is advantageous.

Further, according to the embodiment, the image data and the auxiliary information are appropriately displayed according to the display capability of the display connected to the transmission terminal. As a result, information necessary for the conference is secured to be displayed, and the viewability of the information is increased. Further, a screen area can be effectively used.

<<Application Example of Transmission Terminal>>

Referring to FIG. 1 through FIGS. 41A, 41B, basic functions and operations of the transmission terminal 10 according to an embodiment have been described above. In the following, referring to FIGS. 42A, 42B through FIG. 47, an application example of the transmission terminal 10 will be described.

As described above, the transmission terminal 10 is capable of outputting video to an external display, a projector, etc., through an analog signal output terminal (hereinafter, referred to as analog terminal) represented by a video graphics array (VGA) terminal. On the other hand, the transmission terminal 10 is also capable of outputting video through a digital signal output terminal (hereinafter, referred to as digital terminal) such as a digital visual interface (DVI) terminal, a high-definition multimedia interface (HDMI) (registered trademark) terminal, a DisplayPort terminal, etc.

Figure 42A:
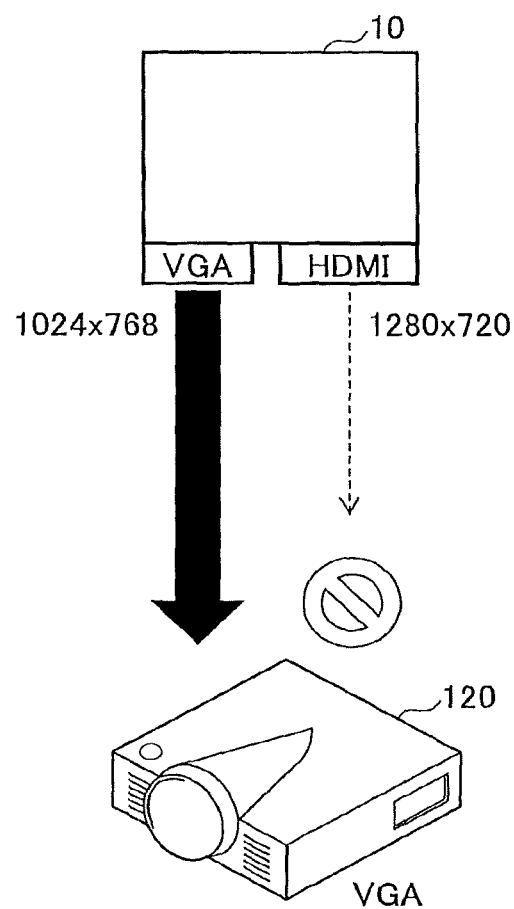
FIG. 42A is a drawing illustrating an example of a connection between a transmission terminal and a projector.
Figure 42B:
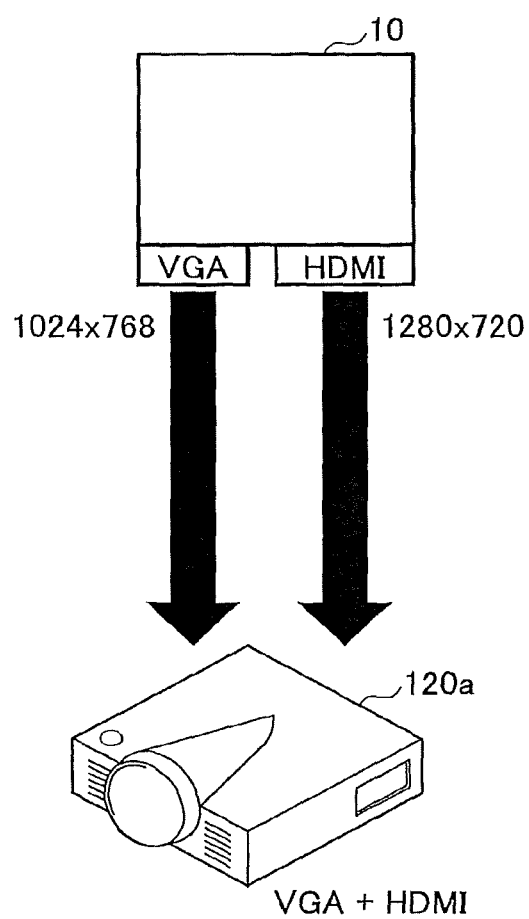
FIG. 42B is a drawing illustrating an example of a connection between a transmission terminal and a projector.

As illustrated in FIG. 42A and FIG. 42B, there is a case where the recommended value or the default value of the resolution of the output video is different between the case where the transmission terminal 10 outputs the video through the analog terminal and the case where the transmission terminal 10 outputs the video through the digital terminal. In general, the recommended value of resolution is often selected according to a supporting state of market-available display devices. For example, in the transmission terminal 10, resolution of "1024×768" or "1280×800" can be used for the video output from the analog terminal, and resolution of "1280×720" (720p) can be used for the video output from the digital terminal.

Here, in the case where the video of the transmission terminal 10 is projected by a projector, an analog terminal is often used because an existing projector often supports only an analog terminal (especially, a VGA terminal) and does not support a digital terminal (FIG. 42A). These days, however, with an increasing popularity of a digital terminal, many projectors with a digital terminal such as a HDMI (registered trademark) terminal have appeared (FIG. 42B).

It can be expected that many users will start to use projectors with a digital terminal from now on. However, it is likely that the users will be confused with a different resolution of displayed video when the terminal of the transmission terminal 10 connected to the projector is switched. Further, it is likely that load of a call center or a managing section will be increased due to many inquiries related to the resolution difference from the users who are accustomed to using an analog terminal.

In order to deal with the above situation, in the following transmission terminal 10, resolution of video output through the digital terminal is caused to be the same as the resolution of video output through the analog terminal for a projector which satisfies a specific condition. With the above operation, even in the case where a projector with a digital terminal is newly introduced, it is possible for a user to project video with the same resolution as the projector used before. The specific condition is defined by using product information (apparatus information) including a manufacturer code, a product code, a model name, etc., of a projector, which will be described in detail below. That the specific condition is defined by using product information is effective in a case where, for example, it is necessary for the transmission terminal 10 to cause the resolution of video output through a digital terminal to be the same as the resolution output through an analog terminal when the transmission terminal 10 outputs video to a projector of a specific manufacturer or a specific model of a projector.

In the following, a part of an embodiment different from the embodiments previously described by referring to FIG. 1 through FIG. 41, will be mainly described. It should be noted that the housing, a hardware configuration, and basic functional structure of the transmission terminal 10 according to the embodiment are the same as described referring to FIG. 2, FIG. 3, FIG. 5A, and FIG. 5B.

<<Functional Structure>>

Figure 43:
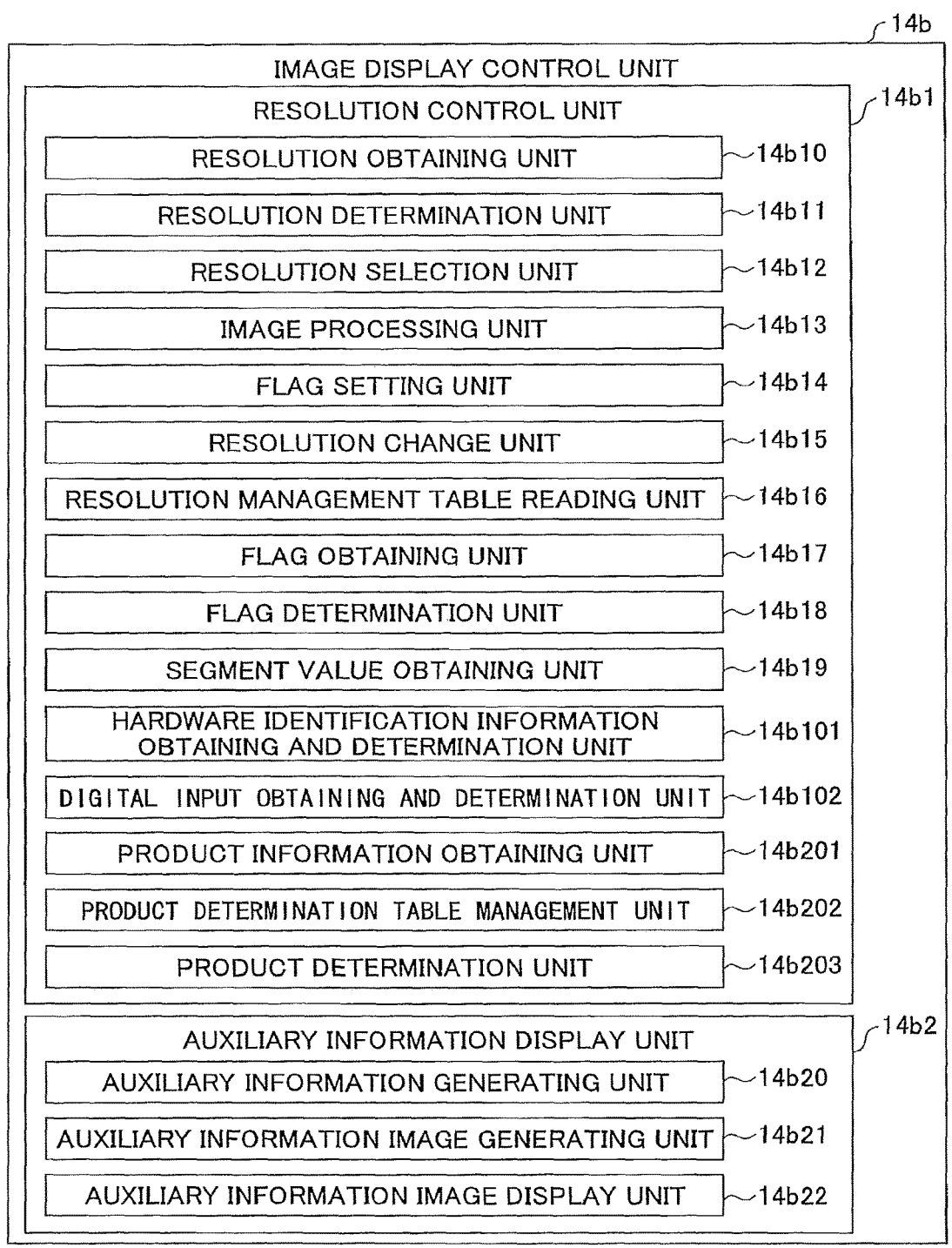
FIG. 43 is a drawing illustrating an example of a structure of an image display control unit.

Referring to FIG. 43, functions of the image display control unit 14b of the transmission terminal 10 according to the embodiment will be described. The image display control unit 14b illustrated in FIG. 43 further includes a product information obtaining unit 14b201, a product determination table management unit 14b202, and a product determination unit 14b203 in addition to the functions illustrated in FIG. 39.

The product information obtaining unit 14b201 obtains product information of a projector stored in a specific area of the projector in the case where the projector is connected to the transmission terminal 10. An example of a data structure including the product information is illustrated in FIG. 44. The data structure illustrated in FIG. 44 further includes items of "manufacturer code", "product code" and "model name" in addition to the data items illustrated in FIG. 40. In the following, the above three items are collectively referred to as "product information".

The "manufacturer code" indicates a code specific to a manufacturer of a projector. The "product code" indicates a product code of a projector. The "model name" indicates a model name of a projector. The above codes and the name may be represented by a combination of arbitrary character strings or numeric values. In an example of FIG. 44, the manufacturer code is represented by an alphanumeric string, the product code is represented by a hexadecimal value, and the model name is represented by an alphanumeric string.

The data structure illustrated in FIG. 44 is defined by, for example, extended display identification data (EDID) which is a standard of video electronics standards association (VESA). For example, when an projector is connected, the product information obtaining unit 14b201 can obtain the above product information stored by using EDID.

The product determination table management unit 14b202 manages a product determination table used for determining whether the resolution of video output via the digital terminal is caused to be the same as the resolution of video output via the analog terminal. FIG. 45A through FIG. 45C illustrate an example of the product determination table. As illustrated in FIG. 45A through FIG. 45C, a determination condition described in the product determination table is defined by using the product information.

FIG. 45A illustrates an example of the product determination table in which the determination condition is defined by using only the manufacturer code of the product information. FIG. 45B illustrates an example of the product determination table in which the determination condition is defined by using the manufacturer code and the model name of the product information. FIG. 45C illustrates an example of the product determination table in which the determination condition is defined by using the manufacturer code and a certain range of the product codes of the product information.

It should be noted that the product determination table may be defined by any combination of the product information or other information. For example, the product determination table may be defined by using any character string or value included in EDID.

The product determination unit 14b203 determines whether the resolution of video output from the digital terminal is caused to be the same as the resolution of video output from the analog terminal based on the product information obtained by the product information obtaining unit 14b201 and the product determination table managed by the product determination table management unit 14b202. For example, in an example of the product determination table illustrated in FIG. 45A, the product determination unit 14b203 determines that the condition is satisfied in the case where the "manufacturer code" of the obtained product information is "RRR", and determines that the resolution of video output from the digital terminal is caused to be the same as the resolution of video output from the analog terminal. On the other hand, in an example of FIG. 45B, the product determination unit 14b203 determines that the condition is satisfied in the case where the "manufacturer code" of the obtained product information is "RRR" and the "model name" of the obtained product information is "PPP_01SERIES" or "PPP_02SERIES". Further, in an example of FIG. 45C, the product determination unit 14b203 determines that the condition is satisfied in the case where the "manufacturer code" of the obtained product information is "RRR" and the "product code" of the obtained product information is included in between "0x0020h" and "0x002Fh".

<<Process and Operation of Embodiment>>
<<Process at the Start>>

Figure 46:
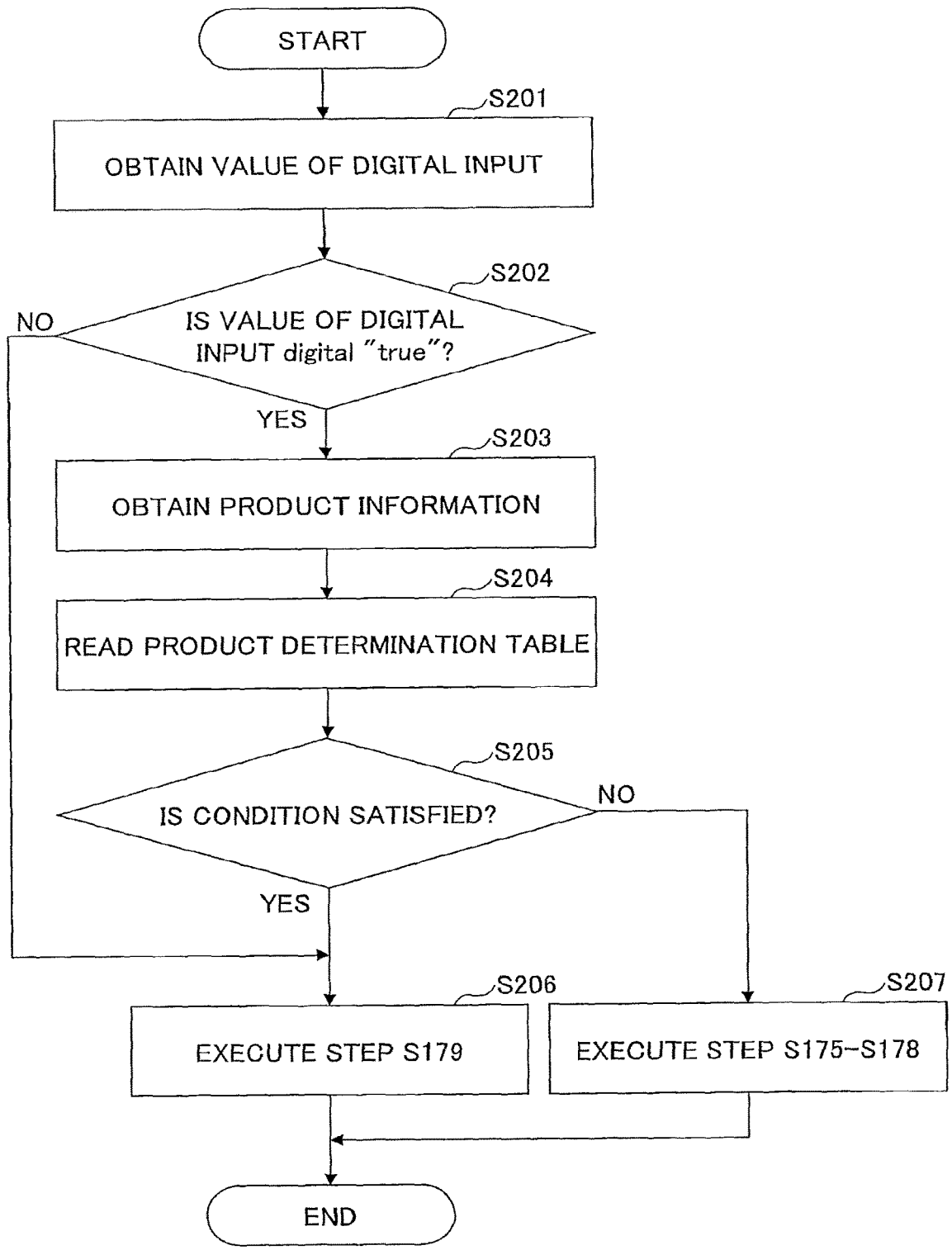
FIG. 46 is a process flowchart illustrating an example of a resolution control process.

Referring to FIG. 46, an example of a control process of the transmission terminal 10 according to the embodiment will be described. FIG. 46 illustrates a process flowchart in the case where the power supply of the transmission terminal 10 is turned on in a state where a projector is connected via a digital terminal.

In FIG. 46, when the process is started by turning on the power supply of the transmission terminal 10, the digital input obtaining and determination unit 14b102 of the image display control unit 14b accesses the projector and obtains a value of the digital input (digital) (step S201). Further, the digital input obtaining and determination unit 14b102 determines whether the value of the digital input is "true" (step S202).

In the case where the value of the digital input (digital) is "true" (YES in step S202), the product information obtaining unit 14b201 obtains the product information (e.g., manufacturer code, product code, and model name) illustrated in FIG. 44 (step S203).

On the other hand, in the case where the value of the digital input (digital) is not "true" (NO in step S202), step S179 of FIG. 41A (that is, steps S141-S152 of FIG. 38A) is performed (step S206), and the process ends.

After step S203, the product determination unit 14b203 reads the product determination table managed by the product determination table management unit 14b202 (step S204). Further, the product determination unit 14b203 determines whether the product information obtained in step S203 satisfies the condition defined by the product determination table (step S205).

In the case where the product information satisfies the condition defined by the product determination table (YES in step S205), step S179 of FIG. 41A (that is, steps S141-S152 of FIG. 38A) is performed (step S206), and the process ends. In other words, the same process as in the case where the projector is connected to an analog terminal (NO in step S202) is performed.

In the case where the product information does not satisfy the condition defined by the product determination table (NO in step S205), steps S175 through S178 of FIG. 41A are performed (step S207), and the process ends. In other words, the resolution is changed according to the recommended resolution of the projector.

It should be noted that in FIG. 46, contents of data illustrated in FIG. 44 are individually obtained in step S201 and S203. However, for example, in the case where the data is provided by EDID, after the power supply of the transmission terminal 10 is turned on, the transmission terminal 10 may obtain all the data items together from the projector and store the data items in the storage unit 1000. In this case, the digital input obtaining and determination unit 14b102 and the product information obtaining unit 14b201 may read the corresponding data items from the storage unit 1000 in step S201 and S203, respectively.

Further, the product determination table read in step S204 in FIG. 46 may be read at the time of program initialization which is performed at the time or after the time the transmission terminal 10 is started. In this case, in step S204, the product determination unit 14b203 can refer to the product determination table that has already been read.

<<Process after the Start>>

The process described so far is an initial process when the power supply of the transmission terminal 10 is turned on. The following process corresponds to a case where the projector is reconnected after the power supply is turned on.

Figure 47:
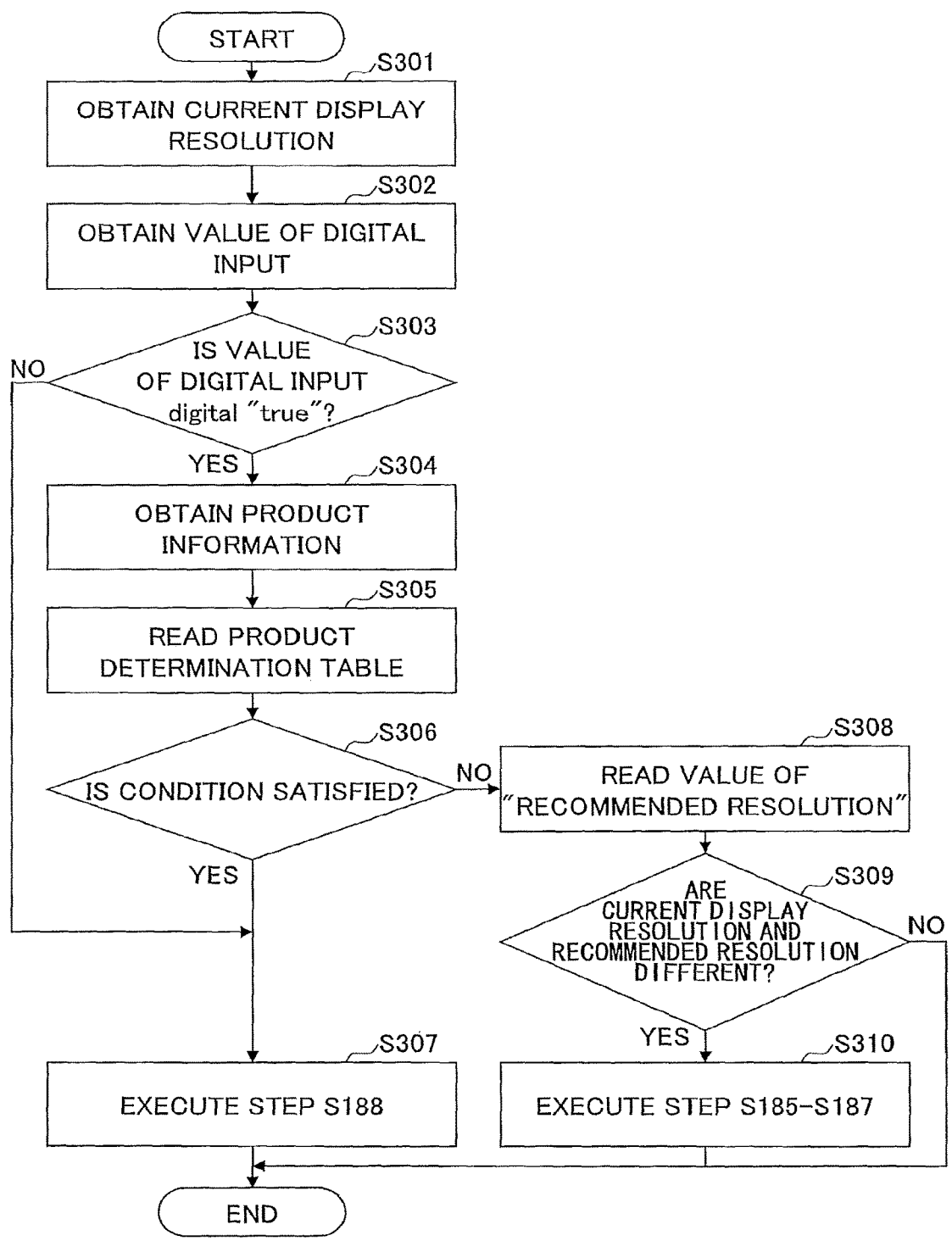
FIG. 47 is a process flowchart illustrating an example of a resolution control process.

The resolution obtaining unit 14b10 accesses the projector and obtains the resolution with which the projector currently displays an image (FIG. 47, step S301).

Next, the digital input obtaining and determination unit 14*b*102 accesses the projector, obtains a value of digital input (digital) (step S302), and determines whether the value is "true" (step S303).

In the case where the value of the digital input (digital) is "true" (YES in step S303), the product information obtaining unit 14*b*201 obtains the product information (e.g., manufacturer code, product code, and model name) illustrated in FIG. 44 (step S304).

On the other hand, in the case where the value of the digital input (digital) is not "true" (NO in step S303), step S188 of FIG. 41B (that is, steps S155-S167 of FIG. 38B) is performed (step S307), and the process ends.

After step S304, the product determination unit 14*b*203 reads the product determination table managed by the product determination table management unit 14*b*202 (step S305). Further, the product determination unit 14*b*203 determines whether the product information obtained in step S304 satisfies the condition defined by the product determination table (step S306).

In the case where the product information satisfies the condition defined by the product determination table (YES in step S306), step S188 of FIG. 41B (that is, steps S155-S167 of FIG. 38B) is performed (step S307), and the process ends. In other words, the same process as in the case where the projector is connected to an analog terminal (NO in step S202) is performed.

On the other hand, in the case where the product information does not satisfy the condition defined by the product determination table (NO in step S306), the resolution obtaining unit 14*b*10 accesses the projector and obtains the recommended resolution (step S308). Further, the resolution determination unit 14*b*11 determines whether the resolution with which the projector currently displays an image and the obtained recommended resolution are different (step S309).

In the case where the resolution with which the projector currently displays an image and the obtained recommended resolution are different (YES in step S309), steps S185 through S187 of FIG. 41B are performed (step S310), and the process ends. On the other hand, in the case where the current display resolution and the obtained resolution are not different (NO in step S309), the process ends.

It should be noted that in FIG. 47, contents of data illustrated in FIG. 44 are individually obtained in step S302 and S304. However, for example, in the case where the data is provided by EDID, at the time of projector connection, the transmission terminal 10 may obtain all the data items together from the projector and store the data items in the storage unit 1000. In this case, the digital input obtaining and determination unit 14*b*102 and the product information obtaining unit 14*b*201 may read the corresponding data items from the storage unit 1000 in step S302 and S304, respectively.

<<Effect of Embodiment>>

As described above, the transmission terminal 10 according to the embodiment can adjust the resolution of video output via the digital terminal to be the same as the resolution of video output through the analog terminal in the case where the projector has specific product information. With the above operation, even in the case where a projector with a digital terminal is newly introduced, it is possible for a user to project video with the same resolution as a projector used before. As a result, it is not necessary for the call center of the manufacturer of the projector or a managing section in the company responsible for managing the projector to handle inquiries related to the resolution change.

It should be noted that in the embodiment, it is described that the product determination table is retained by the product determination table management unit 14*b*202. However, the product determination table may be stored in the storage unit 1000 of the transmission terminal 10, or may be obtained from outside (e.g., from the transmission management system 50 in FIG. 1) via the communication network 2.

Further, in the embodiment, it is described as an example that the projector is connected to the digital terminal. However, instead of the projector, any display apparatus including a display such as a CRT, liquid crystal display, etc., a television set, an electric white board may be connected. When an existing display apparatus, connected to the transmission terminal 10 using an analog terminal, is replaced by a display apparatus connectable to the transmission terminal 10 using a digital terminal, the resolution may change, which may give a feeling of strangeness to a user. This kind of problem can be solved by the transmission terminal 10 described above.

Further, in the embodiment, an example is described in which an EDID is used, and the product information such as a manufacturer code, a product code, or a model name (refer to FIG. 41) is stored in the projector in advance. However, the transmission terminal 10 may obtain from the projector minimum information (e.g., identifier of a product, such as a model name) necessary for identifying the projector. In this case, the transmission terminal 10 retains other information (e.g., a manufacturer code or a product code), etc., corresponding to the identifier in the storage unit 1000, etc., in advance. With the above arrangement, it may be possible to obtain an effect of the present invention even in the case where the projector does not have information such as a manufacturer code or a product code.

Further, in the embodiment, an example is described in which the transmission terminal 10 includes the housing illustrated in FIG. 2. However, the transmission terminal 10 may be a PC, a smartphone, a tablet, a personal display assistant (PDA), or an information terminal such as a wearable device including a watch, glasses, etc.

<<Supplementary Description of Embodiment>>

It should be noted that the process for obtaining display data may use a mirror driver. The mirror driver is used for transmitting the generated display data directly to a USB driver without going through a program. In this case, the mirror driver generates the display data, and the USB driver transmits the generated display data to the transmission terminal 10 via the external apparatus I/F 118. In this case, it is not necessary for the program to obtain the display data, and thus, it is possible to reduce resources used for executing the program.

Further, in the embodiment, an example is described in which a program obtains the image data generated by a display driver and transmits to the transmission terminal 10. However, the program may obtain a drawing command generated by the GDI, and transmit to the transmission terminal 10. Because a size of the drawing command is less than the image data, network load can be reduced. Further, the display data obtaining unit 451 may obtain only display data displayed on a predetermined screen of a plurality of screens on a virtual display, and the obtained display data may be transmitted by the display data transmission unit 452. With the above operation, the image data displayed on a screen other than the predetermined screen is not shared with the other party of the conference. Therefore, it is possible, for example, not to let the other party of the conference see a confidential document, and security is increased.

It should be noted that the transmission management system 50, the program providing system 90, and the maintenance system 100 according to an embodiment may include a single computer, or a plurality of computers to which corresponding units (functions or means) are arbitrarily assigned. Further, in the case where the program providing system 90 includes a single computer, a program transmitted from the program providing system 90 may be divided into a plurality of modules and transmitted, or may be transmitted without being divided into modules. Further, in the case where the program providing system 90 includes a plurality of computers, a plurality of divided modules may be transmitted from the corresponding computers.

Further, a recording medium in which a transmission terminal program, a relay apparatus program, and a transmission management program according to an embodiment are stored, an HD 204 in which the above programs are stored, and a program providing system 90 including the HD 204 are used for providing the programs as program products for users in the country or abroad.

Further, in the embodiment, the resolution of image of the image data is managed as an example of an image quality of the image data relayed by the relay apparatus 30 according to the change quality management table illustrated in FIG. 7 and the quality management table illustrated in FIG. 15. However, the managed quality of an image is not limited the resolution. As another example of quality, a depth of image quality of the image data, a sampling frequency of voice of the audio data, a bit length of voice of the audio data, etc., may be managed.

Further, in the tables illustrated in FIG. 8, FIG. 10, and FIG. 12, reception date and time is stored. It is not limited to the reception date and time, but at least reception time of the reception date and time may be stored.

Further, in the embodiment, the IP address of the relay apparatus 30 is managed in the table of FIG. 8, the IP address of the transmission terminal 10 is stored. It is not limited to the IP address of the relay apparatus 30 and the IP address of the transmission terminal 10. As long as it is used as relay apparatus identifying information for identifying the relay apparatus 30 on the communication network 2, a fully qualified domain name (FQDN) of the relay apparatus 30 may be managed, and as long as it is used as terminal identifying information for identifying the transmission terminal 10 on the communication network 2, a FQDN of the transmission terminal 10 may be managed. In this case, an IP address corresponding to the FQDN is obtained according to a known domain name server (DNS). It should be noted that the "relay apparatus identifying information for identifying the relay apparatus 30 on the communication network 2" may be referred to as "relay apparatus connection destination information indicating a connection destination to the relay apparatus 30 on the communication network 2" or "relay apparatus destination information indicating a destination to the relay apparatus 30 on the communication network 2". Similarly, "terminal identifying information for identifying the transmission terminal 10 on the communication network 2" may be referred to as "terminal connection destination information indicating a connection destination to the transmission terminal 10 on the communication network 2" or "terminal destination information indicating a destination to the transmission terminal 10 on the communication network 2".

Further, in the embodiment, a case of a video conference system is described as an example of the transmission system 1, but the the transmission system 1 is not limited to the video conference system and may be a telephone system including an Internet Protocol (IP) telephone, an Internet telephone, etc. Further, the transmission system 1 may be a car navigation system. In this case, for example, one of the transmission terminals 30 corresponds to a car navigation apparatus mounted on a car, and the other of the transmission terminals 30 corresponds to a management terminal or a management server in a management center that controls a car navigation system, or another car navigation apparatus mounted on another car.

Further, in the process of obtaining the display data, instead of an entire screen, only a part displayed in an area (window) in the screen may be obtained as will be described below. FIG. 26 is an example of a screen displayed by the external input apparatus 40aa. In this example, an area (window) (a) and an area (b) are displayed on the screen. When it is desired by a user that one of the areas is shared with the transmission terminal 10db, the area is pointed by a pointer illustrated by (c) in FIG. 27 according to an operation of the mouse 212. The display data of the area (a) that has been pointed in FIG. 27 is obtained by the display data obtaining unit 451.

Further, the display data obtaining unit 451 and the display data transmission unit 452, stored in the storage unit 1000 of the transmission terminal 10, which is used by the external input device, may be included in the external input device 40 in advance. With the above arrangement, a process of transmitting and receiving the display data obtaining unit 451 and the display data transmission unit 452 can be omitted, and load of the transmission terminal 10 and the external input device 40 can be reduce.

Further, as described above, the external input device 40 causes the display apparatus 400 to display the data. The display apparatus 400 may be an apparatus separated from the external input device 40, or may be included in the external input device 40.

Further, in a process of step S71, the installation determination unit 43 may determine whether the display data obtaining unit 451 and the display data transmission unit 452 have already been installed. In this case, in the case where it is determined that the display data transmission unit 452 has not been installed in step S71, the program obtaining unit 44 obtains the display data obtaining unit 451 and the display data transmission unit 452 stored in the transmission terminal 10aa, and installs the obtained units (step S73).

Further, the external input apparatus 40aa may include the display data obtaining unit 451 in advance, and the above process of the installation determination unit 43 may not be performed. The display data transmission unit 452 may not be needed by writing the display data obtained by the display data obtaining unit 451 to the mounted storage unit 1000 of the transmission terminal 10aa The present invention has been described above according to the preferred embodiments. The present invention has been described by illustrating specific examples. It should be appreciated that various modifications and changes to the specific examples may be made without departing from the spirit and scope of the present invention defined by accompanied claims. In other words, it should be understood that the present invention is not limited by the specific examples and the accompanied drawings.

DESCRIPTION OF THE REFERENCE NUMERALS

1 transmission system
10 transmission terminal
11 transmission and reception unit (an example of a display data transmission means)
12 operation input accepting unit
13 login request unit
14a imaging unit
14b image display control unit
14b1 resolution control unit 14b10 resolution obtaining unit
14b11 resolution determination unit
14b12 resolution selection unit
14b13 image processing unit
14b14 flag setting unit
14b15 resolution change unit
14b16 resolution management table reading unit
14b17 flag obtaining unit
14b18 flag determination unit
14b19 segment value obtaining unit
14b101 hardware identification obtaining and determination unit
14b102 digital input obtaining and determination unit
14b201 product information obtaining unit
14b202 product determination table management unit
14b203 product determination unit
14b2 auxiliary information display unit
14b20 auxiliary information generation unit
14b21 auxiliary information image generation unit
14b22 auxiliary information image display unit
15a audio input unit
15b audio output unit
16 selection processing unit
16a measurement unit
16b calculation unit
16c selection unit
17 delay detection unit
18 external information transmission and reception unit (an example of a display data reception means)
19 storing and reading processing unit
20 detection unit
30 relay apparatus
31 transmission and reception unit
32 state detection unit
33 data quality checking unit
34 change quality management unit
35 data quality change unit
40 external input apparatus
41 transmission and reception unit
42 connection detection unit
43 installation determination unit
44 program obtaining unit
451 display data obtaining unit
452 display data transmission unit
46 operation input accepting unit
47 display control unit
48 mounting unit
49 storing and reading processing unit
50 transmission management system
51 transmission and reception unit
52 terminal authentication unit
53 state management unit
54 terminal extracting unit
55 terminal state obtaining unit
56 narrowing down unit
56a selection session ID generation unit
56b terminal IP address extracting unit
56c selection unit
56d priority determination unit
57 session management unit
58 quality determination unit
60 delay time management unit
100 maintenance system
120 display
400 display apparatus
1000 storage unit (an example of a destination information storage means)
3000 storage unit
3001 change quality management DB
4000 storage unit
4001 document management DB
5000 storage unit
5001 relay apparatus management DB
5002 terminal authentication management DB
5003 terminal management DB
5004 destination list management DB
5005 session management DB
5006 priority management DB
5007 quality management DB

What is claimed is:

1. An information terminal connected to a display apparatus via a digital terminal and configured to output image data to the display apparatus, the information terminal comprising:
processing circuitry configured to:
in the case where apparatus information obtained from the display apparatus via the digital terminal matches a predetermined apparatus information, change a resolution of the display apparatus connected to the digital terminal to a resolution of the display apparatus in the case where the display apparatus is connected to an analog terminal: and,
in the case where the obtained apparatus information does not match the predetermined apparatus information, change a resolution of the display apparatus connected to the digital terminal to a recommended resolution;
wherein the obtained apparatus information includes at least one of a manufacturer code, a product code, and a model name; and
the processing circuitry is further configured to determine whether the obtained apparatus information matches the predetermined apparatus information; and
determine that the obtained apparatus information matches the predetermined apparatus information in the case where the model name included in the obtained apparatus information is a predetermined model name.

2. An information terminal connected to a display apparatus via a digital terminal and configured to output image data to the display apparatus,
the information terminal comprising:
processing circuitry configured:
in the case where apparatus information obtained from the display apparatus via the digital terminal matches a predetermined apparatus information, change a resolution of the display apparatus connected to the digital terminal to a resolution of the display apparatus in the case where the display apparatus is connected to an analog terminal: and,
in the case where the obtained apparatus information does not match the predetermined apparatus information, change a resolution of the display apparatus connected to the digital terminal to a recommended resolution;
wherein the obtained apparatus information includes at least one of a manufacturer code, a product code, and a model name, and
the processing circuitry is further configured to:
determine whether the obtained apparatus information matches the predetermined apparatus information, and determine that the obtained apparatus information matches the predetermined apparatus information in the case where the manufacturer code included in the obtained apparatus information is a predetermined manufacturer code and the product code included in the obtained apparatus information is within a predetermined product code range.

3. An information terminal connected to a display apparatus via a digital terminal and configured to output image data to the display apparatus,
the information terminal comprising:
processing circuitry configured to:
in the case where apparatus information obtained from the display apparatus via the digital terminal matches a predetermined apparatus information, change a resolution of the display apparatus connected to the digital terminal to a resolution of the display apparatus in the case where the display apparatus is connected to an analog terminal; and,
in the case where the obtained apparatus information does not match the predetermined apparatus information, change a resolution of the display apparatus connected to the digital terminal to a recommended resolution;
in the case where the obtained apparatus information matches predetermined apparatus information, successively read a data line from a resolution management table having one or more data lines including at least a resolution and an overlap flag as elements; and
obtain a resolution of the display apparatus in the case where the display apparatus is connected to an analog terminal;
obtain displayable resolutions of the display apparatus in the case where the obtained apparatus information matches the predetermined apparatus information;
determine whether the obtained displayable resolutions include the obtained resolution;
obtain an overlap flag from the read data line in the case where the processing circuitry determines that the displayable resolutions include the obtained resolution; and
perform a process of adding a segment area to image data to be output to the display apparatus in the case where the obtained overlap flag.

4. An information terminal connected to a display apparatus via a digital terminal and configured to output image data to the display apparatus,
the information terminal comprising:
processing circuitry configured to:
in the case where apparatus information obtained from the display apparatus via the digital terminal matches a predetermined apparatus information, change a resolution of the display apparatus connected to the digital terminal to a resolution of the display apparatus in the case where the display apparatus is connected to an analog terminal; and,
in the case where the obtained apparatus information does not match the predetermined apparatus information, change a resolution of the display apparatus connected to the digital terminal to a recommended resolution;
in the case where the obtained apparatus information matches the predetermined apparatus information, obtain displayable resolutions of the display apparatus; and
determine whether the displayable resolutions include a resolution of an aspect ratio other than a standard aspect ratio used for image data transmission; and
in the case where the processing circuitry determines that the displayable resolutions include a resolution of an aspect ratio other than the standard aspect ratio;
select a first resolution of an aspect ratio other than the standard aspect ratio from the displayable resolutions; and,
in the case where the processing circuitry determines that the displayable resolutions do not include a resolution of an aspect ratio other than the standard aspect ratio;
select a second resolution of the standard aspect ratio from the displayable resolution; and
perform a process of adding a segment area to image data to be output to the display apparatus after the first resolution is selected.

5. The information terminal according to claim 4, wherein the processing circuitry
generates one or more rectangular data items whose width matches a width of the first resolution, and
adds the rectangular data item in a height direction of the image data, wherein
a sum of a height of the rectangular data item and a height of the image data matches a height of the first resolution.

6. The information terminal according to claim 4, wherein the processing circuitry is further configured to, in the case where auxiliary information is displayed by the display apparatus, display the auxiliary information in the segment area in the case where the first resolution is selected, and display the auxiliary information in an arbitrary area of the image data in such a way that the auxiliary information and the image data are overlapped in the case where the second resolution is selected.

* * * * *